US012510801B2

(12) United States Patent
Lee

(10) Patent No.: US 12,510,801 B2
(45) Date of Patent: Dec. 30, 2025

(54) REFLECTIVE MEMBER DRIVING DEVICE

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 142 days.

(21) Appl. No.: 18/284,329

(22) PCT Filed: Mar. 25, 2022

(86) PCT No.: PCT/KR2022/004270

§ 371 (c)(1),
(2) Date: Sep. 27, 2023

(87) PCT Pub. No.: WO2022/211393

PCT Pub. Date: Oct. 6, 2022

(65) Prior Publication Data

US 2024/0152028 A1 May 9, 2024

(30) Foreign Application Priority Data

Apr. 1, 2021 (KR) ........................ 10-2021-0042991
Apr. 1, 2021 (KR) ........................ 10-2021-0042992

(51) Int. Cl.
*G03B 5/00* (2021.01)
*G03B 17/12* (2021.01)
*G03B 17/17* (2021.01)

(52) U.S. Cl.
CPC ............... *G03B 5/00* (2013.01); *G03B 17/12* (2013.01); *G03B 17/17* (2013.01); *G03B 2205/0023* (2013.01); *G03B 2205/0069* (2013.01)

(58) Field of Classification Search
None
See application file for complete search history.

(56) References Cited

U.S. PATENT DOCUMENTS 11,159,727 B2 * 10/2021 Lee .................... G02B 13/0065
2020/0244148 A1 * 7/2020 Ko ........................ H02K 11/215
(Continued)

FOREIGN PATENT DOCUMENTS

KR 20170080853 7/2017
KR 10-2018-0125989 11/2018
(Continued)

OTHER PUBLICATIONS

International Search Report dated Jun. 30, 2022 issued in Application No. PCT/KR2022/004270.
(Continued)

*Primary Examiner* — Rodney E Fuller
(74) *Attorney, Agent, or Firm* — KED & ASSOCIATES

(57) ABSTRACT

A reflective member driving device including a housing; a holder which is disposed within the housing; a reflective member which is disposed in the holder; a moving plate which is disposed between the housing and the holder; a driving magnet and a sensing magnet which are disposed in the holder; a coil which electromagnetically interacts with the driving magnet; and a first sensor which senses the sensing magnet. The driving magnet includes a first magnet which tilts the reflective member about a first axis and a second magnet which tilts the reflective member about a second axis perpendicular to the first axis. The sensing magnet is disposed at a location where the sensing magnet does not electromagnetically interact with the coil.

20 Claims, 41 Drawing Sheets

(56) References Cited

U.S. PATENT DOCUMENTS

| | | | | |
|---|---|---|---|---|
| 2020/0396358 | A1 | 12/2020 | Park et al. | |
| 2022/0066287 | A1* | 3/2022 | Miller | G02B 13/0065 |
| 2022/0210299 | A1* | 6/2022 | Kwon | H04N 23/51 |
| 2023/0086178 | A1* | 3/2023 | Hwang | H04N 23/687 348/208.11 |

FOREIGN PATENT DOCUMENTS

| | | |
|---|---|---|
| KR | 10-2020-0144260 | 12/2020 |
| KR | 20200142877 | 12/2020 |
| KR | 20210004320 | 1/2021 |
| KR | 10-2021-0013978 | 2/2021 |
| KR | 10-2021-0034400 | 3/2021 |

OTHER PUBLICATIONS

Korean Office Action dated May 30, 2025, issued in Application No. 10-2021-0042991.

Korean Office Action dated Jun. 4, 2025, issued in Application No. 10-2021-0042992.

* cited by examiner

【FIG. 1】
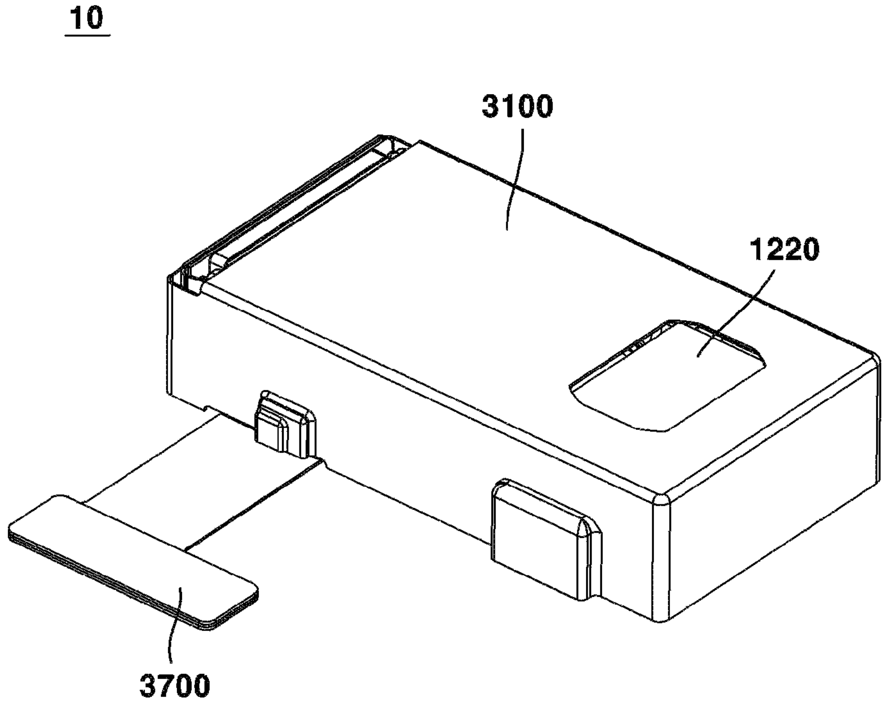

【FIG. 2】
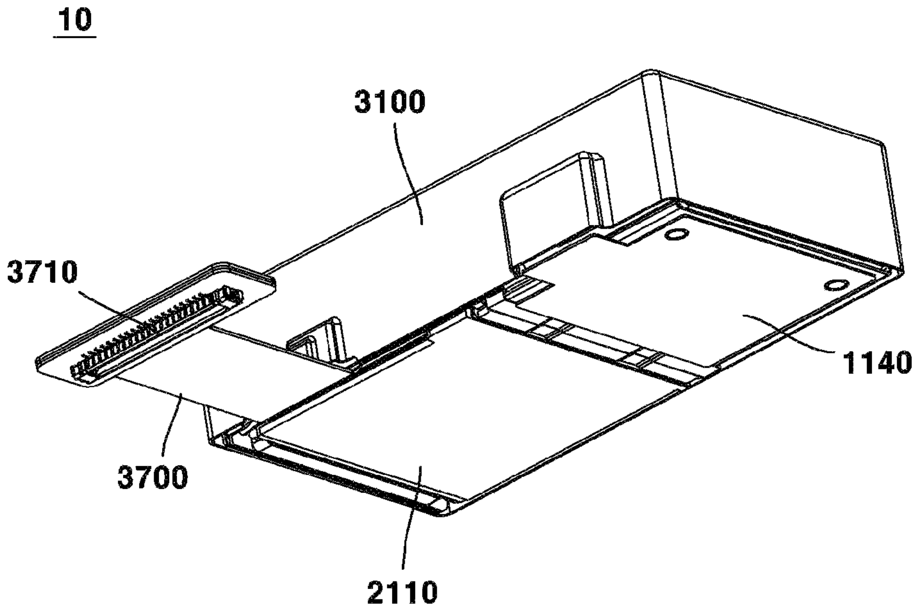

【FIG. 3】
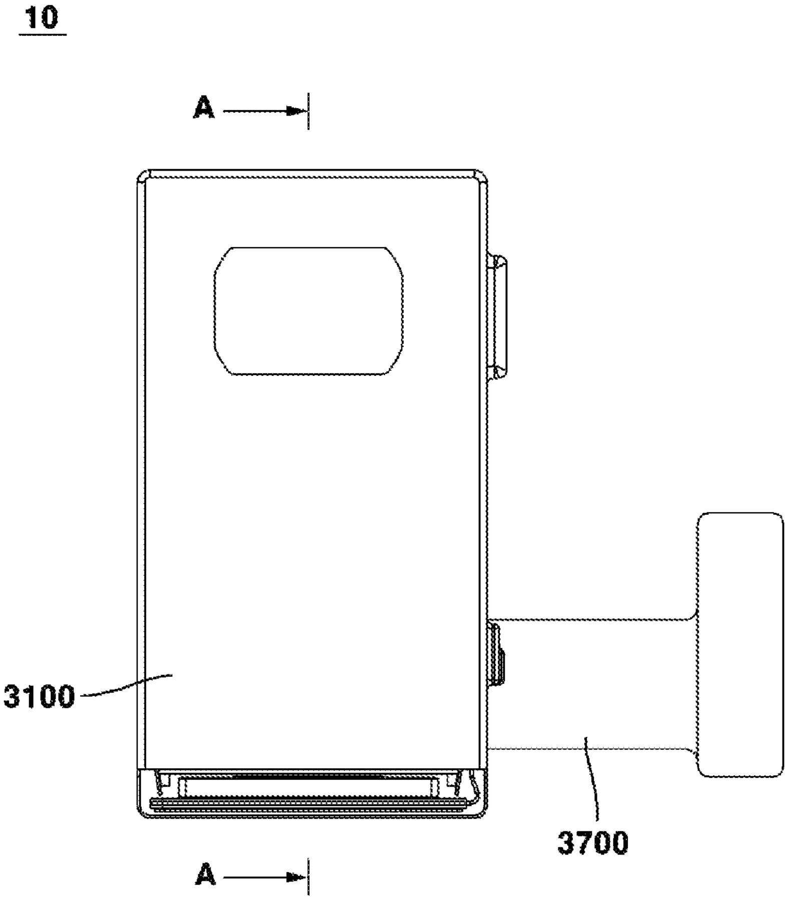

【FIG. 4】
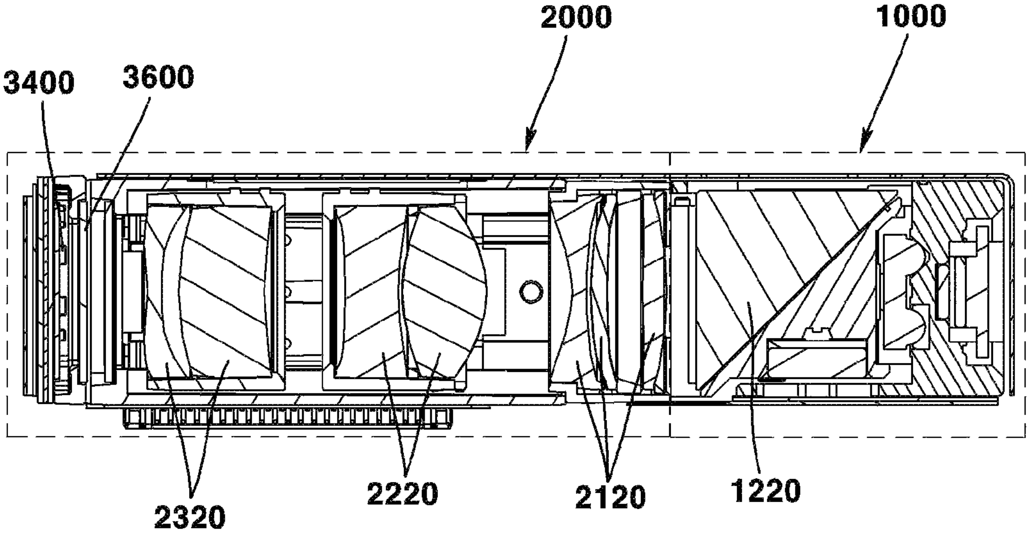

【FIG. 5】
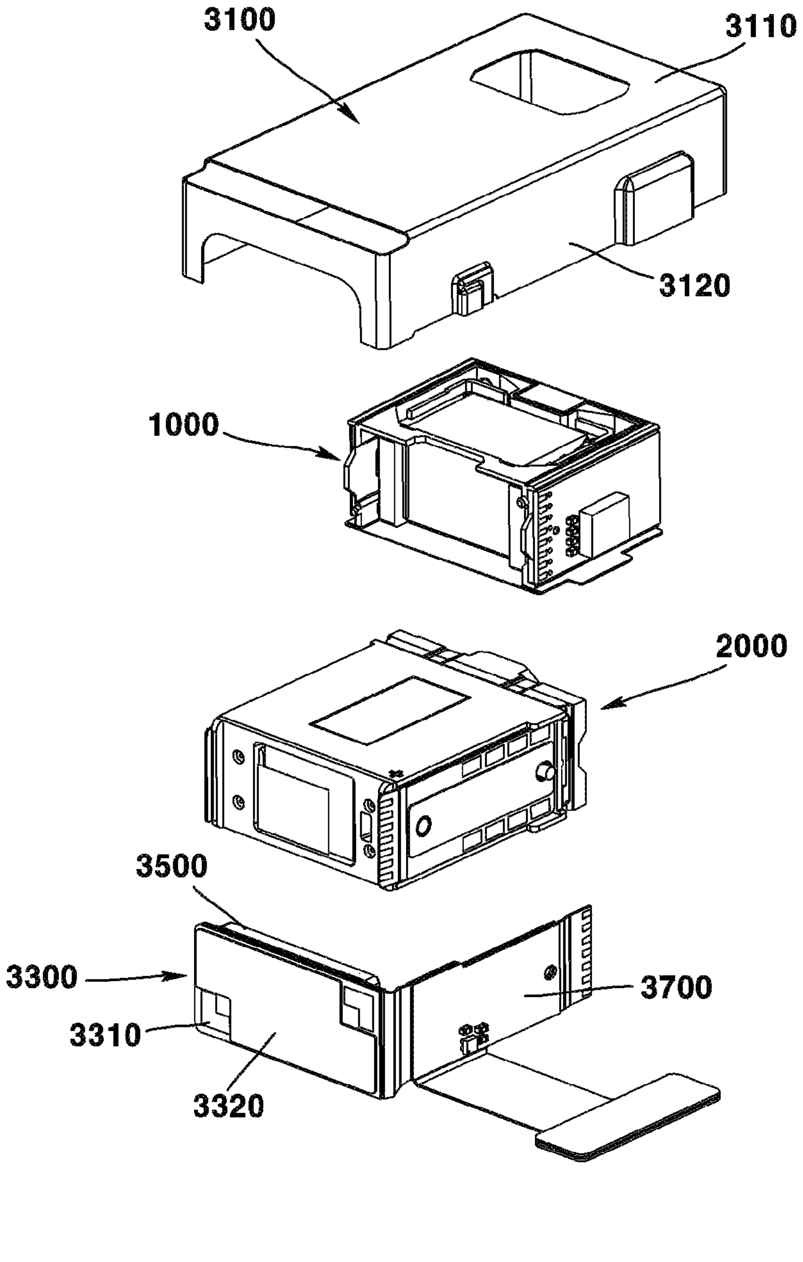

【FIG. 6】
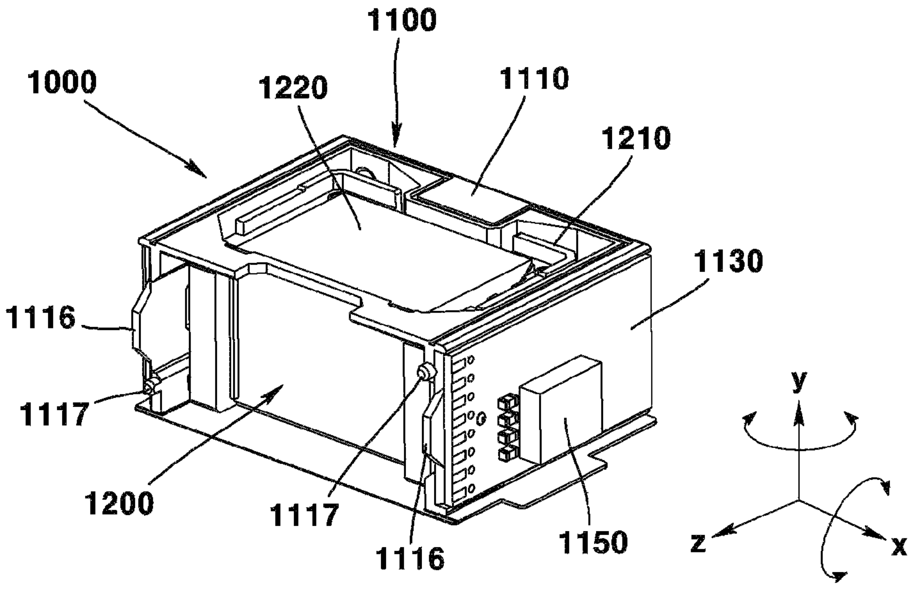

【FIG. 7】
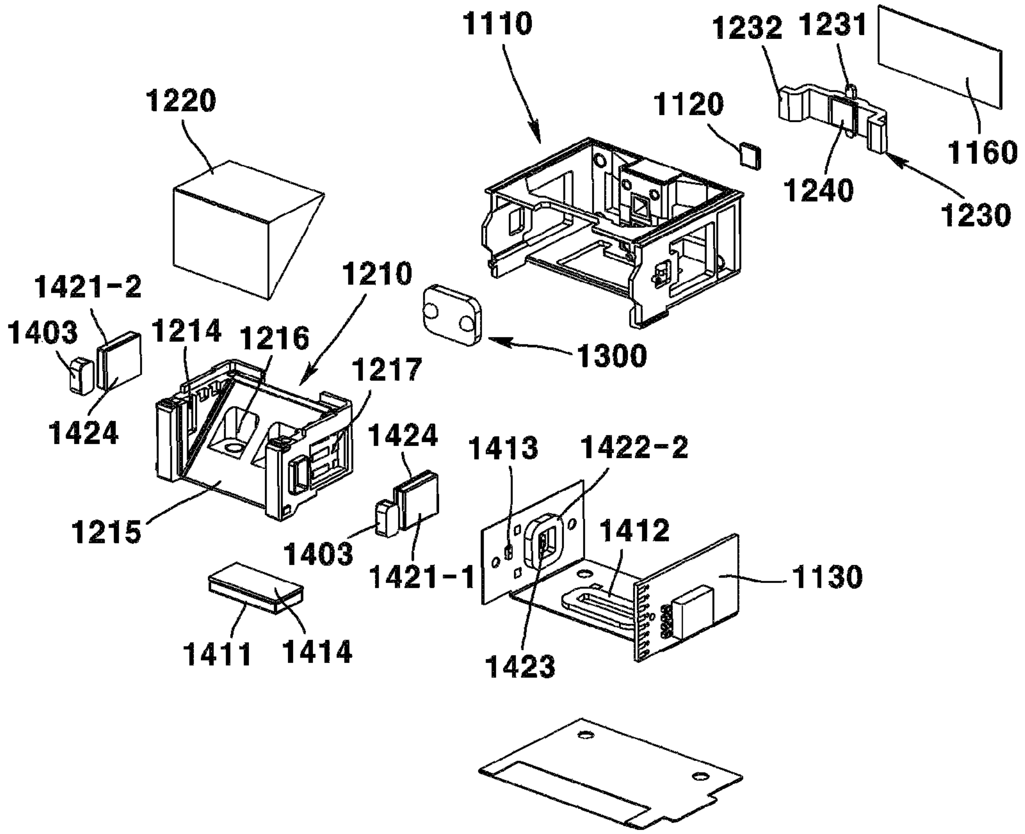

【FIG. 8】
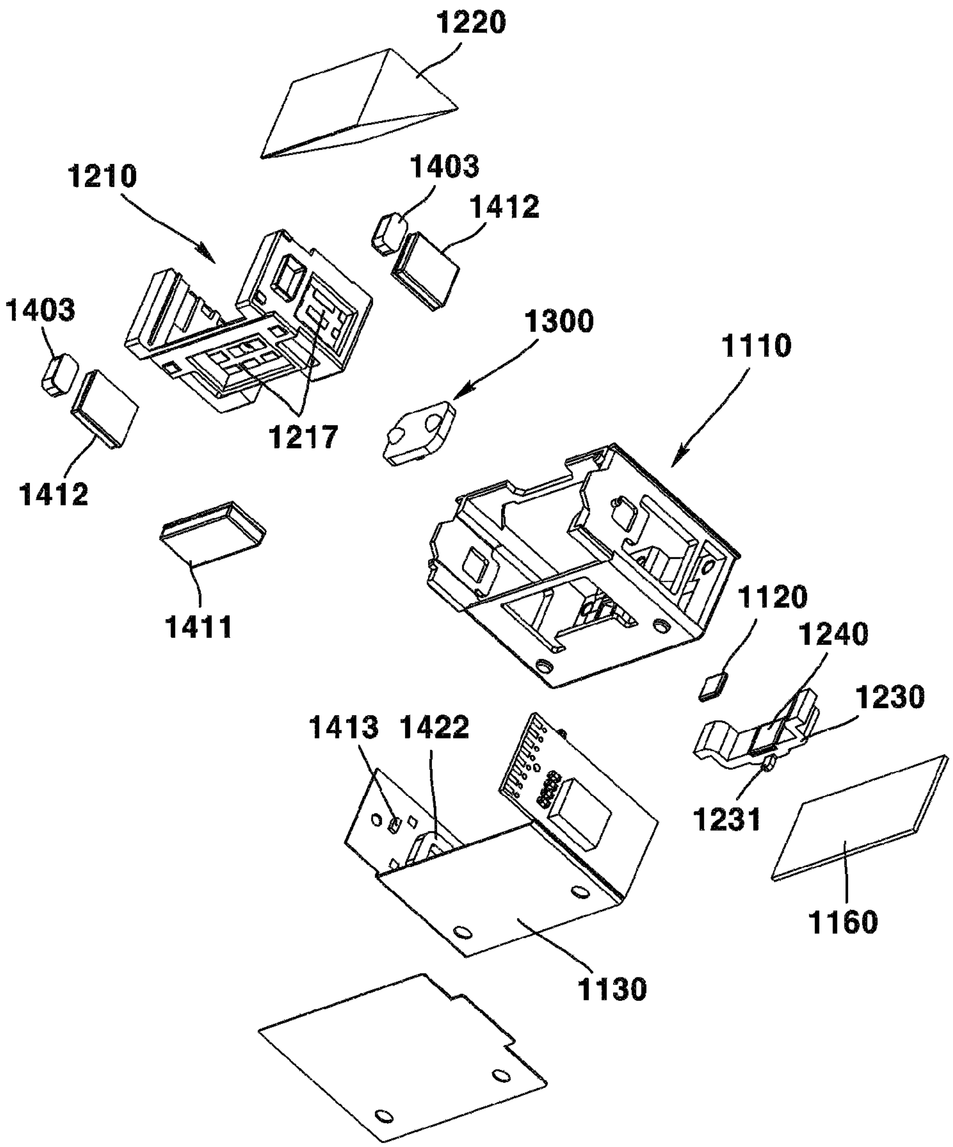

【FIG. 9】
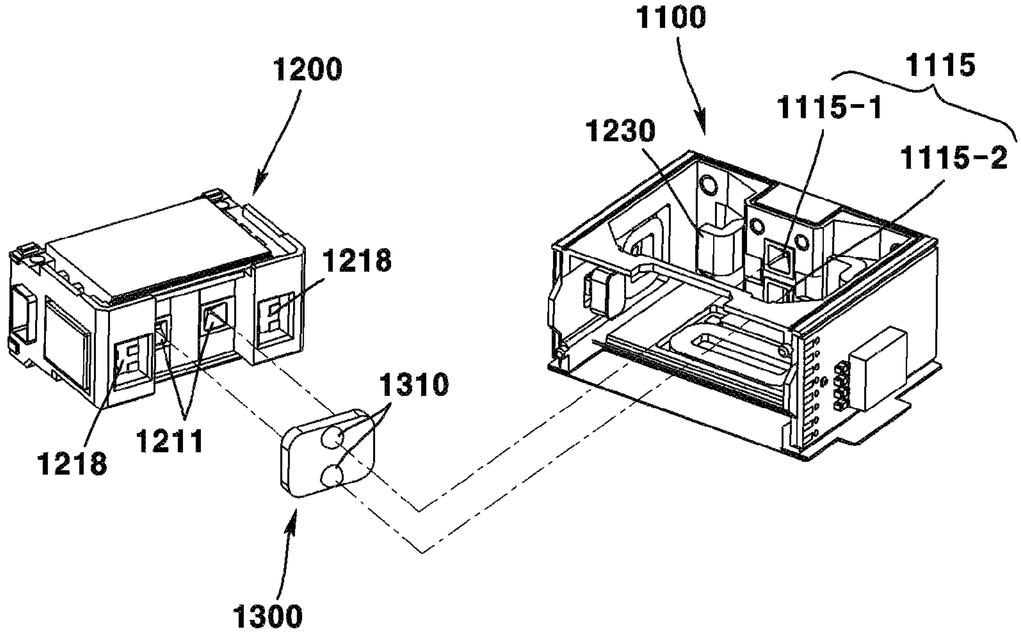
【FIG. 10】
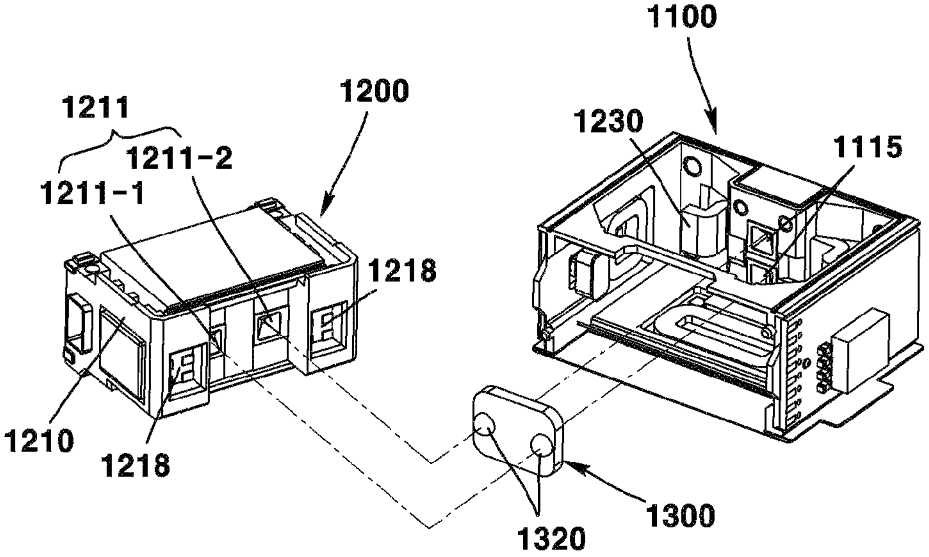

【FIG. 11】
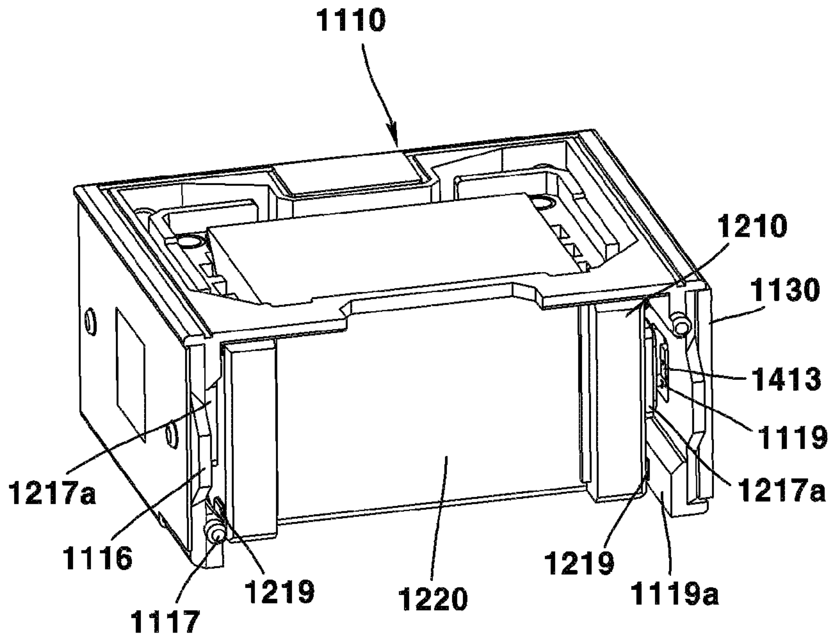

【FIG. 12】
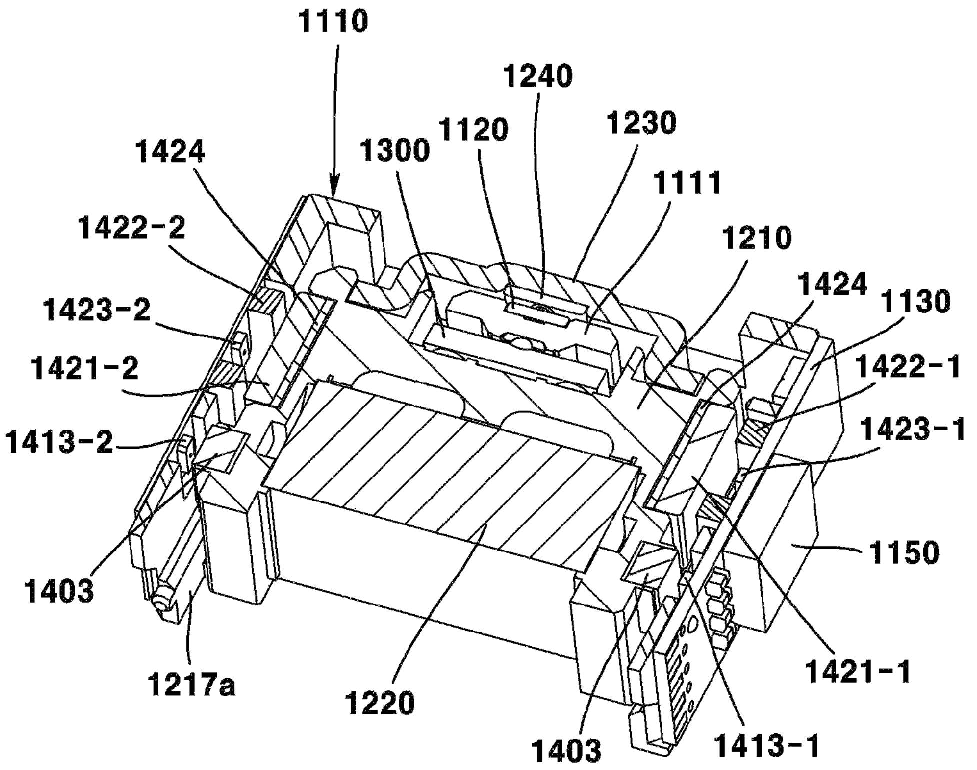
【FIG. 13】
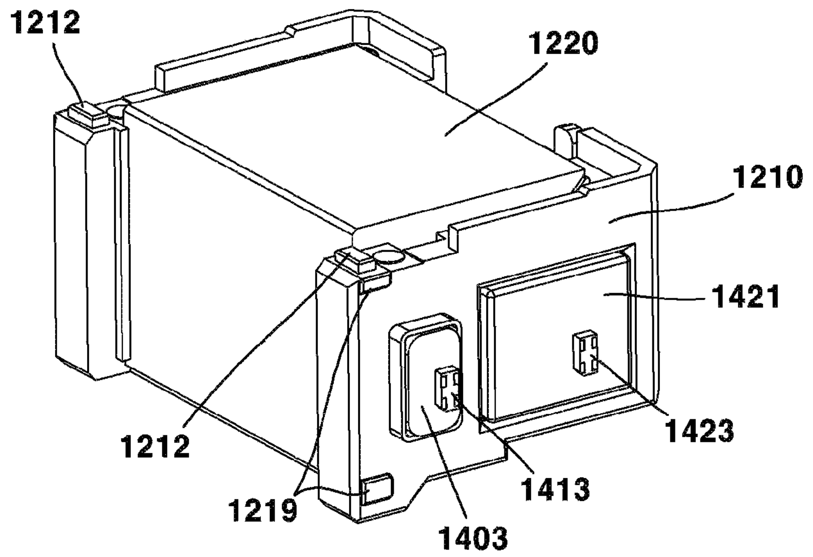

【FIG. 14】
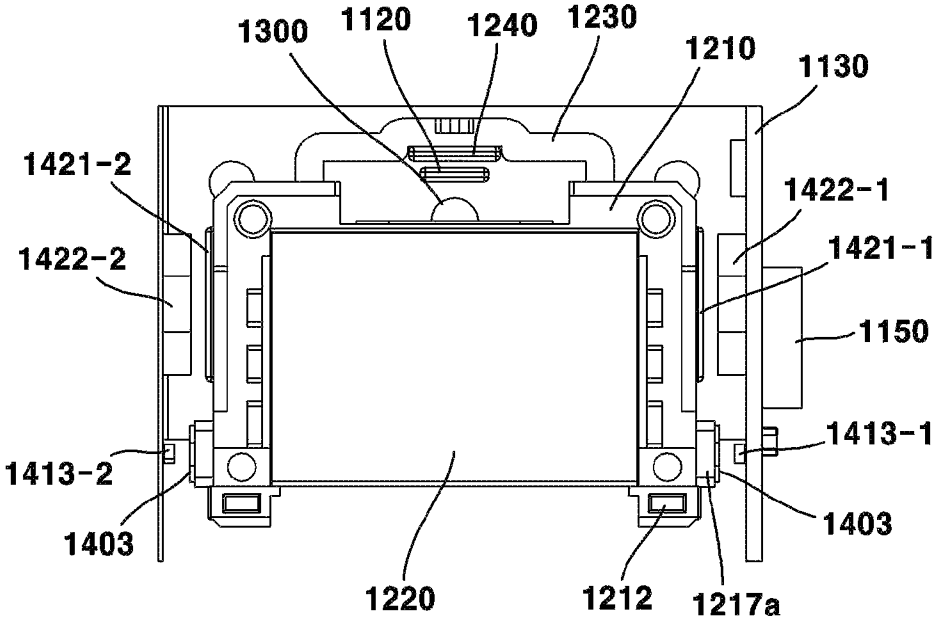

【FIG. 15】
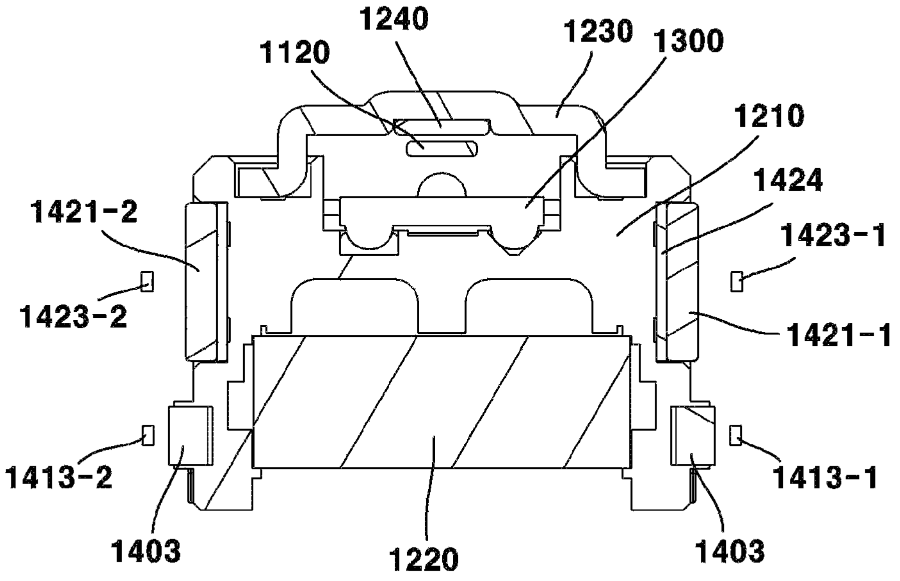
【FIG. 16】
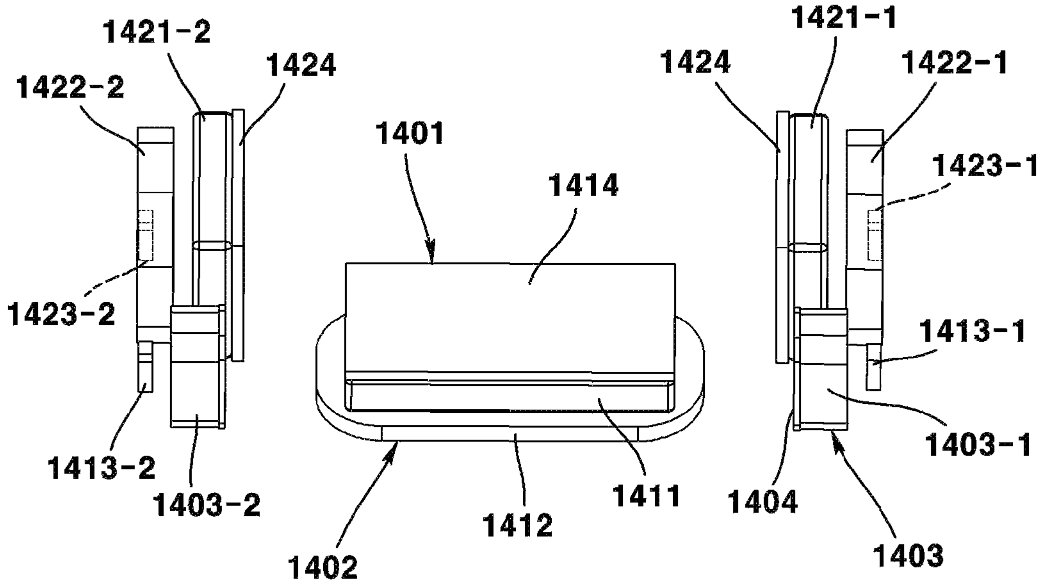

【FIG. 17】
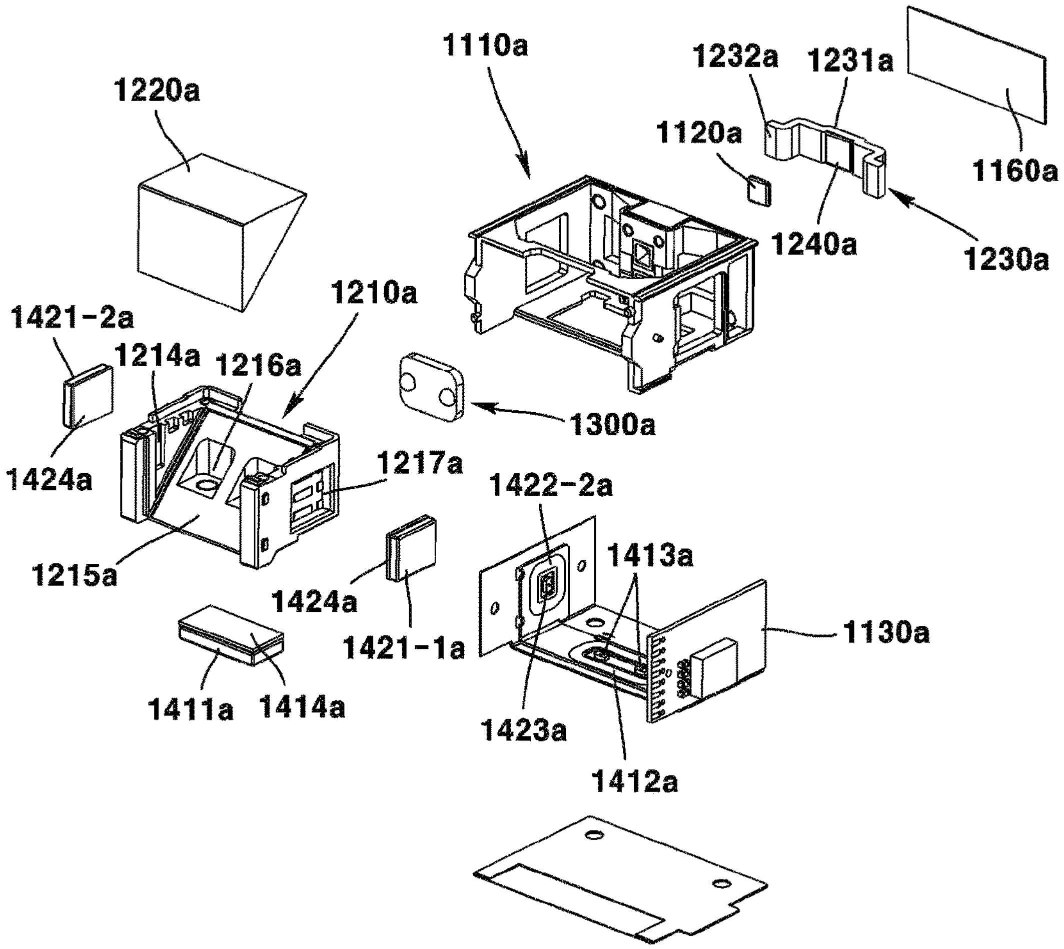

【FIG. 18】
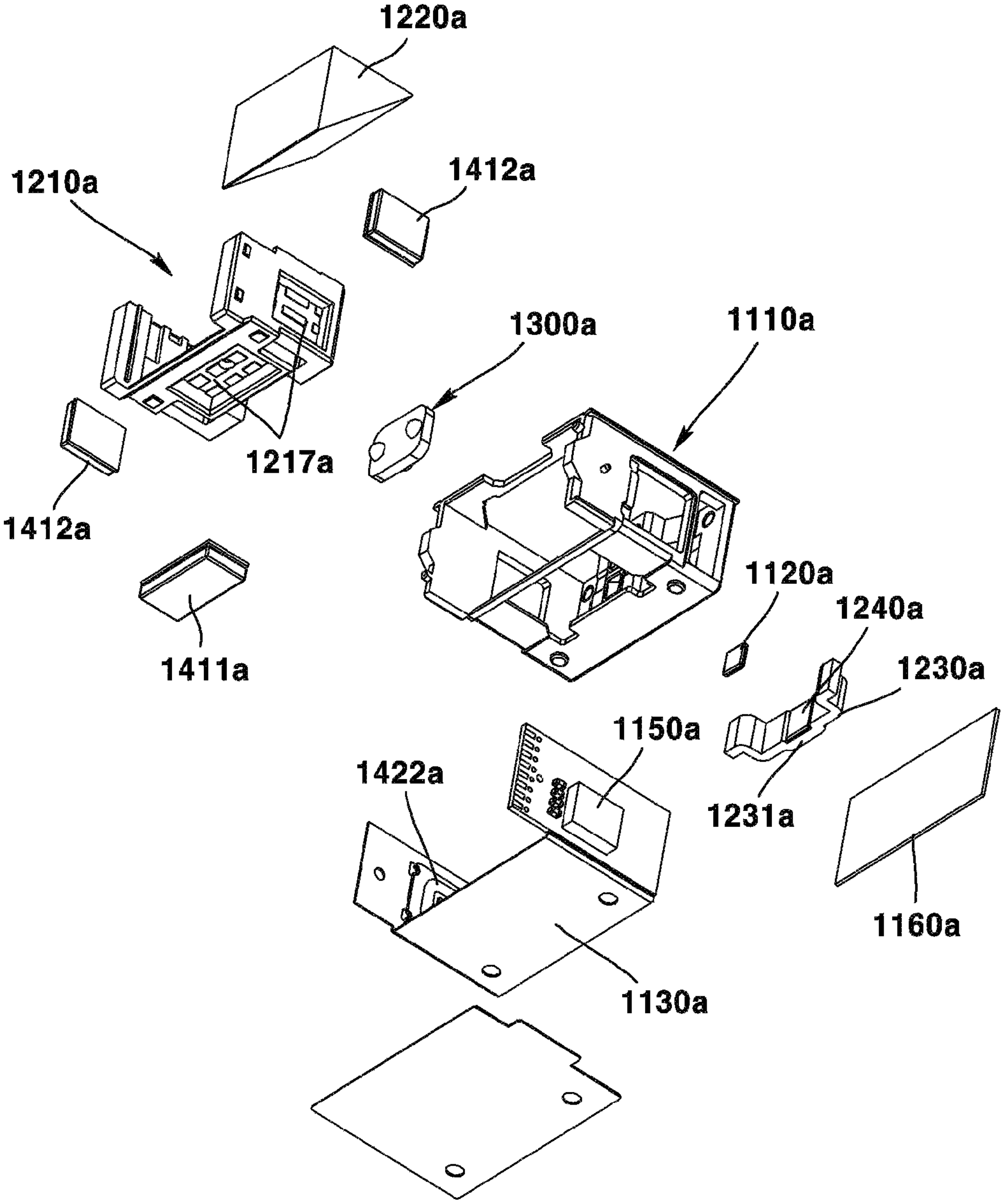

【FIG. 19】
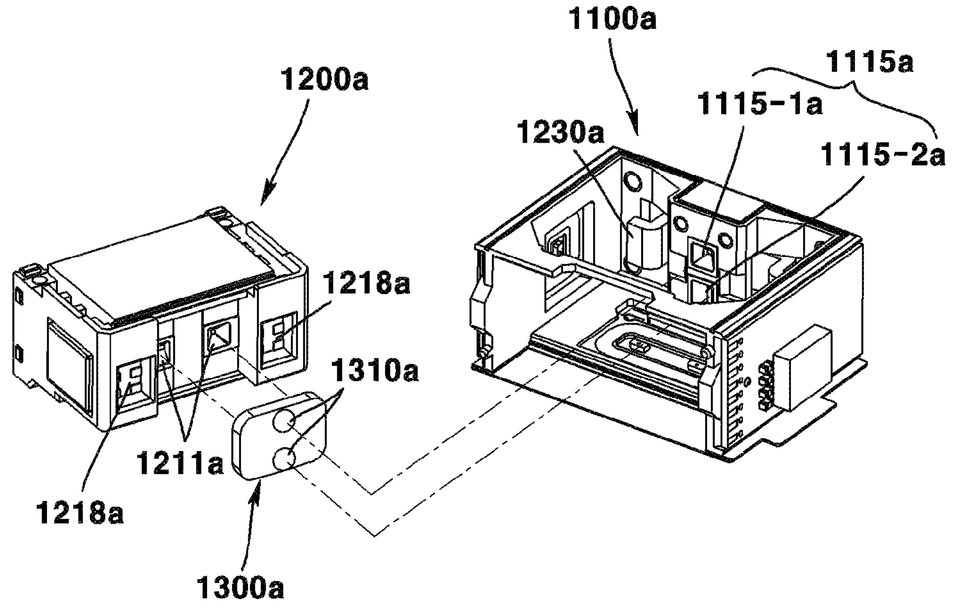
【FIG. 20】
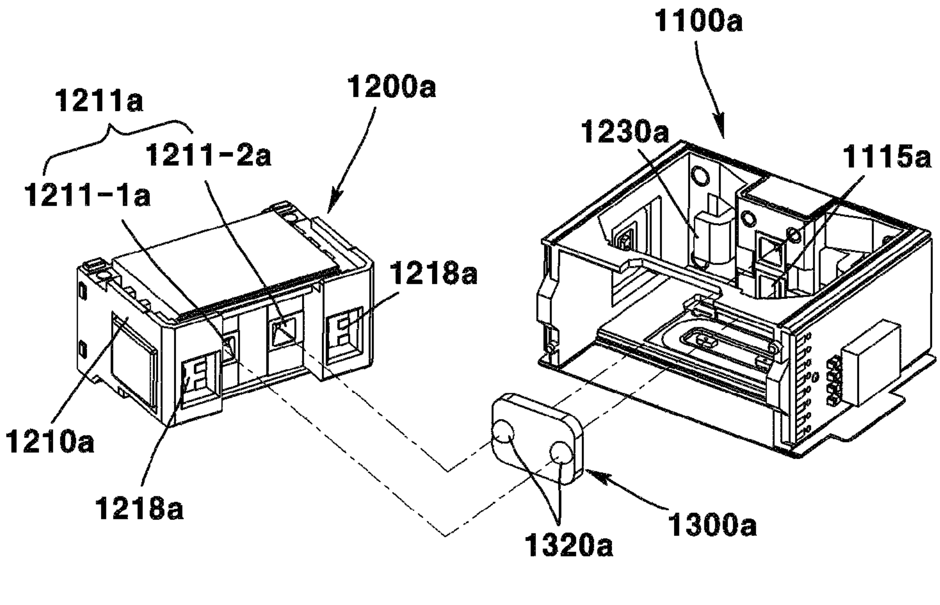

【FIG. 21】
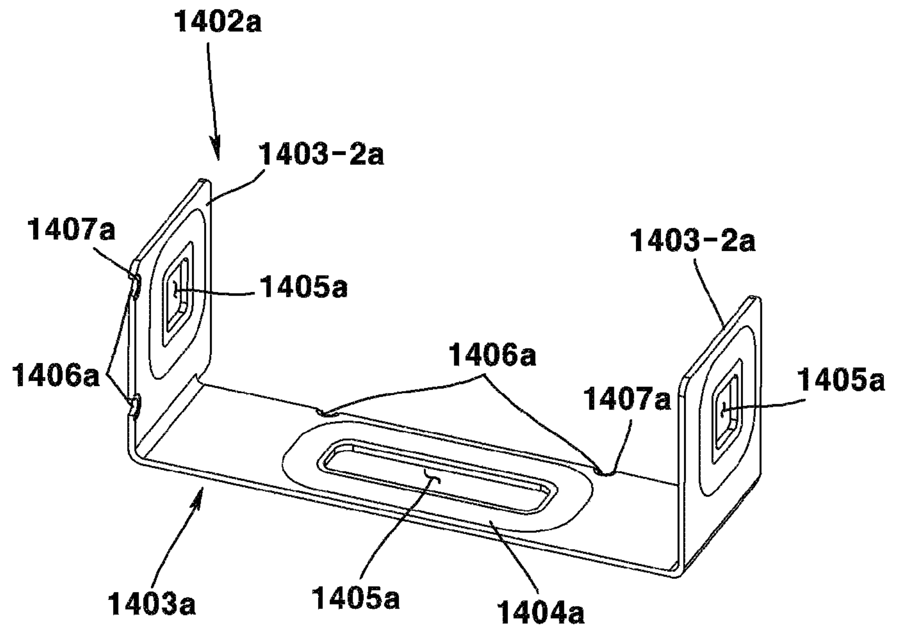
【FIG. 22】
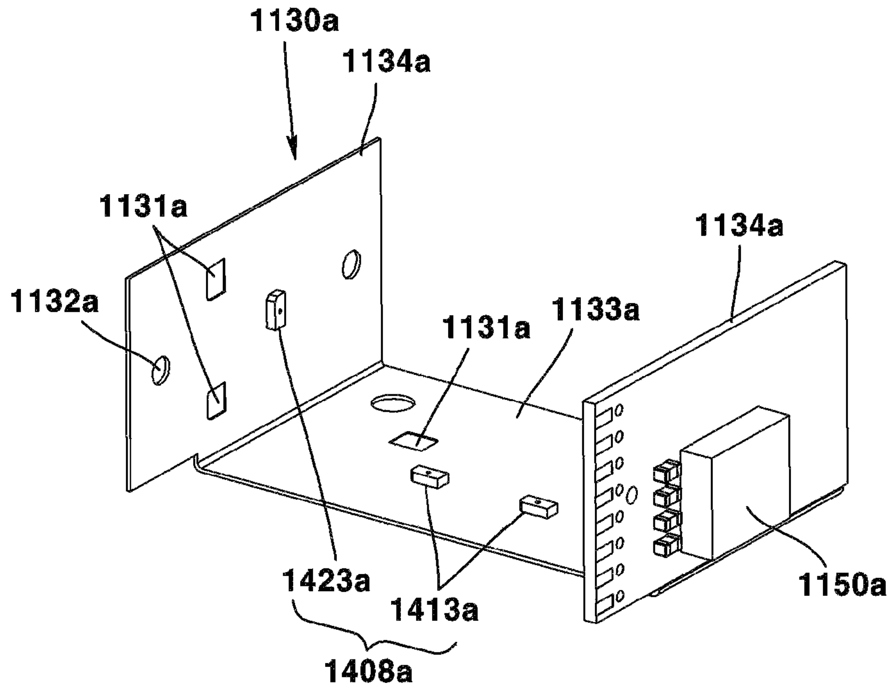

【FIG. 23】
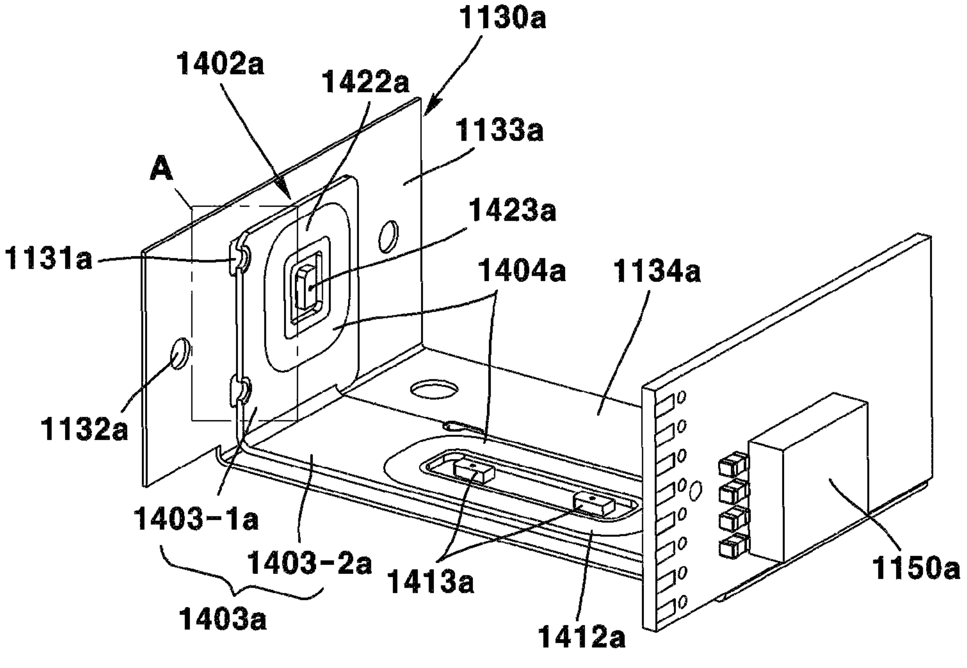

【FIG. 24】
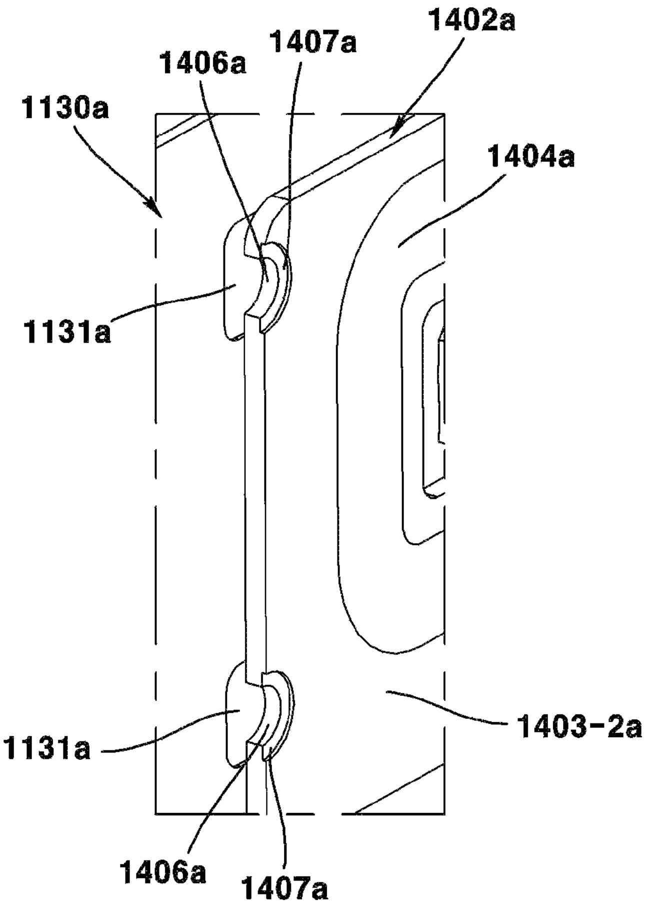
【FIG. 25】
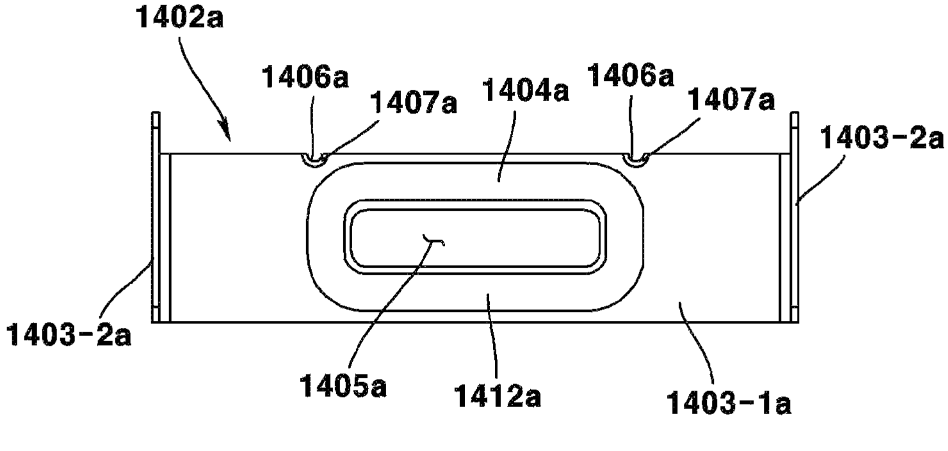

【FIG. 26】
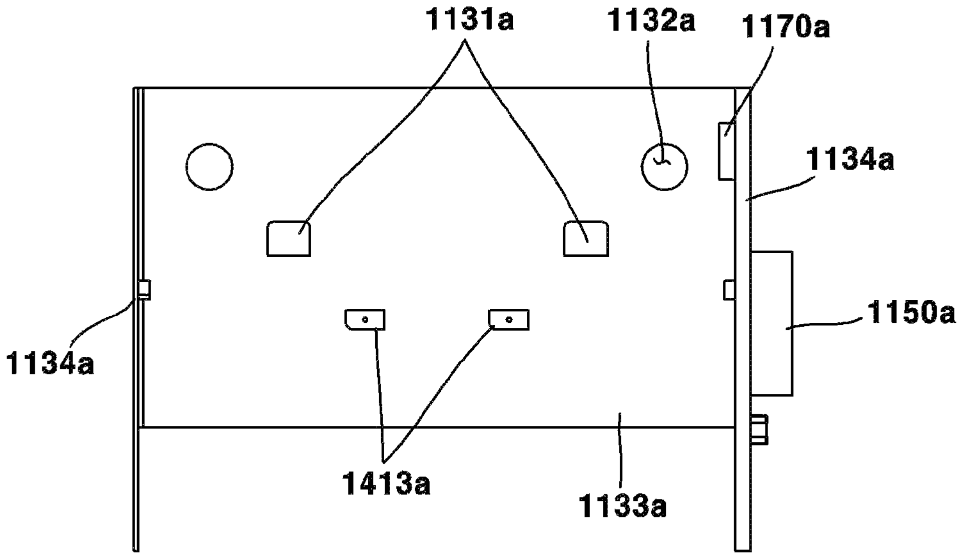
【FIG. 27】
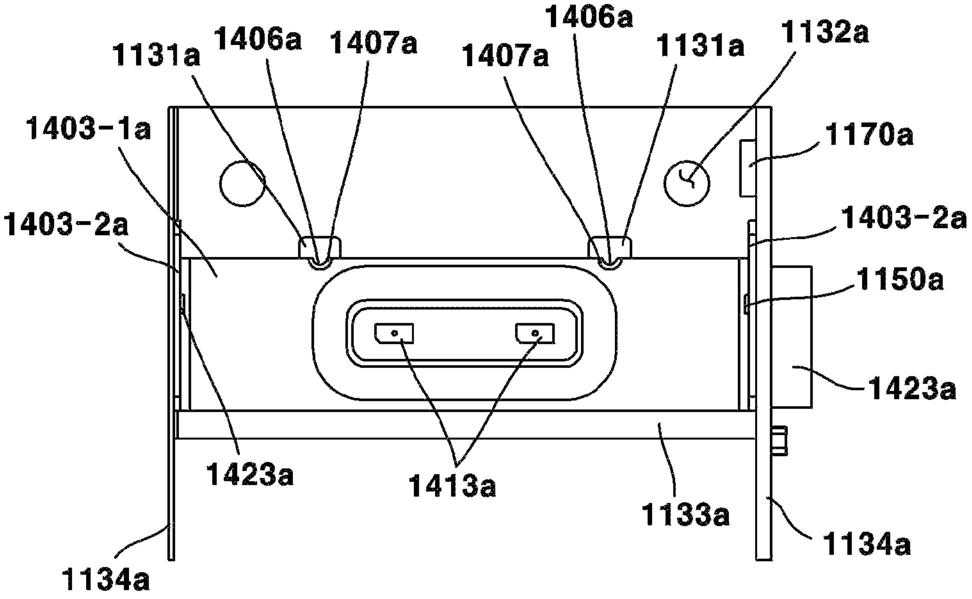

【FIG. 28】
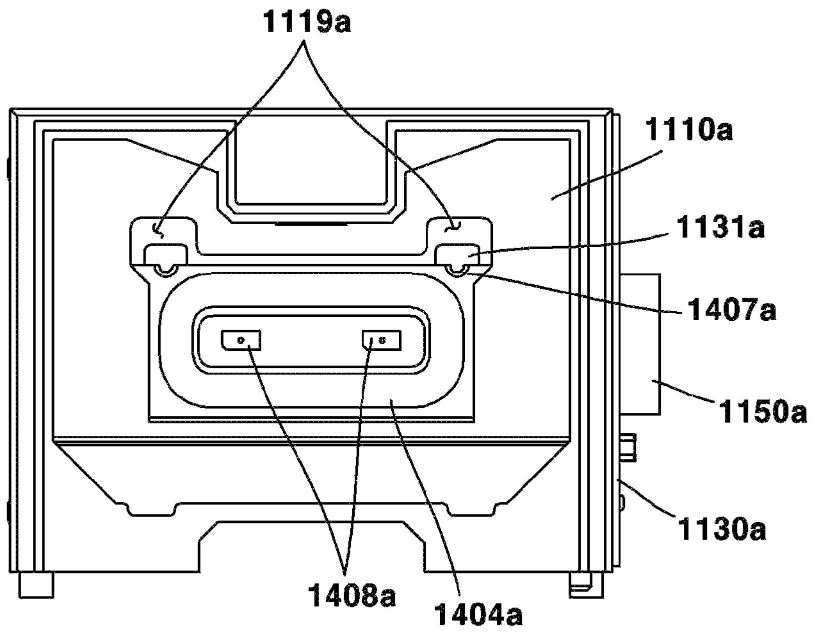
【FIG. 29】
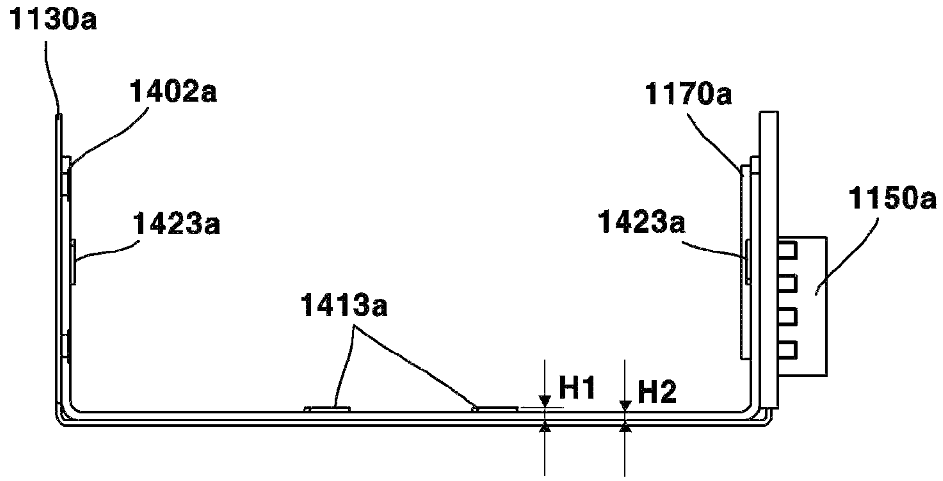

【FIG. 30】
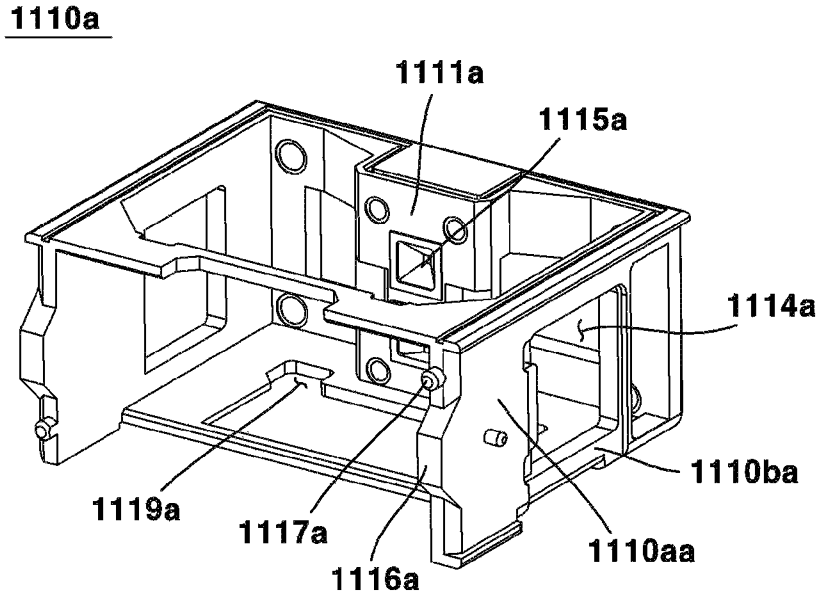
【FIG. 31】
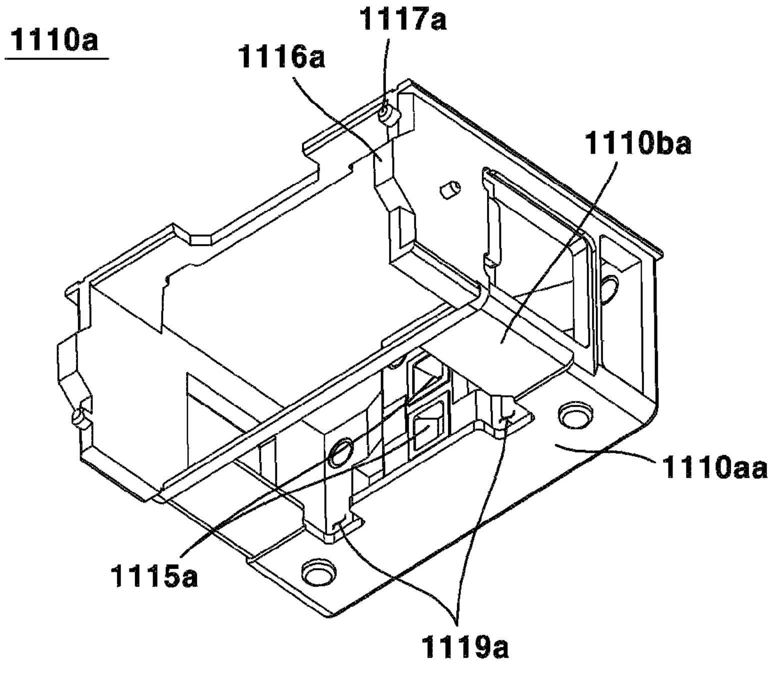

【FIG. 32】
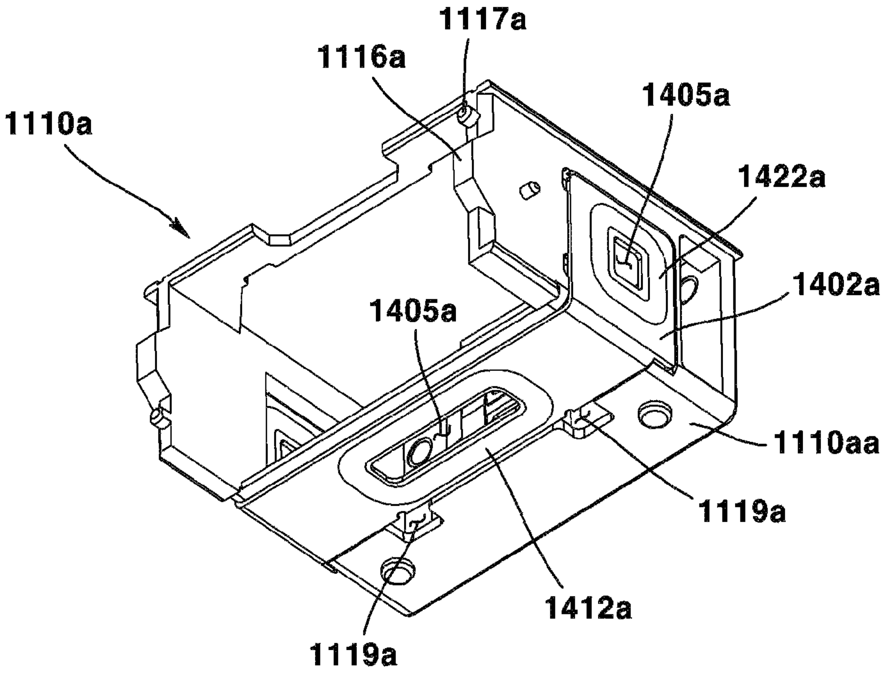
【FIG. 33】
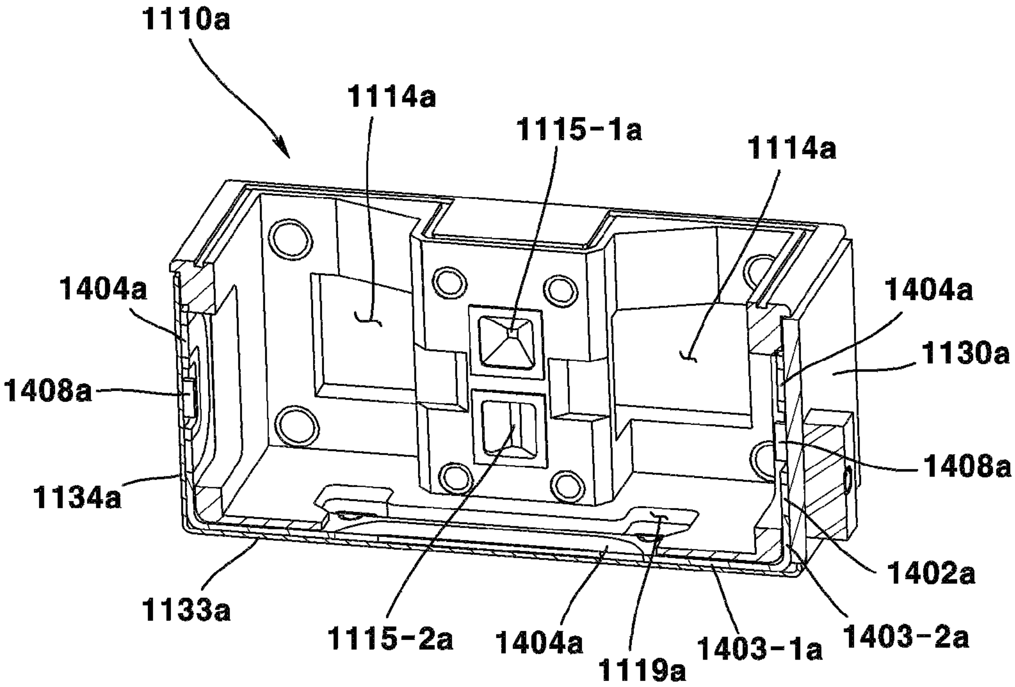

【FIG. 34】
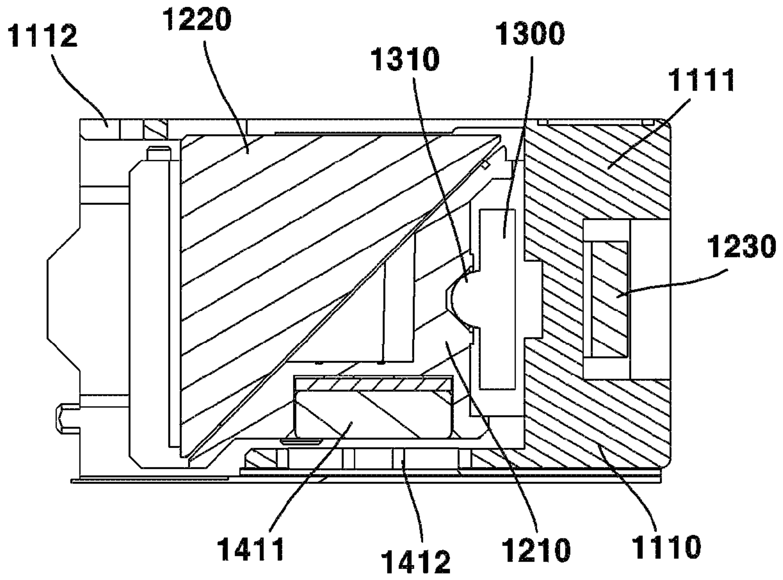
【FIG. 35】
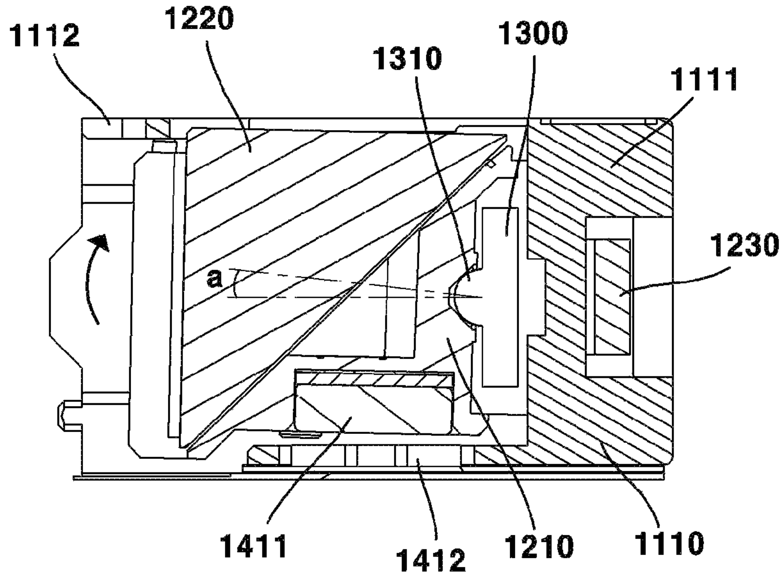

【FIG. 36】
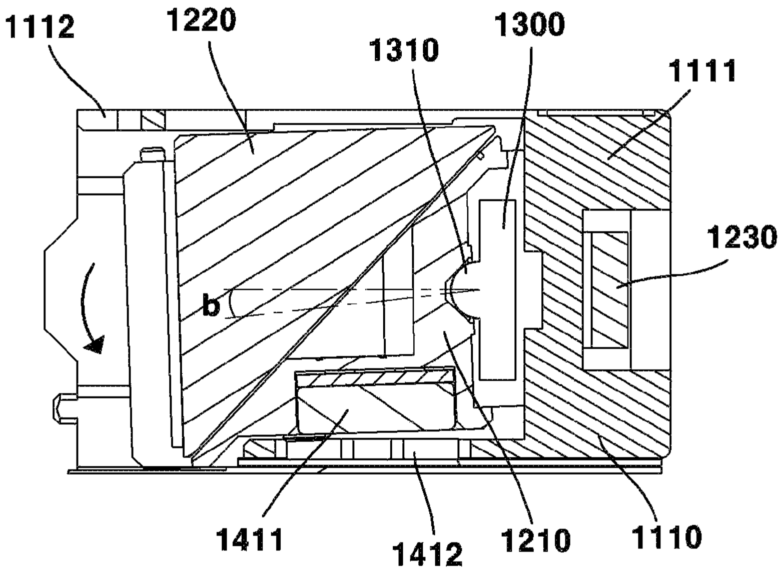
【FIG. 37】
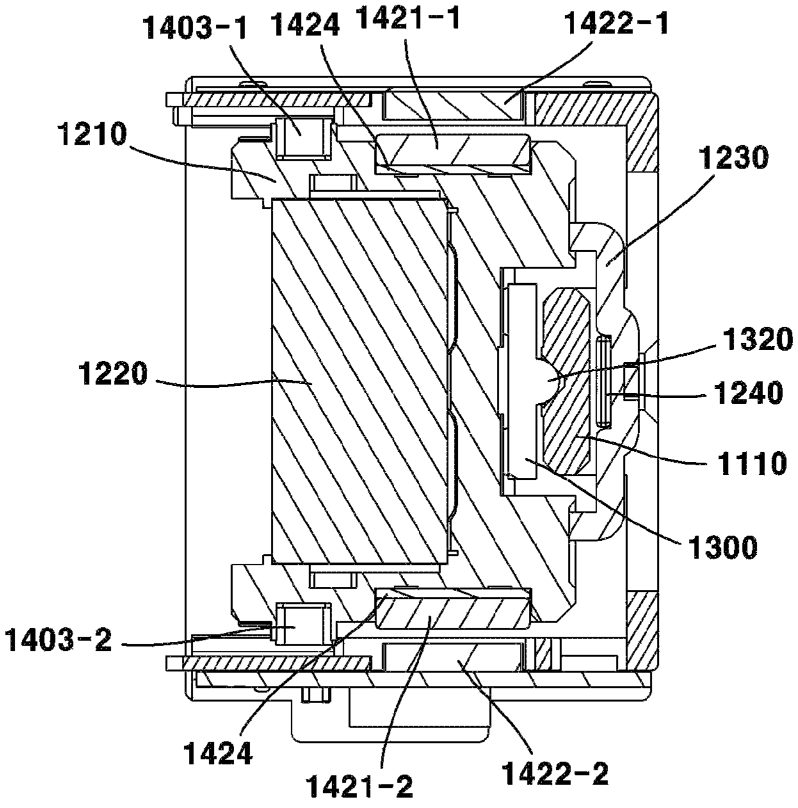

【FIG. 38】
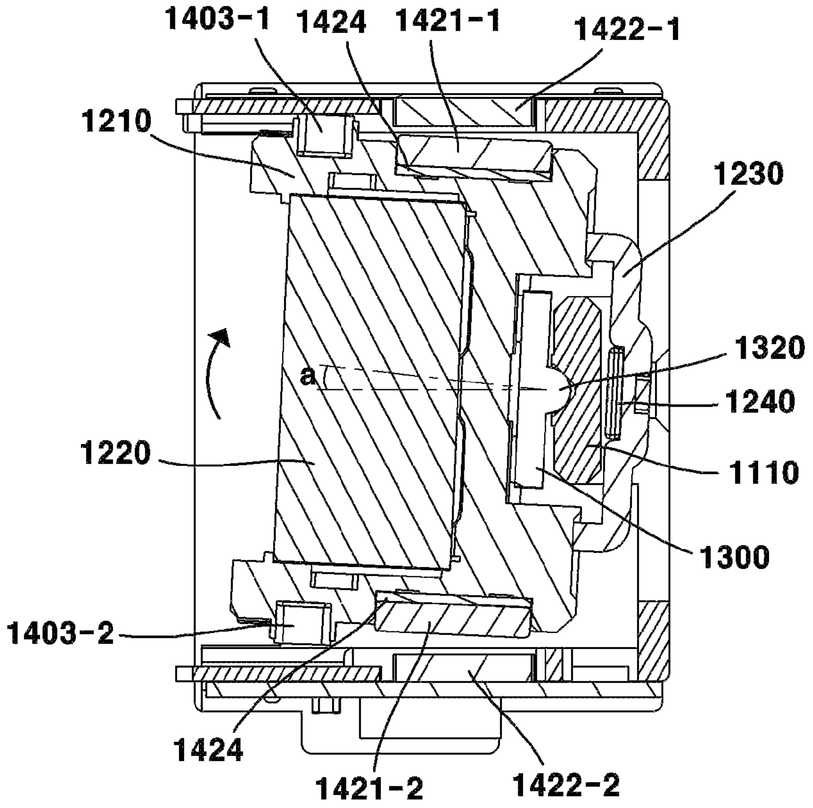

【FIG. 39】
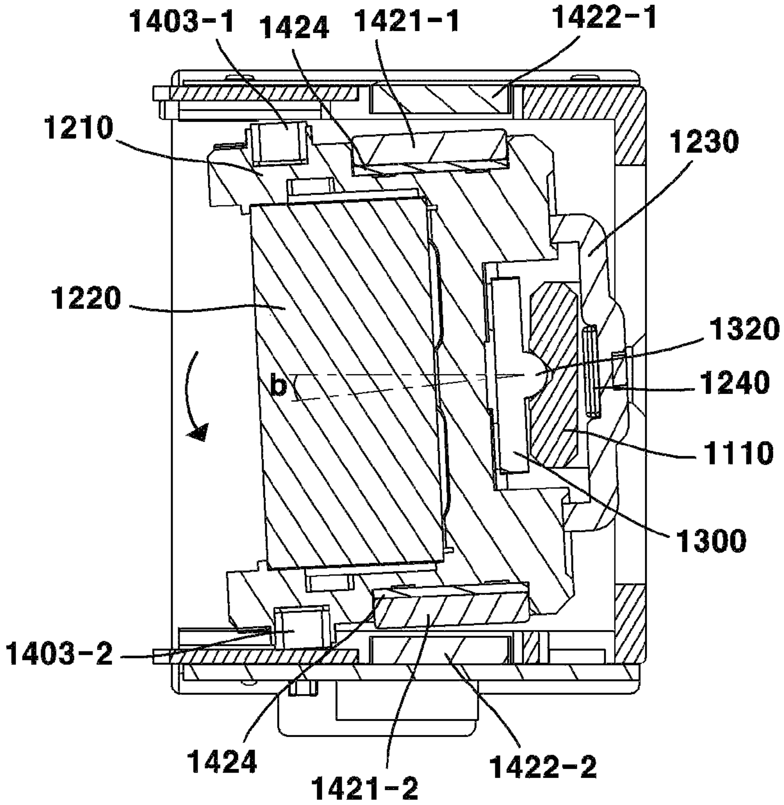

【FIG. 40】
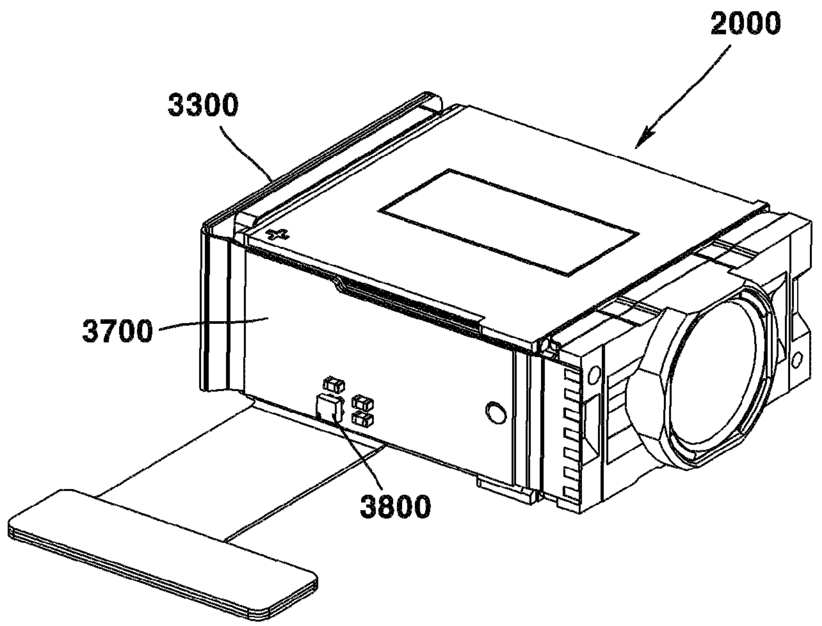
【FIG. 41】
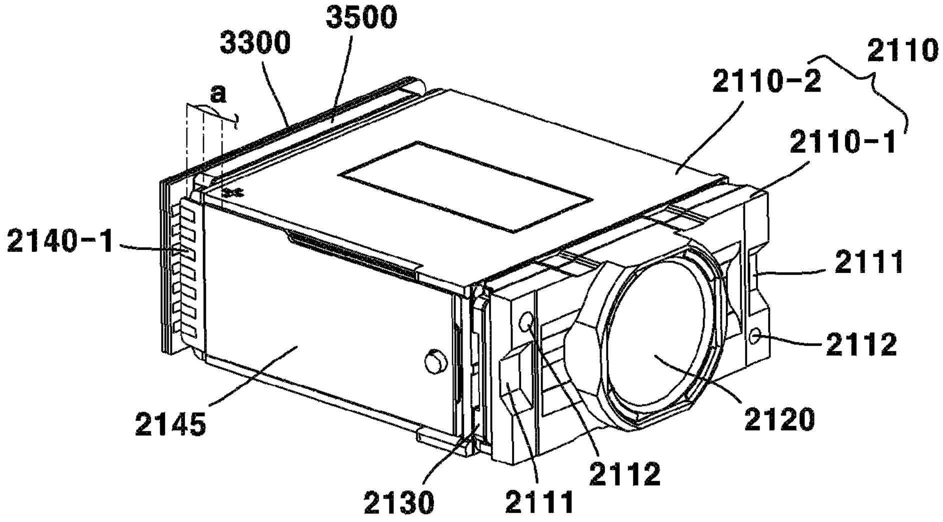

【FIG. 42】
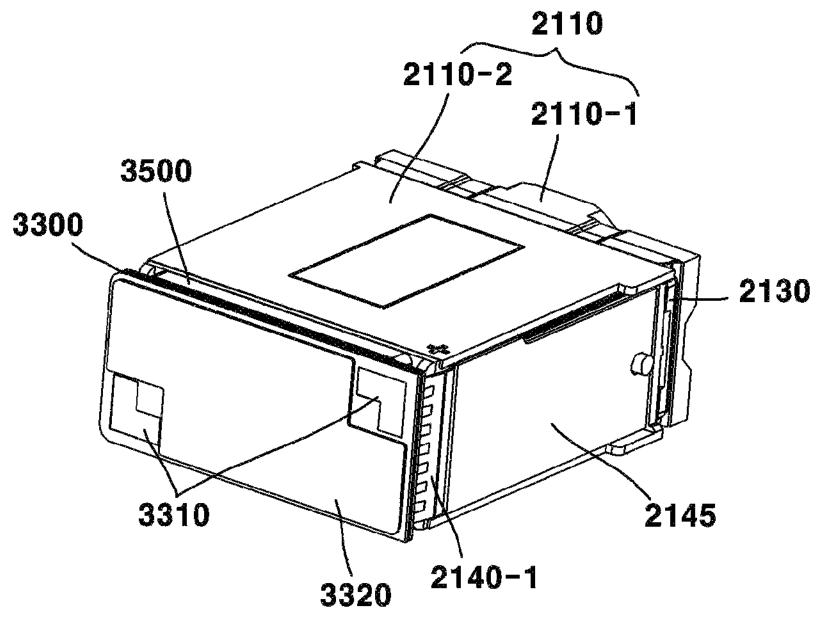
【FIG. 43】
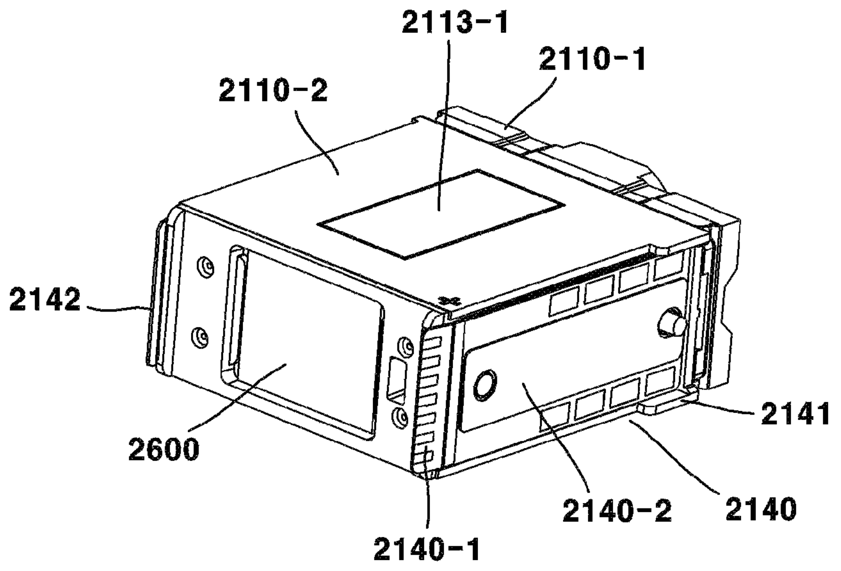

【FIG. 44】
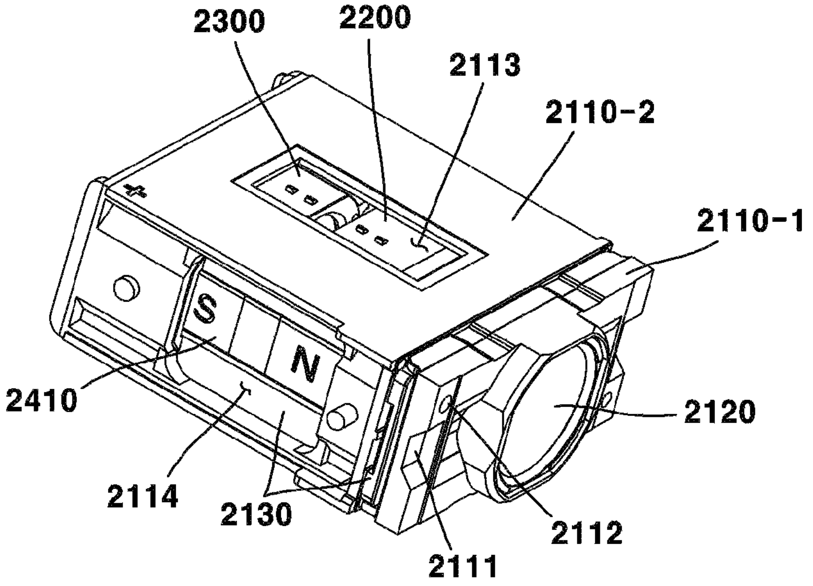
【FIG. 45】
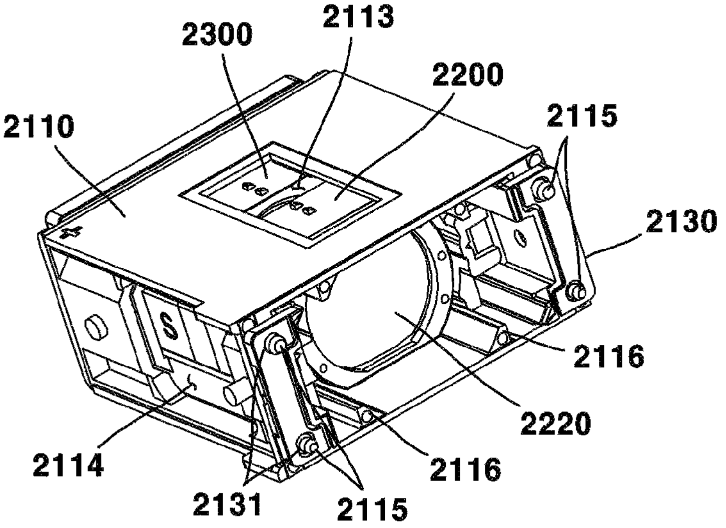

【FIG. 46】
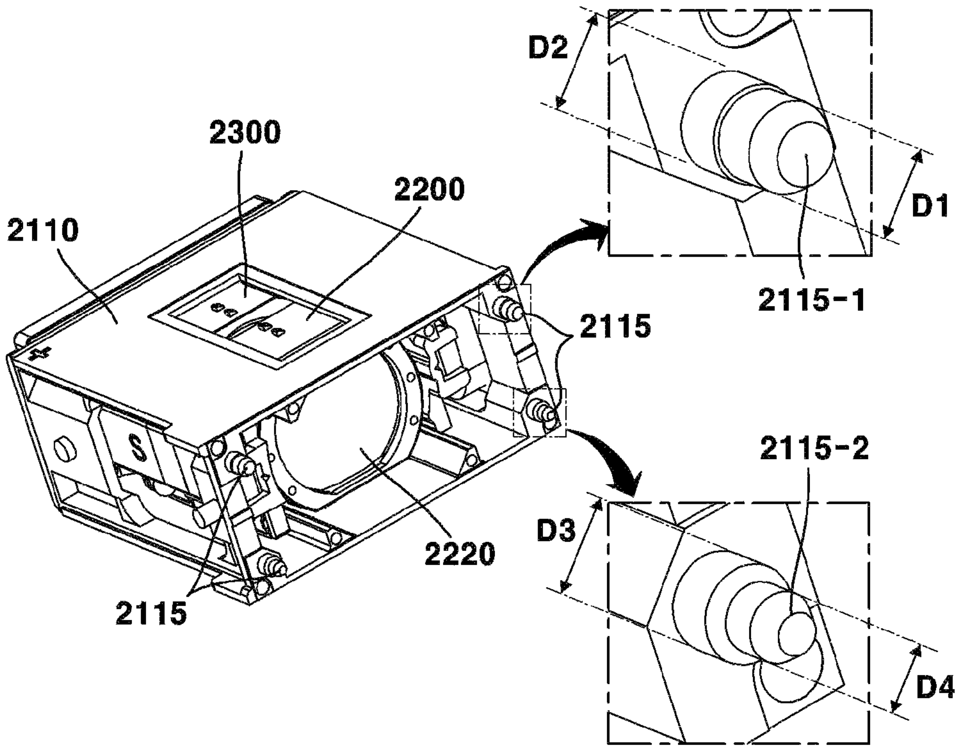

【FIG. 47】
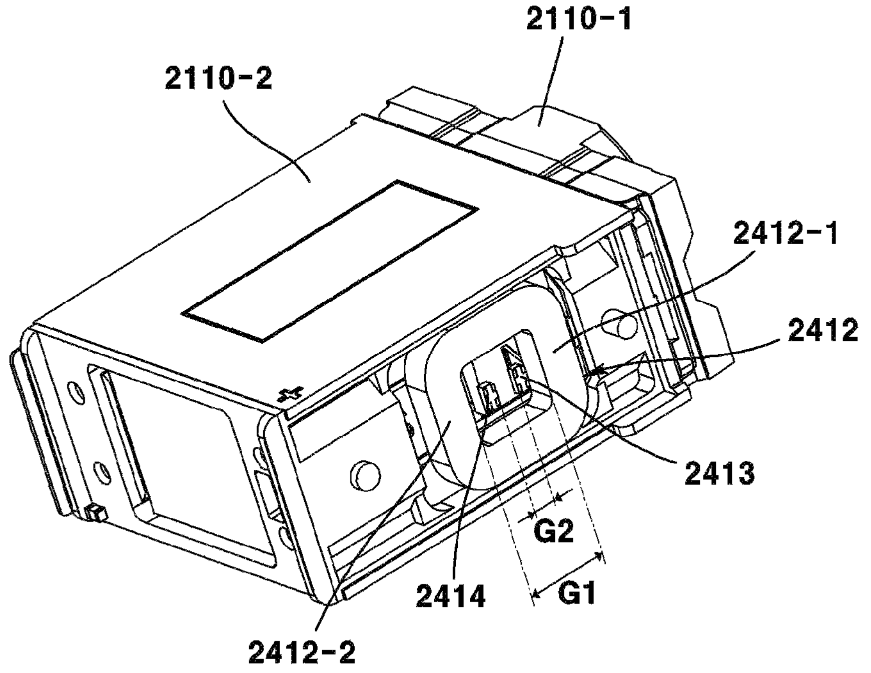
【FIG. 48】
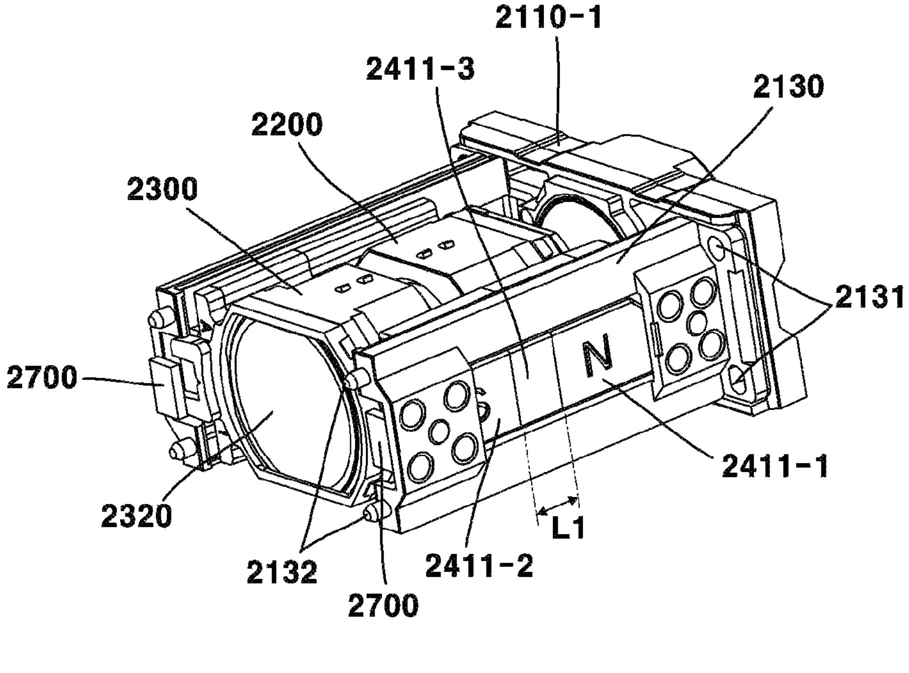

【FIG. 49】
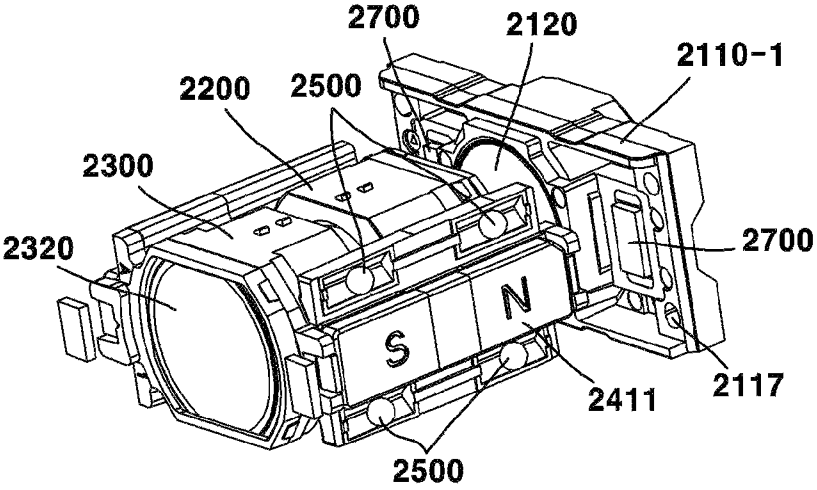
【FIG. 50】
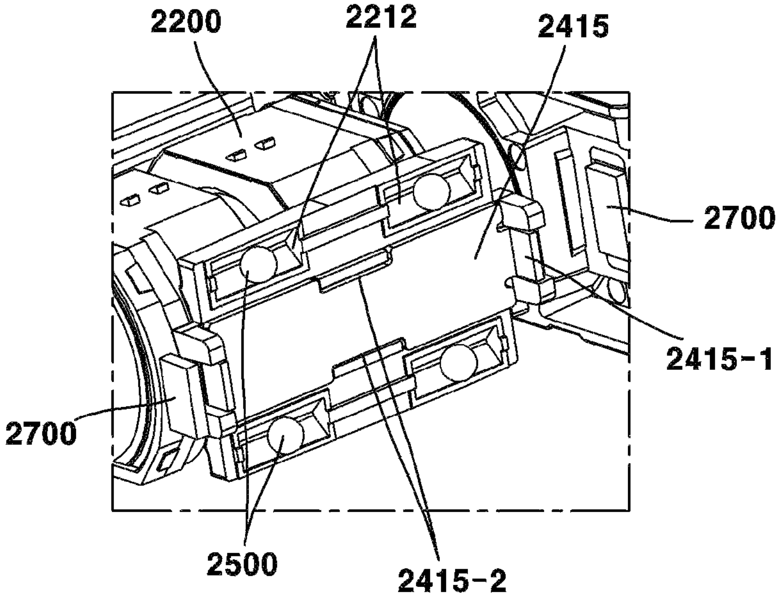

【FIG. 51】
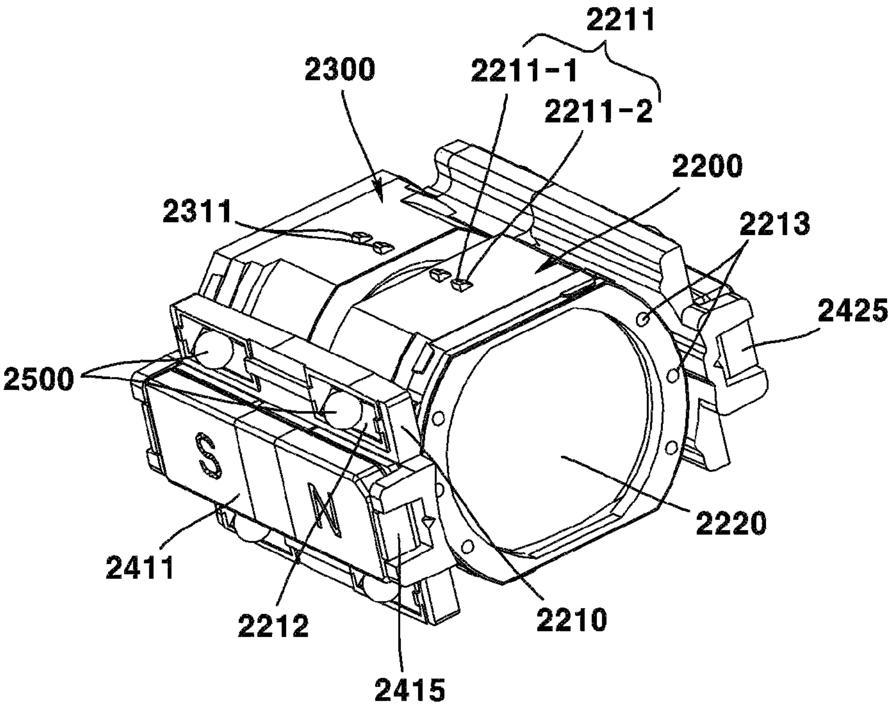
【FIG. 52】
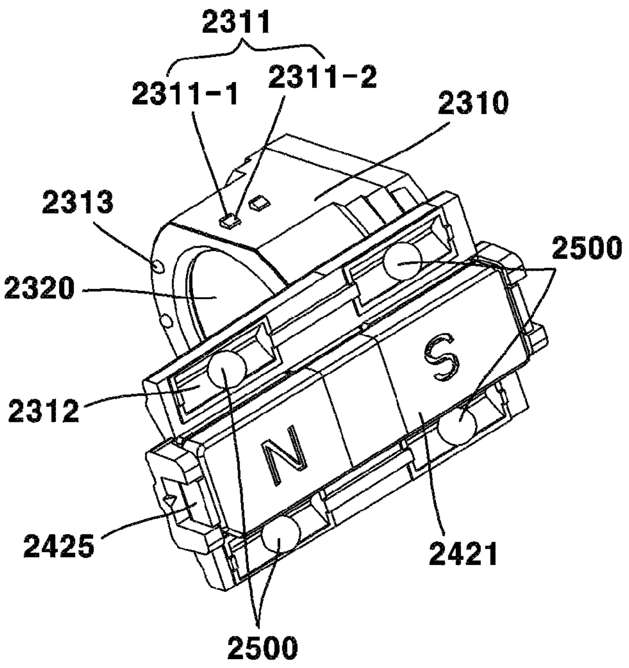

【FIG. 53】
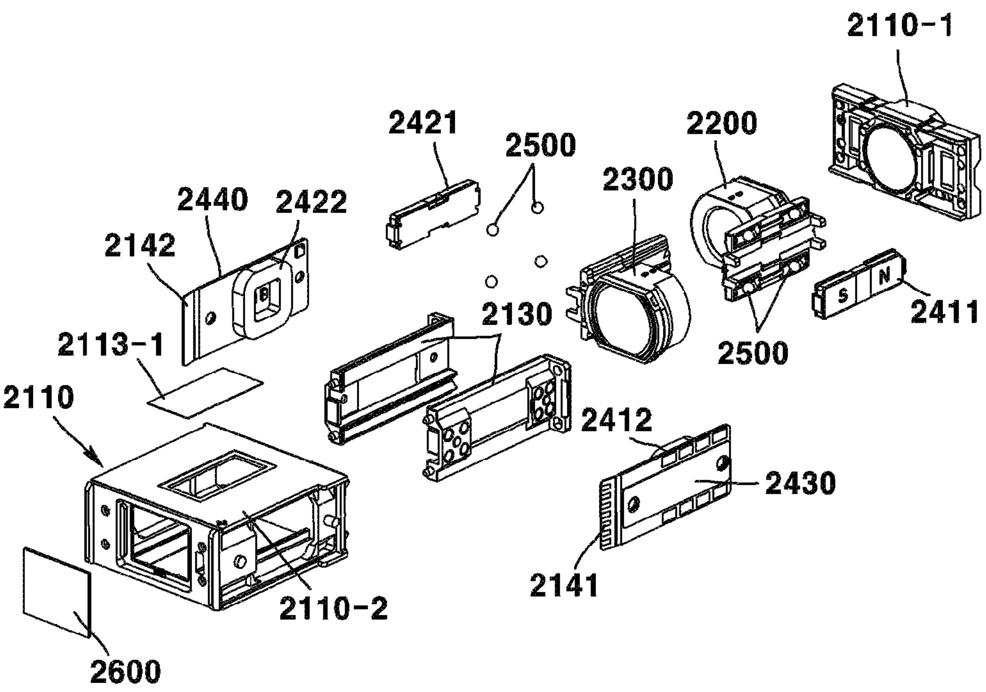
【FIG. 54】
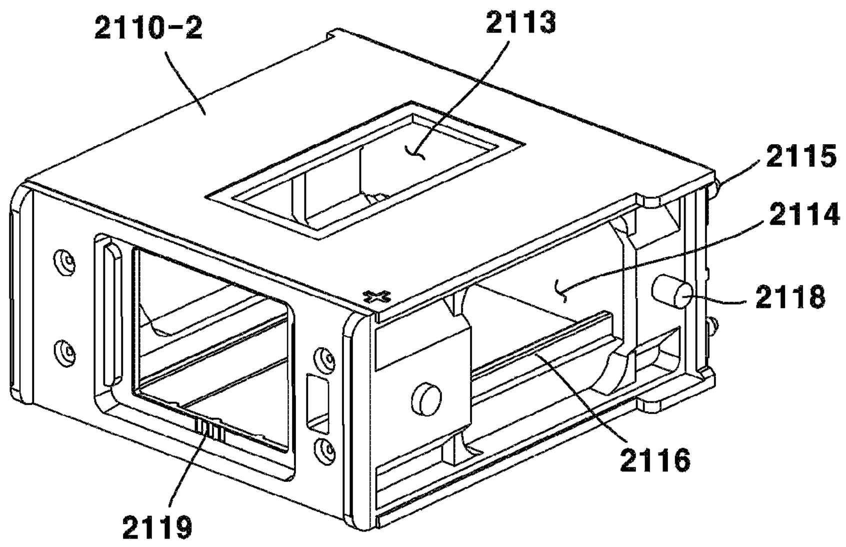

【FIG. 55】
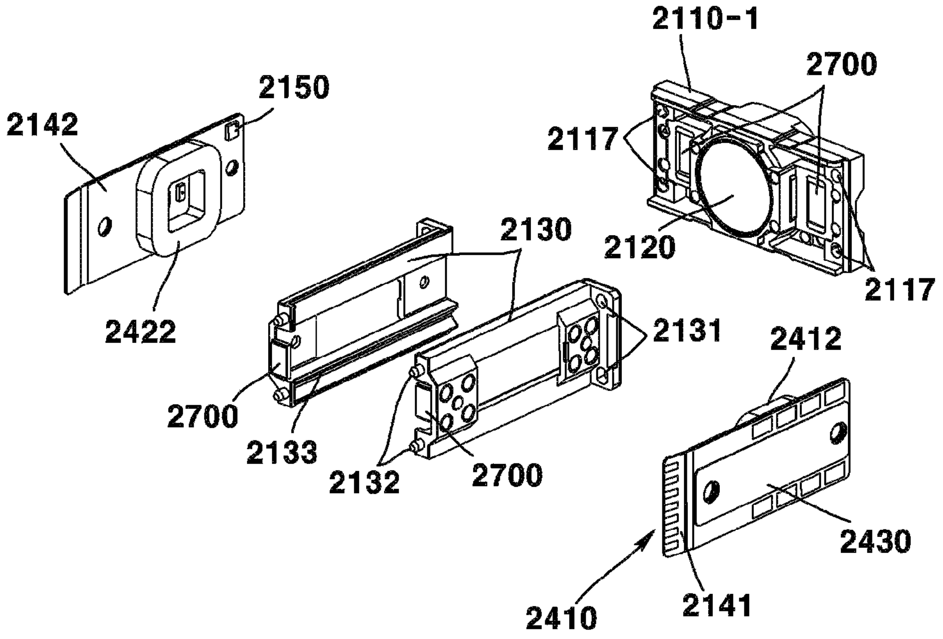
【FIG. 56】
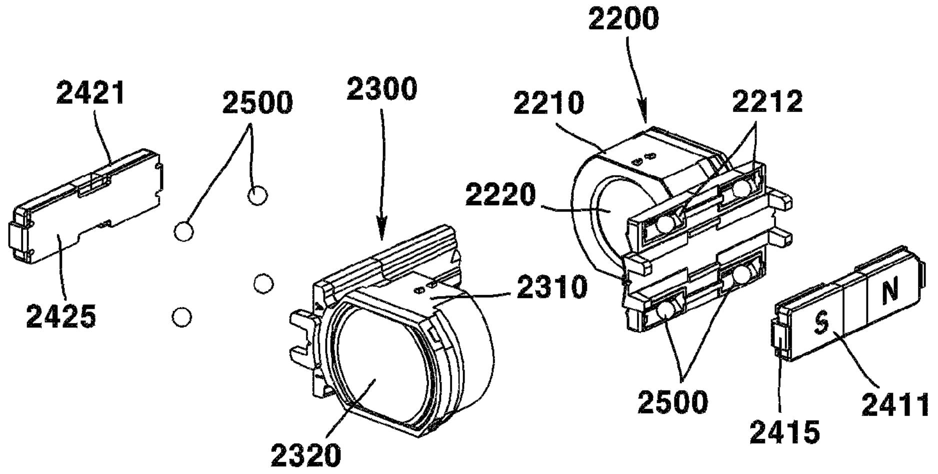

【FIG. 57】
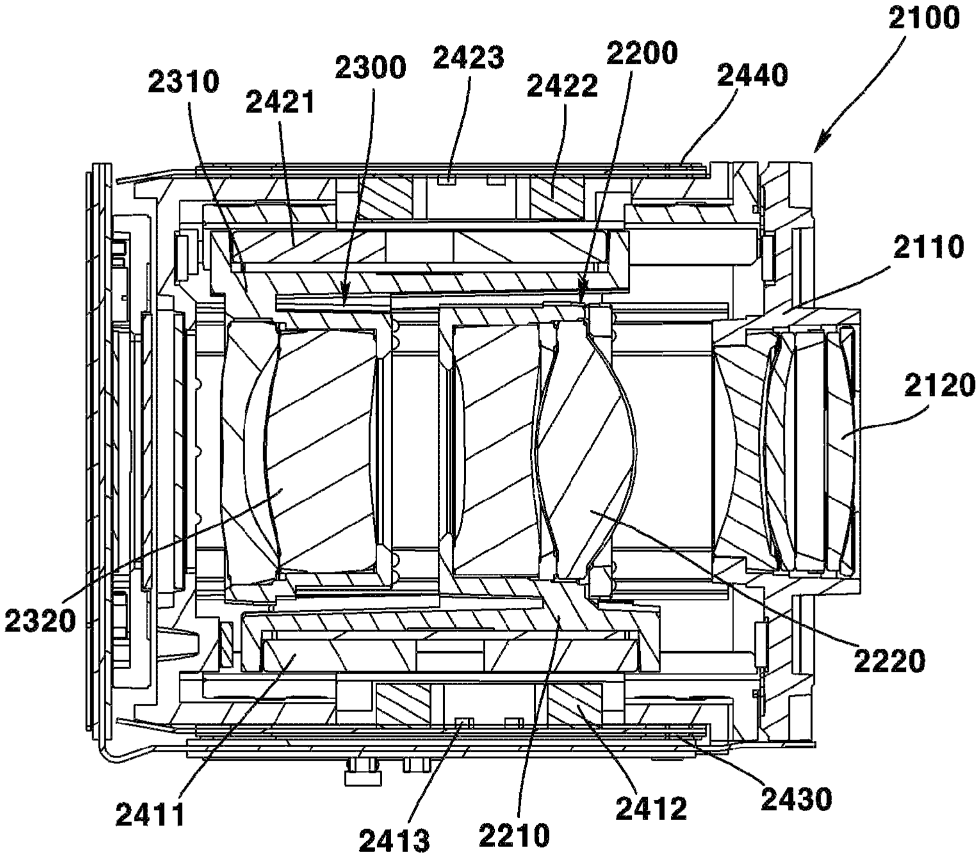

【FIG. 58】
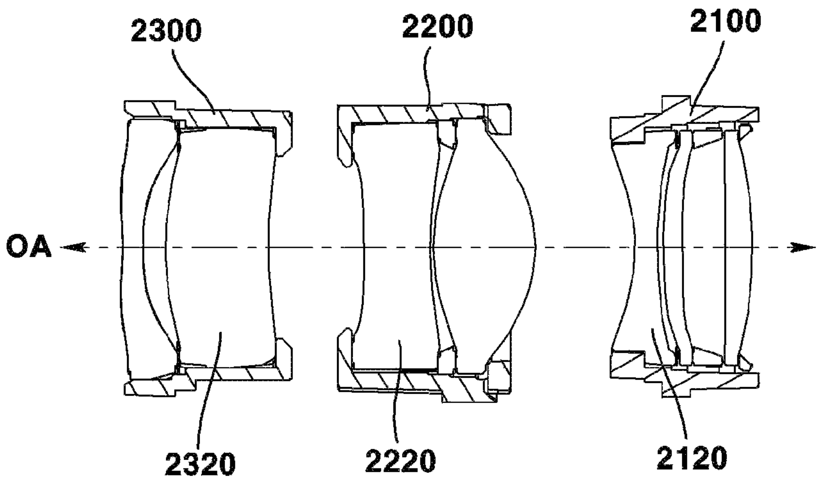
【FIG. 59】
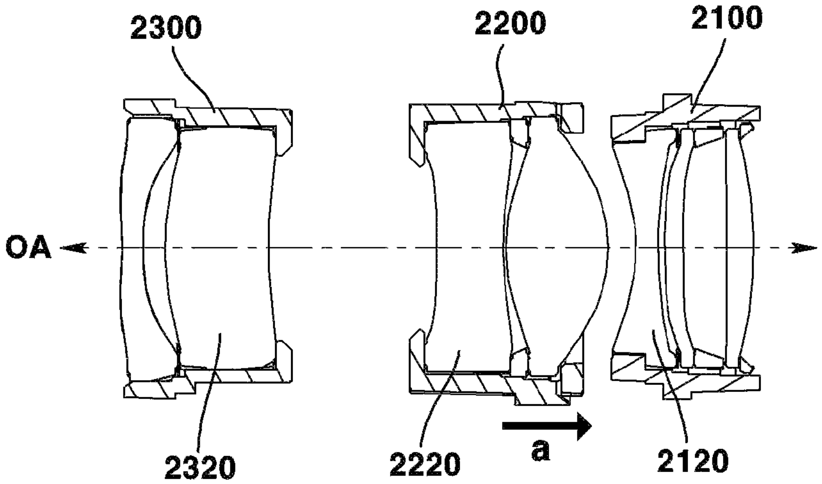

【FIG. 60】
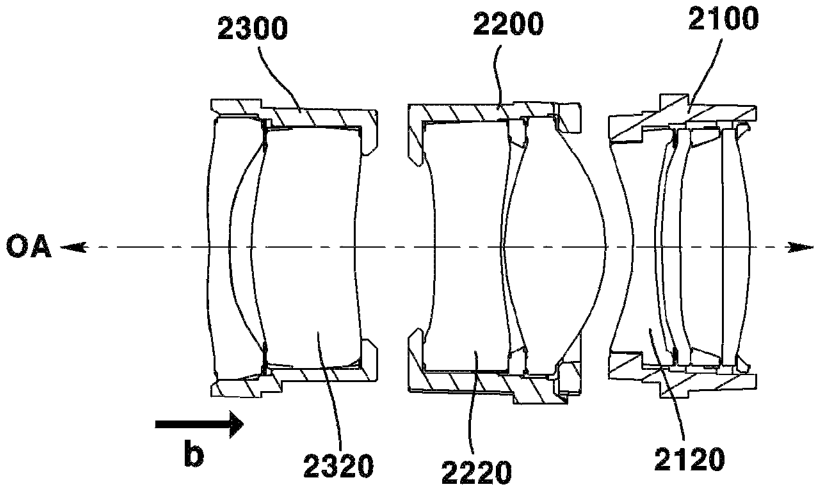

【FIG. 61】
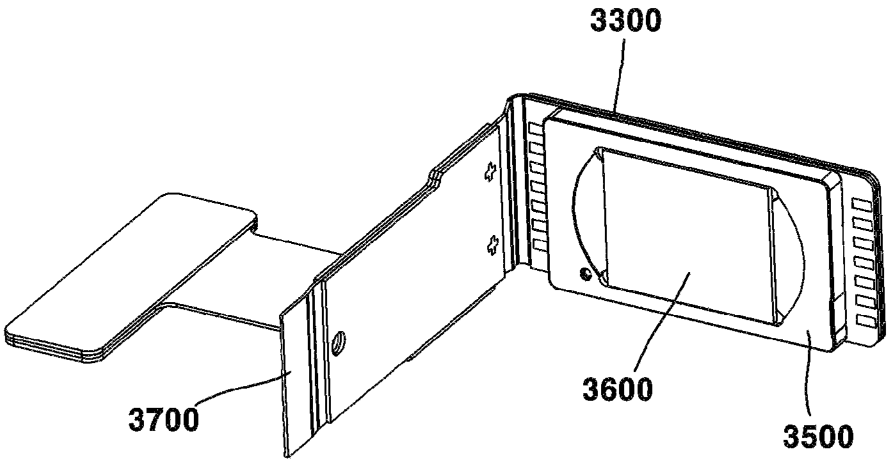
【FIG. 62】
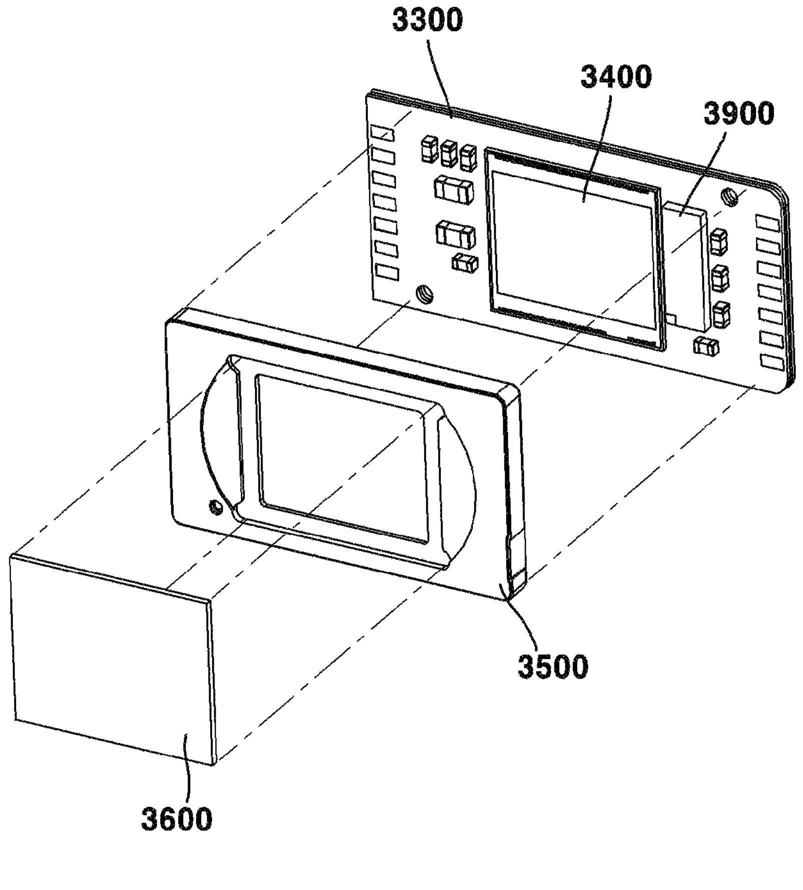

【FIG. 63】
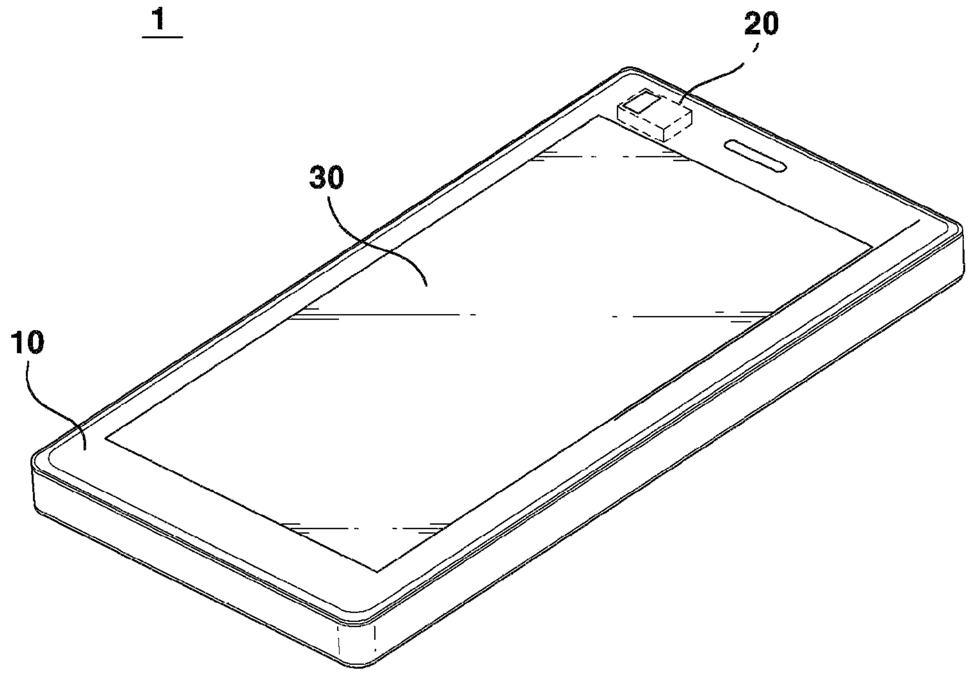

REFLECTIVE MEMBER DRIVING DEVICE

CROSS-REFERENCE TO RELATED PATENT APPLICATIONS

This application is a U.S. National Stage Application under 35 U.S.C. § 371 of PCT Application No. PCT/KR2022/004270, filed Mar. 25, 2022, which claims priority to Korean Patent Application Nos. 10-2021-0042991 and 10-2021-0042992, both filed Apr. 1, 2021, whose entire disclosures are hereby incorporated by reference.

TECHNICAL FIELD

The teachings in accordance with exemplary and non-limiting embodiments of this invention relate generally to a reflective member driving device.

BACKGROUND ART

A camera device is a device that takes pictures or videos of a subject, and it is mounted on optical devices such as smartphones, drones, and vehicles.

In recent years, camera devices have required optical image stabilization (OIS) function to compensate for image blurs caused by user movement to improve image quality, auto focus (AF) function to automatically adjust the distance between an image sensor and lens to align a focal length of the lens, and zoom function to increase or decrease the magnification of distant objects through a zoom lens.

DETAILED DESCRIPTION OF INVENTION

Technical Subject

The present exemplary embodiment aims to provide a reflective member driving device in which an OIS function is implemented by tilting the reflective member.

Furthermore, the present embodiment aims to provide a reflective member driving device in which a Hall output used for feedback control of an OIS function is improved.

Furthermore, the present embodiment aims to provide a reflective member driving device with minimized size.

Technical Solution

A reflective member driving device according to a first exemplary embodiment of the present invention may comprise: a housing; a holder which is disposed within the housing; a reflective member which is disposed in the holder; a moving plate which is disposed between the housing and the holder; a driving magnet and a sensing magnet which are disposed in the holder; a coil which electromagnetically interacts with the driving magnet; and a first sensor which senses the sensing magnet, wherein the driving magnet comprises a first magnet which tilts the reflective member about a first axis and a second magnet which tilts the reflective member about a second axis perpendicular to the first axis; and the sensing magnet is disposed at a location where the sensing magnet does not electromagnetically interact with the coil.

Preferably, but not necessarily, the first magnet may be disposed on a bottom surface of the holder, the second magnet may be disposed on two lateral surfaces of the holder, and the sensing magnet may be disposed on the two lateral surfaces of the holder.

Preferably, but not necessarily, the first sensor may detect a tilt about the first axis of the reflective member.

Preferably, but not necessarily, the reflective member driving device may comprise a second sensor for sensing the second magnet, the second sensor may sense a tilt about the second axis of the reflective member.

Preferably, but not necessarily, a distance between the sensing magnet and the first sensor may be shorter than a distance between the second magnet and the second sensor.

Preferably, but not necessarily, the sensing magnet may comprise a first surface facing the first sensor, the second magnet may comprise a first surface facing the second sensor, and an area of the first surface of the second magnet may be larger than an area of the first surface of the sensing magnet.

Preferably, but not necessarily, the sensing magnet may more protrude from the two lateral surfaces of the holder than the second magnet.

Preferably, but not necessarily, the second magnet may comprise a first sub-magnet disposed on a first lateral surface of the holder and a second sub-magnet disposed on a second lateral surface opposite the first lateral surface of the holder, and the sensing magnet may comprise a first sensing magnet disposed on the first lateral surface of the holder and a second sensing magnet disposed on the second lateral surface of the holder.

Preferably, but not necessarily, the first sensor may comprise a first sub-sensor sensing the first sensing magnet, and a second sub-sensor sensing the second sensing magnet, the second sensor may comprise a third sub-sensor sensing the first sub-magnet, and a fourth sub-sensor sensing the second sub-magnet, and a distance between the first sub-sensor and the second sub-sensor may be equal to a distance between the third sub-sensor and the fourth sub-sensor.

Preferably, but not necessarily, the sensing magnet may be further spaced apart from the moving plate than the second magnet.

Preferably, but not necessarily, the reflective member driving device may comprise a substrate disposed in a housing, the first sensor may be disposed in the substrate, the housing may comprise a hole in which the first sensor is disposed, and in the direction of the second axis, a length of the hole in the housing may be shorter than a length of the sensing magnet.

Preferably, but not necessarily, in the direction of the second axis, at least a portion of the sensing magnet may overlap the housing.

Preferably, but not necessarily, the coil may comprise a first coil facing the first magnet, and a second coil facing the second magnet, and in the direction of a third axis perpendicular to the first axis and the second axis, at least a portion of the sensing magnet may overlap the second coil.

A camera device according to the first exemplary embodiment of the present invention may comprise: a printed circuit board; an image sensor disposed on the printed circuit board; a reflective member driving device; and a lens disposed in an optical path formed by the reflective member of the reflective member driving device and the image sensor.

An optical apparatus according to the first exemplary embodiment of the present invention may comprise: a body; a camera device disposed on the body; and a display disposed on the body and outputting at least one of a video and an image taken by the camera device.

A reflective member driving device according to the first exemplary embodiment of the invention may comprise: a housing; a holder disposed within the housing; a reflective member disposed in the holder; a moving plate disposed between the housing and the holder; a first magnet and a second magnet disposed in the holder; a first coil for tilting the reflective member about a first axis through electromagnetic interaction with the first magnet; a second coil that tilts the reflective member about a second axis perpendicular to the first axis through electromagnetic interaction with the second magnet; a sensing magnet disposed on the holder; a first sensor sensing the sensing magnet; and a second sensor sensing the second magnet, wherein a distance between the sensing magnet and the first sensor may be shorter than a distance between the second magnet and the second sensor.

Preferably, but not necessarily, the first magnet may be disposed on a lower surface of the holder, the second magnet may be disposed on two lateral surfaces of the holder, and the sensing magnets may be disposed on the two lateral surfaces of the holder.

Preferably, but not necessarily, the sensing magnet may be further spaced apart from the moving plate than the second magnet.

Preferably, but not necessarily, in the direction of the second axis, at least a portion of the sensing magnets may overlap the housing.

A reflective member driving device according to a first exemplary embodiment of the present invention may comprise: a housing; a holder disposed within the housing; a reflective member disposed on the holder; a moving plate disposed between the housing and the holder; a first magnet disposed on a lower surface of the holder; a second magnet disposed on two lateral surfaces of the holder; a first coil disposed in a position corresponding to that of the first magnet; a second coil disposed in a position corresponding to that of the second magnet; sensing magnets disposed on the two lateral surfaces of the holder; and a first sensor for detecting the sensing magnets, wherein the sensing magnets may more protrude from the two lateral surfaces of the holder than the second magnets.

A reflective member driving device according to a first exemplary embodiment of the present invention may comprise: a housing; a holder disposed within the housing; a reflective member disposed on the holder; a moving plate disposed between the housing and the holder; a first magnet disposed on a lower surface of the holder; a second magnet disposed on a lateral surface of the holder; a sensing magnet disposed on the lateral surface of the holder; a first coil in electromagnetic interaction with the first magnet; a second coil in electromagnetic interaction with the second magnet; and a first Hall sensor sensing the sensing magnet.

Preferably, but not necessarily, the reflective member driving device may comprise a second Hall sensor sensing the second magnet.

A reflective member driving device according to a second exemplary embodiment of the present invention may comprise: a housing; a holder disposed in the housing; a reflective member disposed in the holder; a moving plate disposed between the housing and the holder; a magnet disposed in the holder; a substrate disposed in the housing; and a coil member disposed in the substrate, and the coil member may comprise an insulating portion and a coil formed as a patterned coil on the insulating portion to electromagnetically interact with the magnet.

Preferably, but not necessarily, the reflective member driving device may comprise a sensor disposed on the substrate for sensing the magnet, and a distance between the sensor and the magnet may be shorter than a distance between the coil and the magnet.

Preferably, but not necessarily, the reflective member driving device may comprise a sensor for detecting the magnet, the coil member may comprise a hole formed within the patterned coil, and the sensor may be disposed in the hole.

Preferably, but not necessarily, the coil member and the sensor are disposed on a first surface of the substrate, and a thickness from the first surface of the substrate of the coil member may be thinner than a thickness from the first surface of the substrate of the sensor.

Preferably, but not necessarily, the sensor may more protrude from the first surface of the substrate than the coil member.

Preferably, but not necessarily, the coil member is disposed on a first surface of the substrate, the substrate may comprise terminals formed on the first surface, the coil member may comprise a groove formed at a location corresponding to that of the terminals on the substrate, and terminals formed around the groove, and the terminals on the substrate and the terminals on the coil member may be electrically connected via soldering.

Preferably, but not necessarily, the housing may comprise a hole or groove circumventing the terminal of the substrate and the terminal of the coil member.

Preferably, but not necessarily, the magnet may comprise a first magnet disposed on a lower surface of the holder and a second magnet disposed on each lateral surface of the holder, the coil may comprise a first coil facing the first magnet and a second coil facing the second magnet, the insulating portion of the coil member may comprise a first portion on which the first coil is disposed and a second portion on which the second coil is disposed, and the second portion may be integrally formed with and bent from the first portion.

Preferably, but not necessarily, the second coil may comprise two coils disposed opposite each other with respect to the holder, and the two coils may be electrically connected to each other.

Preferably, but not necessarily, the housing may comprise a first groove in which the substrate is disposed.

Preferably, but not necessarily, the housing may comprise a second groove formed in the first groove, wherein the second groove of the housing may be formed at least partially in a shape corresponding to that of the coil member and at a depth corresponding to a thickness of the coil member.

Preferably, but not necessarily, the substrate may be formed larger than the coil member to cover an outer surface of the coil member.

Preferably, but not necessarily, the coil member may have a higher stiffness than the substrate.

A camera device according to a second exemplary embodiment of the present invention may comprise: a printed circuit board; an image sensor disposed on the printed circuit board; a reflective member driving device; and a lens disposed in an optical path formed by the image sensor and a reflective member of the reflective member driving device.

An optical apparatus according to a second exemplary embodiment of the present invention may comprise: a body; a camera device disposed on the body; and a display disposed on the body and outputting at least one of a video and an image taken by the camera instrument.

A reflective member driving device according to a second exemplary embodiment of the present invention may comprise: a housing; a holder disposed in the housing; a reflective member disposed in the holder; a moving plate disposed between the housing and the holder; a magnet disposed in the holder; an FPCB disposed in the housing; and an FP coil disposed on the FPCB, wherein the FP coil may comprise an insulating layer and a patterned coil formed on the insulating layer to electromagnetically interact with the magnet.

The reflective member driving device may comprise a sensor disposed on the FPCB and sensing the magnet, and in a direction facing the magnet, a thickness of the FP coil may be less than a length of the sensor.

The housing may comprise a first groove in which the FPCB is disposed, and a second groove formed in the first groove and in which the FP coil is disposed.

The FP-coil may be formed separately from the FPCB and joined via soldering, and the FPCB may be formed with a thickness different from that of the FP-coil.

A reflective member driving device according to a second exemplary embodiment of the present invention may comprise: a housing; a holder disposed in the housing; a reflective member disposed in the holder; a moving plate disposed between the housing and the holder; a magnet disposed in the holder; a substrate disposed in the housing; a coil disposed in the substrate; and a sensor disposed in the substrate and sensing the magnet, wherein a distance between the sensor and the magnet may be shorter than a distance between the coil and the magnet.

A reflective member driving device according to a second exemplary embodiment of the present invention may comprise: a housing; a holder disposed within the housing; a reflective member disposed on the holder; a moving plate disposed between the housing and the holder; a magnet disposed on the holder; a substrate disposed on the housing; and a coil member disposed on the substrate, wherein the coil member may be formed as a patterned coil.

The patterned coil may be solderably coupled to the substrate.

The coil member may comprise a first coil for tilting the holder about a first axis, and a second coil for tilting the holder about a second axis perpendicular to the first axis, wherein the first coil and the second coil may be formed into a single member.

The second coil may be disposed in a bent position relative to the first coil.

Advantageous Effects of Invention

Through the first exemplary embodiment of the present invention, the Hall output for feedback control of the x-axis tilt of the reflective member driving device may be improved.

Thus, it may be effective for noise suppression.

Furthermore, tuning for current control is easier and an improved suppression ratio can be expected.

With the second exemplary embodiment of the present invention, the size of the reflective member driving device may be minimized.

Furthermore, the assembly process of the reflective member driving device can be simplified and the yield can be improved.

Furthermore, the Hall output detected by the Hall sensor to feedback the movement of the reflective member can be increased.

BRIEF DESCRIPTION OF DRAWINGS

FIG. 1 is a perspective view of a camera device according to an exemplary embodiment of the present invention.

FIG. 2 is a bottom surface perspective view of a camera device according to an exemplary embodiment of the present invention.

FIG. 3 is a plan view of camera device according to an exemplary embodiment of the present invention.

FIG. 4 is a cross-sectional view of FIG. 3 taken along line A-A.

FIG. 5 is an exploded perspective view of a camera device according to an exemplary embodiment of the present invention.

FIG. 6 is a perspective view of a reflective member driving device according to a first exemplary embodiment of the present invention.

FIG. 7 is an exploded perspective view of a reflective member driving device according to the first exemplary embodiment of the present invention.

FIG. 8 is a bottom exploded perspective view of a reflective member driving device according to the first exemplary embodiment of the present invention.

FIGS. 9 and 10 are drawings to illustrate a structure related to a moving plate of a reflective member driving device according to a first exemplary embodiment of the present invention.

FIG. 11 is a perspective view of a partial configuration of a reflective member driving device according to a first exemplary embodiment of the present invention.

FIG. 12 is a cross-sectional view of the reflective member driving device in the state shown in FIG. 11.

FIG. 13 is a perspective view of a partial configuration of a reflective member driving device according to a first exemplary embodiment of the present invention.

FIG. 14 is a top view of a partial configuration of a reflective member driving device according to a first exemplary embodiment of the present invention.

FIG. 15 is a cross-sectional view of a partial configuration of a reflective member driving device according to a first exemplar embodiment of the present invention.

FIG. 16 is a perspective view to illustrate the arrangement of magnets, coils, and sensors of a reflective member driving device according to a first exemplary embodiment of the present invention.

FIG. 17 is an exploded perspective view of a reflective member driving device according to a second embodiment of the present invention.

FIG. 18 is a bottom exploded perspective view of a reflective member driving device according to a second embodiment of the present invention.

FIGS. 19 and 20 are drawings to illustrate a structure related to a moving plate of a reflective member driving device according to a second embodiment of the present invention.

FIG. 21 is a perspective view of the FP coil of the reflective member driving device according to the second embodiment of the present invention.

FIG. 22 is a perspective view of a substrate and related configuration of a reflective member driving device according to a second embodiment of the present invention.

FIG. 23 is a perspective view of the FP coil of the reflective member driving device according to the second embodiment of the present invention in combination with a substrate.

FIG. 24 is an enlarged view of portion A of FIG. 23.

FIG. 25 is a top view of an FP coil of a reflective member driving device according to a second embodiment of the present invention.

FIG. 26 is a top view of a substrate and associated configuration of a reflective member driving device according to a second embodiment of the present invention.

FIG. 27 is a top view of the FP coil and substrate of the reflective member driving device according to the second embodiment of the present invention in a combined state.

FIG. 28 is a top view of the FP coil of the reflective member driving device according to the second embodiment of the present invention with the substrate coupled to the housing.

FIG. 29 is a front view of the FP coil and substrate of the reflective member driving device according to the second embodiment of the present invention.

FIG. 30 is a perspective view of the housing of the reflective member driving device according to the second embodiment of the present invention.

FIG. 31 is a bottom perspective view of a housing of a reflective member driving device according to a second embodiment of the present invention.

FIG. 32 is a bottom perspective view of the housing of the reflective member driving device according to the second embodiment of the present invention with an FP coil disposed therein.

FIG. 33 is a cross-sectional view of the housing, FP coil, and substrate of the reflective member driving device according to the second embodiment of the present invention.

FIGS. 34 to 36 are drawings to illustrate a tilt about the X-axis of a reflective member driving device according to an exemplary embodiment of the present invention.

FIGS. 37 to 39 are drawings to illustrate a tilt about a y-axis of a reflective member driving device according to an exemplary embodiment of the present invention.

FIG. 40 is a perspective view of a lens driving device according to an exemplary embodiment of the present invention.

FIG. 41 is a perspective view that omits some configurations of a lens driving device according to an exemplary embodiment of the present invention.

FIG. 42 is a perspective view of the lens driving device in the state shown in FIG. 41 from a different direction.

FIG. 43 is a perspective view of a lens driving device according to an exemplary embodiment of the present invention, omitting some configurations.

FIG. 44 is a perspective view of a lens driving device according to an exemplary embodiment of the present invention, with configurations such as a substrate and a coil omitted.

FIG. 45 is a perspective view of the lens driving device in the state shown in FIG. 44 with the first lens and related configurations omitted.

FIG. 46 is a perspective view and partial enlargement of a partial configuration of a lens driving device according to an exemplary embodiment of the present invention.

FIG. 47 is a drawing to illustrate the arrangement structure of the coils and sensors of the lens driving device according to an exemplary embodiment of the present embodiment.

FIG. 48 is a perspective view of the lens driving device shown in FIG. 44 with the second housing omitted.

FIG. 49 is a perspective view of the lens driving device in the state shown in FIG. 48 with the guide rails omitted.

FIG. 50 is an enlarged view of a partial configuration of a lens driving device according to an exemplary embodiment of the present invention.

FIG. 51 is a perspective view of the first and second moving parts and related configurations of a lens driving device according to an exemplary embodiment of the present invention.

FIG. 52 is a perspective view of the second moving part and related configurations of a lens driving device according to an exemplary embodiment of the present invention.

FIG. 53 is an exploded view of a lens driving device according to an exemplary embodiment of the present invention.

FIG. 54 is a perspective view of a second housing of a lens driving device according to an exemplary embodiment of the present invention.

FIGS. 55 and 56 are exploded views of some configurations of a lens driving device according to an exemplary embodiment of the present invention.

FIG. 57 is a cross-sectional view of a lens driving device according to an exemplary embodiment of the present invention.

FIGS. 58 through 60 are drawings to illustrate the implementation of zoom and autofocus functions of a lens driving device according to an exemplary embodiment of the present invention.

FIG. 61 is a perspective view of a partial configuration of a camera device according to an exemplary embodiment of the present invention.

FIG. 62 is an exploded view of an image sensor and filter and related configurations of a camera device according to an exemplary embodiment of the present invention.

FIG. 63 is a perspective view of an optical apparatus according to an exemplary embodiment of the present invention.

BEST MODE

Hereinafter, exemplary embodiments of the present invention will be described in detail with reference to the accompanying drawings.

However, the present invention is not limited to the specific embodiments described, but may be implemented in a variety of different forms, and one or more of its components may be optionally combined or substituted between embodiments within the scope of the present invention.

Furthermore, terms (comprising technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may comprise the plural unless the context otherwise requires, and references to "at least one (or more) of A and (or) B and C" may comprise one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can comprise cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" comprises not only when two components are in direct contact with each other, but also when one or more other components are formed or disposed between the two components. Furthermore, when expressed as "above" or "below", it may comprise the meaning of upward as well as downward with respect to a single component.

Hereinafter, a reflective member driving device according to a first exemplary embodiment of the present invention will be described with reference to the accompanying drawings.

FIG. 6 is a perspective view of a reflective member driving device according to a first exemplary embodiment of the present invention, FIG. 7 is an exploded perspective view of a reflective member driving device according to the first exemplary embodiment of the present invention, FIG. 8 is a bottom exploded perspective view of a reflective member driving device according to the first exemplary embodiment of the present invention, FIGS. 9 and 10 are drawings to illustrate a structure related to a moving plate of a reflective member driving device according to a first exemplary embodiment of the present invention, FIG. 11 is a perspective view of a partial configuration of a reflective member driving device according to a first exemplary embodiment of the present invention, FIG. 12 is a cross-sectional view of the reflective member driving device in the state shown in FIG. 11, FIG. 13 is a perspective view of a partial configuration of a reflective member driving device according to a first exemplary embodiment of the present invention, FIG. 14 is a top view of a partial configuration of a reflective member driving device according to a first exemplary embodiment of the present invention, FIG. 15 is a cross-sectional view of a partial configuration of a reflective member driving device according to a first exemplar embodiment of the present invention and FIG. 16 is a perspective view to illustrate the arrangement of magnets, coils, and sensors of a reflective member driving device according to a first exemplary embodiment of the present invention.

The reflective member driving device (1000) can perform optical image stabilization (OIS) function. The reflective member driving device (1000) may perform handshake correction function. The reflective member driving device (1000) may move the reflective member (1220). The reflective member driving device (1000) can tilt the reflective member (1220).

The reflective member driving device (1000) may tilt the reflective member (1220) about two axes. The reflective member driving device (1000) may tilt the reflective member (1220) about an x-axis and a y-axis. The x-axis and y-axis may be perpendicular to each other. The reflective member driving device (1000) may be a reflective member actuator. The reflective member driving device (1000) may be an OIS actuator. The reflective member driving device (1000) may be an OIS driving device. The reflective member driving device (1000) may be a prism driving device.

The reflective member driving device (1000) may comprise a fixed part (1100). The fixed part (1100) may be a relatively fixed portion of the moving part (1200) during movement. The fixed part (1100) may accommodate at least a portion of the moving part (1200). The fixed part (1100) may be disposed on an exterior side of the moving part (1200). The reflective member driving device (1000) may comprise a housing 1110. The fixed part (1100) may comprise the housing (1110).

The housing (1110) may be disposed on an exterior side of a holder (1210). The housing (1110) may accommodate at least a portion of the holder (1210). The housing (1110) may comprise an opening or hole in the top plate and one of the side plates to provide a path for light. The housing (1110) may comprise a top plate, a bottom plate, and a plurality of side plates.

The housing (1110) may comprise a first portion (1111). The first portion (1111) may be formed on a side plate of the housing (1110). A moving plate (1300) may be disposed on the first portion (1111). The first portion (1111) may be disposed between the holder (1210) and the mover rigid (1230). A second magnet (1120) may be disposed in the first portion (1111). The moving plate (1300) may be disposed on one side of the first portion (1111) and the second magnet (1120) may be disposed on the other side of the first portion (1111).

The housing (1110) may comprise a second portion (1112). The second portion (1112) may be disposed on top of the holder (1210). The second portion (1112) may be in contact with the holder (1210) when the holder (1210) is moved upward. The second portion (1112) may overlap the holder (1210) in the direction of travel of the holder (1210). The second portion (1112) may be a top plate of the housing (1110). The housing (1110) may comprise a third portion (1113). The third portion (1113) may be disposed underneath the holder (1210). The third portion (1113) may contact the holder (1210) when the holder (1210) is moved downward. The third portion (1113) may overlap the holder (1210) in the direction of travel. The third portion (1113) may be a bottom plate of the housing (1110).

The housing (1110) may comprise a hole (1114). The hole (1114) may be a mover rigid through hole. The hole (1114) may be formed in a side plate of the housing (1110). The hole (1114) may be formed in a first portion (1111) of the housing (1110). A mover rigid (1230) may be disposed in the hole (1114). The mover rigid (1230) may be so disposed as to pass through the hole (1114). The hole (1114) may be formed larger than the movement space of the mover rigid (1230) to avoid interference with the mover rigid (1230).

The housing (1110) may comprise a groove (1115). The groove (1115) may be a moving plate first projection receiving groove. In the groove (1115), a first projection (1310) of a moving plate (1300) may be disposed. The groove (1115) may receive at least a portion of the moving plate (1300). The groove (1115) may constrain movement, other than rotation, of the first projection (1310) of the moving plate (1300). The groove (1115) may comprise an inclined surface in contact with the first projection (1310) of the moving plate (1300). The inclined surface may comprise a plurality of inclined surfaces.

The groove (1115) may comprise a first groove (1115-1). The first groove (1115-1) may be a four-point contact groove. The first groove (1115-1) may contact one of the two first protrusions (1310) of the moving plate (1300) at four points. In this way, the first groove (1115-1) of the housing (1110) can constrain movement in the four directions of up, down, left, and right, except for rotation of one of the first protrusions (1310) of the moving plate (1300).

The groove (1115) may comprise a second groove (1115-2). The second groove (1115-2) may be a two-point contact groove. The second groove (1115-2) may be in two-point contact with the other of the two first protrusions (1310) of the moving plate (1300). In doing so, the second groove (1115-2) of the housing (1110) can constrain movement of the remaining one of the first protrusions (1310) of the moving plate (1300) in two directions. For example, the second groove (1115-2) of the housing (1110) may constrain movement in the side-to-side direction of the first projection (1310) of the moving plate (1300) and not constrain movement in the up-and-down direction.

The housing (1110) may comprise a protrusion (1116). The protrusion (1116) may be coupled to a lens driving device (2000). The protrusion (1116) may be formed on a side plate of the housing (1110). The protrusion (1116) may be formed on a side of the housing (1110) that faces the lens driving device (2000). The protrusion (1116) may comprise a trapezoidal-shaped cross-section. The protrusion (1116) may be coupled to the housing (2110) of the lens driving device (2000). The protrusion (1116) may be inserted into a first groove (2111) of the housing (2110) of the lens driving device (2000). The protrusion (1116) may be coupled to the housing (2110) of the lens driving device (2000) by an adhesive.

The housing (1110) may comprise a projection (1117). The projection (1117) may be coupled to the lens driving device (2000). The protrusion (1117) may be formed on a side plate of the housing (1110). The protrusion (1117) may be formed on a side of the housing (1110) that faces the lens driving device (2000). The protrusion (1117) may comprise a circular cross-section. The protrusion (1117) may be coupled to the housing (2110) of the lens driving device (2000). The projection (1117) may be inserted into a second groove (2112) of the housing (2110) of the lens driving device (2000). The protrusion (1117) may be coupled to the housing (2110) of the lens driving device (2000) using an adhesive.

The housing (1110) may comprise protrusions (1118). The protrusion (1118) may be a mover rigid contact protrusion. The protrusion (1118) may be in contact with the mover rigid (1230). The protrusion (1118) may be formed on the inner circumferential surface of the hole (1114) in the housing (1110) through which the mover rigid (1230) passes. The protrusion (1118) may be formed to contact at least one of a bottom surface and a top surface of the mover rigid (1230) during movement of the mover rigid (1230). The protrusion (1118) may prevent the mover rigid (1230) from excessively deviating from its original position and becoming dislodged.

The housing (1110) may comprise a hole (1119). The hole (1119) may be a first sensor placement hole. A first sensor (1413) may be disposed in the hole (1119). In the direction of the second axis (y-axis), the length of the hole (1119) in the housing (1110) may be shorter than the length of a sensing magnet (1403), which may prevent the sensing magnet (1403) from directly striking the first sensor (1413) even when the holder (1210) is moved.

The housing (1110) may comprise a protrusion (**1119*a*). The protrusion (1119*a*) may contact a lateral stopper (1219) of the holder (1210). The protrusion (1119*a*) may be formed on an inner surface of a side plate of the housing (1110). The protrusion (1119*a*) may be formed to protrude from an inner surface of the side plate of the housing (1110). The protrusion (1119*a*) may be formed above and below the sensing magnet (1403). This allows the lateral stopper (1219) of the holder (1210) to strike the protrusion (1119*a*) of the housing (1110) before the sensing magnet (1403) strikes the housing (1110), even when the holder (1210**) is maximally tilted to the side.

The reflective member driving device (1000) may comprise a second magnet (1120). The fixed part (1100) may comprise the second magnet (1120). The second magnet (1120) may be a second repulsion magnet. The second magnet (1120) may be disposed in the housing (1110). The second magnet (1120) may be disposed in a first portion (1111) of the housing (1110).

The second magnet (1120) may be disposed on the opposite side of the moving plate (1300) with respect to the first portion (1111) of the housing (1110). The second magnet (1120) may be disposed facing the first magnet (1240). The second magnet (1120) may be disposed to generate a repulsive force with the first magnet (1240). The second magnet (1120) may be disposed so that the second magnet (1120) and the first magnet (1240) are of the same polarity. The second magnet (1120) may repel the first magnet (1240).

The reflective member driving device (1000) may comprise a substrate (1130). The fixed part (1100) may comprise the substrate (1130). The substrate (1130) may be an FPCB. The substrate (1130) may be a flexible printed circuit board. The substrate (1130) may be disposed in the housing (1110). The substrate (1130) may have coils (1412, 1422) disposed thereon. The sensors (1413, 1423) may be disposed on the substrate (1130). The substrate (1130) may be electrically connected to a substrate (3700). A driver IC (1170) may be disposed on the substrate (1130). A gyro sensor (1150) may be disposed on the substrate (1130). The substrate (1130) may be disposed to wrap around the bottom and sides of the housing (1110). The substrate (1130) may comprise a twice-bent shape.

The reflective member driving device (1000) may comprise an SUS (1140). The fixed part (1100) may comprise the SUS (1140). The SUS (1140) may be disposed on the substrate (1130). The SUS (1140) may be disposed on an outer surface of the substrate (1130). The SUS (1140) can add strength to the substrate (1130). The reflective member driving device (1000) may comprise a gyro sensor (1150). The fixed part (1100) may comprise the gyro sensor (1150). The gyro sensor (1150) may detect the shaking of a camera device (10). Image stabilization may offset the shaking detected by the gyro sensor (1150). The gyro sensor (1150) may be disposed on the substrate (1130). The gyro sensor (1150) may be disposed on an exterior surface of the substrate (1130).

The reflective member driving device (1000) may comprise a plate. The fixed part (1100) may comprise a plate. The plate may be disposed to cover an open portion of the housing (1110). The plate may be disposed to close an opened front of the housing (1110). The plate may be formed from a sheet of metal.

The reflective member driving device (1000) may comprise a driver IC (1170). The fixed part (1100) may comprise the driver IC (1170). The driver IC (1170) may be disposed on the substrate (1130). The driver IC (1170) may be electrically coupled to a first coil (1412) and a second coil (1422). The driver IC (1170) may supply current to the first coil (1412) and the second coil (1422). The driver IC (1170) can control one or more of the voltage and current applied to each of the first coil (1412) and the second coil (1422). The driver IC (1170) may be electrically coupled to the sensors (1413, 1423). The driver IC (1170) can feedback-control the voltage and current applied to the first coil (1412) and the second coil (1422) via the position of the reflective member (1220) detected by the sensors (1413, 1423)

The reflective member driving device (1000) may comprise a moving part (1200). The moving part (1200) may be movable relative to the fixed part (1100). The moving part (1200) may be tiltable relative to the fixed part (1100). The moving part (1200) may be disposed within the fixed part (1100). At least a portion of the moving part (1200) may be spaced apart from the fixed part (1100). The moving part (1200) may contact the fixed part (1100) when moved. Alternatively, in an initial state, the moving part (1200) may be in contact with the fixed part (1100).

The reflective member driving device (1000) may comprise a holder (1210). The moving part (1200) may comprise the holder (1210). The holder (1210) may be disposed within the housing (1110). The holder (1210) may be movable relative to the housing (1110). The holder (1210) may be tilted relative to the housing (1110). At least a portion of the holder (1210) may be spaced apart from the housing (1110). The holder (1210) may be in contact with the housing (1110). The holder (1210) may be in contact with the housing (1110) upon movement. Alternatively, in an initial state, the holder (1210) may be in contact with the housing (1110).

The holder (1210) may comprise a groove (1211). The groove (1211) may be a groove for receiving a second projection of the moving plate. In the groove (1211), a second projection (1320) of the moving plate (1300) may be disposed. The groove (1211) may receive at least a portion of the moving plate (1300). The groove (1211) may constrain movement, other than rotation, of the second projection (1320) of the moving plate (1300). The groove (1211) may comprise an inclined surface in contact with the second projection (1320) of the moving plate (1300). The inclined surface may comprise a plurality of inclined surfaces.

The groove (1211) may comprise a first groove (1211-1). The first groove (1211-1) may be a four-point contact groove. The first groove (1211-1) may be in four-point contact with one of the two secondary protrusions (1320) of the moving plate (1300). In this way, the first groove (1211-1) of the holder (1210) can constrain movement in the four directions of up, down, left, and right, except for rotation of one of the second protrusions (1320) of the moving plate (1300).

The groove (1211) may comprise a second groove (1211-2). The second groove (1211-2) may be a two-point contact groove. The second groove (1211-2) may be a two-point contact groove. The second groove (1211-2) may be in two-point contact with the other of the two secondary projections (1320) of the moving plate (1300). In doing so, the second groove (1211-2) of the holder (1210) can constrain movement of the remaining one of the second protrusions (1320) of the moving plate (1300) in two directions. For example, the second groove (1211-2) of the holder (1210) may constrain movement of the second projection (1320) of the moving plate (1300) in the up-and-down direction, but not in the side-to-side direction.

The holder (1210) may comprise a first projection (1212). The first projection (1212) may be a top stopper. The first projection (1212) may be formed on a top surface of the holder (1210). The first projection (1212) may protrude from the top surface of the holder (1210). The first projection (1212) may contact the housing (1110) when the holder (1210) is moved upwardly. The first projection (1212) may contact the second portion (1112) of the housing (1110) when the holder (1210) is moved upwardly.

The holder (1210) may comprise a second projection (1213). The second projection (1213) may be a bottom stopper. The second projection (1213) may be formed on a bottom side of the holder (1210). The second projection (1213) may protrude from the bottom side of the holder (1210). The second projection (1213) may contact the housing (1110) when the holder (1210) is moved downwardly. The second projection (1213) may contact a third portion (1113) of the housing (1110) when the holder (1210) is moved downwardly.

The holder (1210) may comprise an adhesive recess (1214). The adhesive recess (1214) can receive an adhesive that secures the reflective member (1220) to the holder (1210). The adhesive recess (1214) may be formed on a side that abuts the reflective member (1220). Adhesive may be placed in the adhesive recess (1214). The holder (1210) may comprise a groove (1215). The groove (1215) may be a spacing groove that provides spacing between the reflective member (1220) and the holder (1210). The groove (1215) may be formed on a side abutting the reflective member (1220). The groove (1215) may reduce an area of contact between the reflective member (1220) and the holder (1210).

The holder (1210) may comprise a groove (1216). The groove (1216) may be a slimming groove. The groove (1216) may be formed in a center portion of the holder (1210). The groove (1216) may reduce the weight of the holder (1210). The holder (1210) may comprise a magnet recess (1217). Driving magnets (1411, 1421) may be disposed in the magnet recess (1217).

The magnet recess (1217) can be formed in a shape corresponding to that of the drive magnets (1411, 1421). The magnet recess (1217) may be formed on the bottom and both sides of the holder (1210). The magnet recess (1217) may comprise a plurality of magnet recesses. The magnet recess (1217) can comprise a first magnet recess that receives a first driving magnet (14110) and a yoke (1414). The magnet recess (1217) may comprise a second magnet recess that receives a second driving magnet (1421) and a yoke (1424).

The holder (1210) may comprise a mover rigid recess (1218). In the mover rigid recess (1218), a leg portion (1232) of the mover rigid (1230) may be disposed. The mover rigid recess (1218) may be shaped to correspond to that of the leg portion (1232) of the mover rigid (1230). The mover rigid recess (1218) may comprise a groove that receives an adhesive that secures the leg portion (1232) of the mover rigid (1230) to the holder (1210).

The holder (1210) may comprise a lateral stopper (1219). The lateral stopper (1219) may be formed on both sides of the holder (1210). The lateral stopper (1219) may protrude from the sides of the holder (1210). The lateral stopper (1219) may contact the housing (1110) when the holder (1210) is moved laterally. The lateral stopper (1219) may contact a side plate of the housing (1110) when the holder (1210) is moved laterally.

The reflective member driving device (1000) may comprise a reflective member (1220). The moving part (1200) may comprise reflective member (1220). The reflective member (1220) may be disposed in the holder (1210). The reflective member (1220) may be disposed within the holder (1210). The reflective member (1220) may be coupled to the holder (1210). The reflective member (1220) may be secured to the holder (1210). The reflective member (1220) may be secured to the holder (1210) by an adhesive.

The reflective member (1220) may be integrally movable with the holder (1210). The reflective member (1220) may change the path of light. The reflective member (1220) may reflect light. The reflective member (1220) may comprise a prism. The reflective member (1220) may comprise a mirror. The reflective member (1220) may be formed in the shape of a tripod. The angle between the path of light incident on the reflective member (1220) and the path of light emitted may be 90 degrees.

The reflective member driving device (1000) may comprise a mover rigid (1230). The moving part (1200) may comprise mover rigid (1230). The mover rigid (1230) may be coupled to the holder (1210). A first magnet (1240) and a second magnet (1120) may be disposed between the mover rigid (1230) and the holder (1210). The first magnet (1240) and the second magnet (1120) may be arranged to face each other with the same polarity so that they repel each other. The first magnet (1240), which is secured to the housing (1110), may repel the second magnet (1120) outwardly.

The mover rigid (1230), to which the second magnet 1120 is secured, may also be pressed outward by the repulsive force of the first magnet (1240). The holder (1210) to which the mover rigid (1230) is secured may also be pressed outwardly. This allows the holder (1210) to press the moving plate (1300) against the housing (1110). This allows the moving plate (1300) to be positioned between the holder (1210) and the housing (1110) without being removed.

The mover rigid (1230) may comprise a protrusion (1231). The protrusion (1231) may protrude from a top surface of a body portion of the mover rigid (1230). The protrusion (1231) may contact the housing (1110) when the mover rigid (1230) is moved. The mover rigid (1230) may comprise a leg portion (1232). The leg portion (1232) may extend from a body portion of the mover rigid (1230). The leg portion (1232) may pass through a hole (1114) of the housing (1110). The leg portion (1232) may be coupled to the holder (1210). The leg portion (1232) may be secured to the holder (1210) by an adhesive. At least a portion of the leg portion (1232) may be inserted into the mover rigid recess (1218) of the holder (1210).

The reflective member driving device (1000) may comprise a first magnet (1240). The moving part (1200) may comprise the first magnet (1240). The first magnet (1240) may be a first repulsion magnet. The first magnet (1240) may be disposed on the mover rigid (1230). The first magnet (1240) may be disposed on a body portion of the mover rigid (1230). The first magnet (1240) may be disposed facing the second magnet (1120). The first magnet (1240) may be disposed to generate a repulsive force against the second magnet (1120). The first magnet (1240) may be disposed so that the first magnet (1240) and the second magnet (1120) are of the same polarity. The first magnet (1240) may repel the second magnet (1120).

The reflective member driving device (1000) may comprise a moving plate (1300). The moving plate (1300) may be disposed between the housing (1110) and the holder (1210). The moving plate (1300) may guide movement of the holder (1210) relative to the housing (1110). The moving plate (1300) may provide a tilt center for the holder (1210), that is, the holder (1210) may be tilted about the moving plate (1300). The moving plate (1300) may be disposed on the holder (1210) on one side and on the housing (1110) on the other side. The moving plate (1300) may contact the holder (1210) and the housing (1110).

The moving plate (1300) may comprise a first projection (1310). The first projection (1310) may be disposed in the housing (1110). The first projection (1310) may be in contact with the housing (1110). The first projection (1310) may be disposed in a groove (1115) of the housing (1110). The first projection (1310) may provide a second axis tilt center perpendicular to the first axis for the holder (1210). The first projection (1310) may provide a y-axis tilt center for the holder (1210). The first projection (1310) may comprise two first protrusions. The two first projections may be spaced apart in the y-axis direction. The two first projections may be disposed along the y-axis. The holder (1210) may be tilted about the first projection (1310) of the moving plate (1300) by a second driving portion (1420). The holder (1210) may be tilted in a left-right direction about the first projection (1310) of the moving plate (1300) by the second driving portion (1420).

The moving plate (1300) may comprise a second projection (1320). The second projection (1320) may be disposed on the holder (1210). The second projection (1320) may be in contact with the holder (1210). The second projection (1320) may be disposed in the groove (1211) of the holder (1210). The second projection (1320) may provide a first axis tilt center for the holder (1210). The second projection (1320) may provide an x-axis tilt center for the holder (1210). The second projection (1320) may comprise two second protrusions. The two second projections may be spaced apart in the x-axis direction. The two second projections may be disposed on the x-axis.

The holder (1210) may be tilted about the second projection (1320) of the moving plate (1300) by the first drive portion (1410). The holder (1210) may be tilted up and down about the second projection (1320) of the moving plate (1300) by the first drive portion (1410).

In a modification, the first projection (1310) of the moving plate (1300) may provide an x-axis tilt center for the holder (1210) and the second projection (1320) of the moving plate (1300) may provide a y-axis tilt center.

The reflective member driving device (1000) may comprise a driving part (1400). The driving part (1400) can move the moving part (1200) relative to the fixed part (1100). The driving part (1400) can tilt the moving part (1200) relative to the fixed part (1100). The driving part (1400) may comprise a coil and a magnet. The driving part (1400) can move the moving part (1200) via electromagnetic interaction. In a modification, the driving part (1400) may comprise a shape memory alloy (SMA).

The reflective member driving device (1000) may comprise a driving magnet (1401). The driving magnet (1401) may be disposed in the holder (1210). The driving magnet (1401) may be disposed on an outer surface of the holder (1210). The driving magnet (1401) may be secured to the holder (1210). The driving magnet (1401) may be secured to the holder (1210) by an adhesive. The driving magnet (1401) may be opposite a coil (1402). The driving magnet (1401) may be disposed facing the coil (1402). The driving magnet (1401) may be disposed in a position corresponding to that of the coil (1402). The driving magnet (1401) may be in electromagnetic interaction with the coil (1402). The driving magnet (1401) may be four pole magnetized magnets, that is, each of the driving magnets (1401) may comprise two N-poles and two S-poles.

The driving magnet (1401) may comprise a plurality of magnets. The driving magnet (1401) may comprise a first driving magnet (1411) that tilts the reflective member (1220) about a first axis. The driving magnet (1401) may comprise a second driving magnet (1421) that tilts the reflective member (1220) about a second axis perpendicular to the first axis.

The reflective member driving device (1000) may comprise a coil (1402). The coil (1402) may be in electromagnetic interaction with the driving magnet (1401). The coil (1402) may be disposed on a substrate (1130). The coil (1402) may be disposed in the housing (1110).

The coil (1402) may comprise a first coil (1412) facing first driving magnet (1411). The coil (1402) may comprise a second coil (1422) facing a second driving magnet (1421).

The reflective member driving device (1000) may comprise a sensing magnet (1403). The sensing magnet (1403) may be disposed in the holder (1210). The sensing magnet (1403) may be disposed in a position that does not electromagnetically interact with the coil (1402). The sensing magnet (1403) may be disposed on both sides of the holder (1210). The sensing magnet (1403) may be further spaced apart from the moving plate (1300) than the second driving magnet (1421). In the direction of the second axis, at least a portion of the sensing magnet (1403) may overlap the housing (1110). In the direction of a third axis perpendicular to the first and second axes, at least a portion of the sensing magnet (1403) may overlap the second coil (1422).

The sensing magnet (1403) may be disposed next to the second driving magnet (1421). The sensing magnet (1403) may be disposed on the same side of the holder (1210) as that of the second driving magnet (1421). The sensing magnet (1403) may be spaced apart from the second driving magnet (1421) in the z-axis direction. The sensing magnet (1403) may be formed with a smaller size than the second driving magnet (1421). The center of the sensing magnet (1403) may be disposed at a same height as that of the center of the second drive magnet (1421). In a modification, the center of the sensing magnet (1403) may be disposed lower than the center of the second driving magnet (1421). Alternatively, the center of the sensing magnet (1403) may be disposed higher than the center of the second driving magnet (1421).

The sensing magnet (1403) may protrude from both sides of holder (1210) above second driving magnet (1421). The distance between the sensing magnet (1403) and the first sensor (1413) may be shorter than the distance between the second driving magnet (1421) and the second sensor (1423). This can improve the Hall output detected by the first sensor (1413). The sensing magnet (1403) may comprise a first surface facing first sensor (1413). The second driving magnet (1421) may comprise a first surface facing the second sensor (1423). In this case, the area of the first surface of the second driving magnet (1421) may be larger than the area of the first surface of the sensing magnet (1403).

In a first exemplary embodiment of the present invention, a sensing magnet (1403) may be provided separate from the first driving magnet (1411). Compared to a comparative example where the Hall sensor senses the first driving magnet (1411), the first exemplary embodiment of the present invention may enable more accurate sensing than the comparative example because the amount of movement of the sensing magnet (1403) is greater than the amount of movement of the first driving magnet (1411) when the holder (1210) is tilted about the x-axis. In the first exemplary embodiment of the present invention, even if the holder (1210) is lopsided about the y-axis, the first sensor (1413) may secure a constant output by compensating for the distance between the two sub-hole sensors. When the holder (1210) is moved in the x-direction, the first sensor (1413) may be located within a sufficient magnetic field range of the sensing magnet (1403).

The sensing magnet (1403) may be a four-pole magnetized magnet. The top of the sensing magnet (1403) may have an N pole and an S pole. The lower portion of the sensing magnet (1403) may have an N pole and an S pole. However, the same polarity on the top and bottom of the sensing magnet (1403) may be disposed diagonally. The sensing magnet (1403) may comprise a neutral portion between the upper and lower portions. The neutral portion may be formed with a length of 0.1 to 0.5 mm in the y-axis direction. The neutral portion may be formed with a length of 0.2 to 0.4 millimeters. The neutral portion may be formed with a length of 0.3 mm. In a modification, the sensing magnet (1403) may be a two-pole magnetized magnet.

In a first exemplary embodiment of the present invention, the housing (1110) may have some slimming geometry to prevent interference with the sensing magnet (1403). The sensing magnet (1403) may comprise a first sensing magnet (1403-1) disposed on a first side of the holder (1210). The sensing magnet (1403) may comprise a second sensing magnet (1403) disposed on a second side opposite the first side of the holder (1210).

The reflective member driving device (1000) may comprise a yoke (1404). The yoke (1404) may be disposed between the sensing magnet (1403) and the holder (1210). The yoke (1404) may be formed in a shape corresponding to that of the sensing magnet (1403). The yoke (1404) may focus the magnetic force of the sensing magnet (1403) toward the first sensor (1413).

The driving part (1400) may comprise a first driving part (1410). The first driving part (1410) may tilt the moving part (1200) about a first axis relative to the fixed part (1100). The first driving part (1410) may tilt the moving part (1200) about the x-axis relative to the fixed part (1100). The first driving part (1410) may comprise a coil and a magnet. The first driving part (1410) can move the moving part (1200) via electromagnetic interaction. In a modification, the first driving part (1410) may comprise a shape memory alloy (SMA).

The first driving part (1410) may comprise a first driving magnet (1411). The first driving magnet (1411) may be disposed in the holder (1210). The first driving magnet (1411) may be disposed on a bottom surface of the holder (1210). The first driving magnet (1411) may be secured to the holder (1210). The first driving magnet (1411) may be secured to the holder (1210) by an adhesive. The first driving magnet (1411) may be integrally movable with the holder (1210). The first driving magnet (1411) may be disposed to face a first coil (1412). The first driving magnet (1411) may be opposite the first coil (1412). The first driving magnet (1411) may be disposed in a position corresponding to that of the first coil (1412). The first driving magnet (1411) may interact with the first coil (1412). The first driving magnet (1411) may electromagnetically interact with the first coil (1412).

The first driving part (1410) may comprise a first coil (1412). The first coil (1412) may be disposed on the substrate (1130). The first coil (1412) may be disposed in the housing (1110). The first coil (1412) may be disposed underneath the holder (1210). When a current is applied to the first coil (1412), an electromagnetic field may be formed around the first coil (1412) to interact with the first driving magnet (1411).

The reflective member driving device (1000) may comprise a first sensor (1413). The first sensor (1413) may comprise a Hall sensor. The first sensor (1413) may sense the sensing magnet (1403). The first sensor (1413) may detect a magnetic force of the sensing magnet (1403). The first sensor (1413) may detect a position of the holder (1210). The first sensor (1413) may detect a position of the reflective member (1220). The first sensor (1413) may detect an amount of tilt about the x-axis of the holder (1210). The first sensor (1413) may detect a tilt about a first axis of the reflective member (1220).

The first sensor (1413) may be disposed at a same height as that of the second sensor (1423). In a modification, the top of the first sensor (1413) may be disposed higher than the top of the second sensor (1423). Alternatively, the bottom of the first sensor (1413) may be positioned lower than the bottom of the second sensor (1423). The first sensor (1413) and the second sensor (1423) may be disposed in a vertical orientation. In a modification, the first sensor (1413) and the second sensor (1423) may be disposed in a horizontal orientation. The first sensor (1413) may comprise a first sub-sensor (1413-1) that senses the first sensing magnet (1403-1). The first sensor (1413) may comprise a second sub-sensor (1413-2) that detects a second sensing magnet (1403-2).

The reflective member driving device (1000) may comprise a yoke (1414). The yoke (1414) may be disposed between the first driving magnet (1411) and the holder (1210). The yoke (1414) may be formed in a shape corresponding to that of the first driving magnet (1411). The yoke (1414) may increase the interaction force between the first driving magnet (1411) and the first coil (1412).

The driving part (1400) may comprise a second driving part (1420). The second driving part (1420) may tilt the moving part (1200) about a second axis relative to the fixed part (1100). The second driving part (1420) may tilt the moving part (1200) about the y-axis relative to the fixed part (1100). The second driving part (1420) may comprise a coil and a magnet. The second driving part (1420) may move the moving part (1200) via electromagnetic interaction. In a modification, the second driving part (1420) may comprise a shape memory alloy (SMA).

The second driving part (1420) may comprise a second driving magnet (1421). The second driving magnet (1421) may be disposed in the holder (1210). The second driving magnet (1421) may be disposed on both sides of the holder (1210). The second driving magnet (1421) may be secured to the holder (1210). The second driving magnet (1421) may be secured to the holder (1210) by an adhesive. The second driving magnet (1421) may be integrally movable with the holder (1210). The second driving magnet (1421) may be disposed to face a second coil (1422). The second driving magnet (1421) may be opposed to the second coil (1422). The second driving magnet (1421) may be disposed in a position corresponding to that of the second coil (1422). The second driving magnet (1421) may interact with the second coil (1422). The second driving magnet (1421) may electromagnetically interact with the second coil (1422).

The second driving magnet (1421) may comprise a first sub-magnet (1421-1). The first sub-magnet (1421-1) may be disposed on one side of the holder (1210). The first sub-magnet (1421-1) may be disposed on a first side of the holder (1210). The first sub-magnet (1421-1) may be disposed facing the first sub-coil (1422-1). The first sub-magnet (1421-1) may be opposite the first sub-coil (1422-1). The first sub-magnet (1421-1) may be disposed in a position corresponding to that of the first sub-coil (1422-1). The first sub-magnet (1421-1) may interact with the first sub-coil (1422-1). The first sub-magnet (1421-1) may electromagnetically interact with the first sub-coil (1422-1).

The second driving magnet (1421) may comprise a second sub-magnet (1421-2). The second sub-magnet (1421-2) may be disposed on a different side of the holder (1210). The second sub-magnet (1421-2) may be disposed on a second side of the holder (1210) opposite the first side of the holder (1210). The second sub-magnet (1421-2) may be disposed on the opposite side of the first sub-magnet (1421-1). The second sub-magnet (1421-2) may be formed in the same size and shape as the first sub-magnet (1421-1). The second sub-magnet (1421-2) may be disposed facing the second sub-coil (1422-2). The second sub-magnet (1421-2) may be opposite the second sub-coil (1422-2). The second sub-magnet (1421-2) may be disposed in a position corresponding to that of the second sub-coil (1422-2). The second sub-magnet (1421-2) may interact with the second sub-coil (1422-2). The second sub-magnet (1421-2) may electromagnetically interact with the second sub-coil (1422-2).

The second driving part (1420) may comprise a second coil (1422). The second coil (1422) may be disposed on the substrate (1130). The second coil (1422) may be disposed in the housing (1110). The second coil (1422) may be disposed on either side of the holder (1210). When a current is applied to the second coil (1422), an electromagnetic field is formed around the second coil (1422) that can interact with the second driving magnet (1421). The second coil (1422) may comprise two sub-coils (1421-1, 1421-2) disposed opposite each other with respect to the holder (1210). The two sub-coils (1421-1, 1421-2) may be electrically connected to each other.

The second coil (1422) may comprise a first sub-coil (1422-1). The first sub-coil (1422-1) may be disposed on the substrate (1130). The first sub-coil (1422-1) may be disposed in the housing (1110). The first sub-coil (1422-1) may be disposed on a side of the holder (1210). When a current is applied to the first sub-coil (1422-1), an electromagnetic field may be formed around the first sub-coil (1422-1) to interact with the first sub-magnet (1421-1).

The second coil (1422) may comprise a second sub-coil (1422-2). The second sub-coil (1422-2) may be disposed on the substrate (1130). The second sub-coil (1422-2) may be disposed in the housing (1110). The second sub-coil (1422-2) may be disposed on a side of the holder (1210). When a current is applied to the second sub-coil (1422-2), an electromagnetic field may be formed around the second sub-coil (1422-2) to interact with the second sub-magnet (1421-2).

The reflective member driving device (1000) may comprise a second sensor (1423). The second sensor (1423) may comprise a Hall sensor. The second sensor (1423) may sense the second driving magnet (1421). The second sensor (1423) may detect a magnetic force of the second driving magnet (1421). The second sensor (1423) may detect a position of the holder (1210). The second sensor (1423) may detect the position of the reflective member (1220). The second sensor (1423) may detect an amount of tilt about the y-axis of the holder (1210). The second sensor (1423) may detect a tilt about the second axis of the reflective member (1220).

The second sensor (1423) may comprise a third-sub sensor (1423-1) that detects the first-sub magnet (1421-1). The second sensor (1423) may comprise a fourth sub-sensor (1423-2) that senses the second sub-magnet (1421-2). In a first exemplary embodiment of the present invention, the distance between the first sub-sensor (1413-1) and the second sub-sensor (1413-2) may be equal to the distance between the third sub-sensor (1423-1) and the fourth sub-sensor (1423-2). The distance between the first sub-sensor (1413-1) and the second sub-sensor (1413-2) may correspond to the distance between the third sub-sensor (1423-1) and the fourth sub-sensor (1423-2).

The reflective member driving device (1000) may comprise a yoke (1424). The yoke (1424) may be disposed between the second driving magnet (1421) and the holder (1210). The yoke (1424) may be formed in a shape corresponding to that of the second driving magnet (1421). The yoke (1424) may increase the interaction force between the second driving magnet (1421) and the second coil (1422).

Hereinafter, a reflective member driving device according to a second exemplary embodiment of the present invention will be described with reference to the drawings.

FIG. 17 is an exploded perspective view of a reflective member driving device according to a second embodiment of the present invention, FIG. 18 is a bottom exploded perspective view of a reflective member driving device according to a second embodiment of the present invention, FIGS. 19 and 20 are drawings to illustrate a structure related to a moving plate of a reflective member driving device according to a second embodiment of the present invention, FIG. 21 is a perspective view of the FP coil of the reflective member driving device according to the second embodiment of the present invention, FIG. 22 is a perspective view of a substrate and related configuration of a reflective member driving device according to a second embodiment of the present invention, FIG. 23 is a perspective view of the FP coil of the reflective member driving device according to the second embodiment of the present invention in combination with a substrate, FIG. 24 is an enlarged view of portion A of FIG. 23, FIG. 25 is a top view of an FP coil of a reflective member driving device according to a second embodiment of the present invention, FIG. 26 is a top view of a substrate and associated configuration of a reflective member driving device according to a second embodiment of the present invention, FIG. 27 is a top view of the FP coil and substrate of the reflective member driving device according to the second embodiment of the present invention in a combined state, FIG. 28 is a top view of the FP coil of the reflective member driving device according to the second embodiment of the present invention with the substrate coupled to the housing, FIG. 29 is a front view of the FP coil and substrate of the reflective member driving device according to the second embodiment of the present invention, FIG. 30 is a perspective view of the housing of the reflective member driving device according to the second embodiment of the present invention, FIG. 31 is a bottom perspective view of a housing of a reflective member driving device according to a second embodiment of the present invention, FIG. 32 is a bottom perspective view of the housing of the reflective member driving device according to the second embodiment of the present invention with an FP coil disposed therein, and FIG. 33 is a cross-sectional view of the housing, FP coil, and substrate of the reflective member driving device according to the second embodiment of the present invention.

A reflective member driving device (1000*a*) may perform optical image stabilization (OIS) function. The reflective member driving device (1000*a*) may perform a handshake correction function. The reflective member driving device (1000*a*) may move a reflective member (1220*a*). The reflective member driving device (1000*a*) may tilt the reflective member (1220*a*). The reflective member driving device (1000*a*) may tilt the reflective member (1220*a*) about two axes. The reflective member driving device (1000*a*) may tilt the reflective member (1220*a*) about an x-axis and a y-axis. The x-axis and the y-axis may be perpendicular to each other. The reflective member driving device (1000*a*) may be a reflective member actuator. The reflective member actuator (1000*a*) may be an OIS actuator. The reflective member actuator (1000*a*) may be an OIS driving device. The reflective member actuator (1000*a*) may be a prism driving device.

The reflective member driving device (1000*a*) may comprise a fixed part (1100*a*). The fixed part (1100*a*) may be a relatively fixed portion of a moving part (1200*a*) during movement. The fixed part (1100*a*) may accommodate at least a portion of the moving part (1200*a*). The fixed part (1100*a*) may be disposed on an outer side of the moving part (1200*a*). The reflective member driving device (1000*a*) may comprise a housing (1110*a*). The fixed part (1100*a* may comprise a housing (1110*a*). The housing (1110*a*) may be disposed on an outer side of a holder (1210*a*). The housing (1110*a*) may accommodate at least a portion of the holder (1210*a*). The housing (1110*a*) may comprise an opening or hole in the top plate and one of the side plates for securing a light path. The housing (1110*a*) may comprise a top plate, a bottom plate, and a plurality of side plates.

The housing (1110*a*) may comprise a first portion (1111*a*). The first portion (1111*a*) may be formed on a side plate of the housing (1110*a*). A moving plate (1300*a*) may be disposed on the first portion (1111*a*). The first portion (1111*a*) may be disposed between a holder (1210*a*) and a mover rigid (1230*a*). A second magnet (1120*a*) may be disposed in the first portion (1111*a*). On one side of the first portion (1111*a*), the moving plate (1300*a*) may be disposed and on the other side of the first portion (1111*a*), a second magnet (1120*a*) may be disposed. The housing (1110*a*) may comprise a second portion (1112*a*). The second portion (1112*a*) may be disposed on top of the holder (1210*a*). The second portion (1112*a*) may contact the holder (1210*a*) when the holder (1210*a*) is moved upward. The second portion (1112*a*) may overlap the holder (1210*a*) in the direction of travel of the holder (1210*a*). The second portion (1112*a*) may be a top plate of the housing (1110*a*).

The housing (1110*a*) may comprise a third portion (1113*a*). The third portion (1113*a*) may be disposed below the holder (1210*a*). The third portion (1113*a*) may be in contact with the holder (1210*a*) when the holder (1210*a*) is moved downward. The third portion (1113*a*) may overlap the holder (1210*a*) in the direction of travel. The third portion (1113*a*) may be a bottom plate of a housing (1110*a*). The housing (1110*a*) may comprise a hole (1114*a*). The hole (1114*a*) may be a mover rigid through hole. The hole (1114*a*) may be formed in a side plate of the housing (1110*a*). The hole (1114*a*) may be formed in the first portion (1111*a*) of the housing (1110*a*). A mover rigid (1230*a*) may be disposed in the hole (1114*a*). The mover rigid (1230*a*) may be disposed to pass through the hole (1114*a*). The hole (1114*a*) may be formed larger than the movement space of the mover rigid (1230*a*) to avoid interference with the mover rigid (1230*a*).

The housing (1110*a*) may comprise a groove (1115*a*). The groove (1115*a*) may be a moving plate first projection recess. In the groove (1115*a*), a first projection (1310*a*) of the moving plate (1300*a*) may be disposed. The groove (1115*a*) may receive at least a portion of the moving plate (1300*a*). The groove (1115*a*) may constrain movement, other than rotation, of the first projection (1310*a*) of the moving plate (1300*a*). The groove (1115*a*) may comprise an inclined surface in contact with the first projection (1310*a*) of the moving plate (1300*a*). The inclined surface may comprise a plurality of inclined surfaces.

The groove (1115*a*) may comprise a first groove (1115-1*a*). The first groove (1115-1*a*) may be a four-point contact groove. The first groove (1115-1*a*) may be in four-point contact with one of the two first protrusions (1310*a*) of the moving plate (1300*a*). By doing so, the first groove (1115-1*a*) of the housing (1110*a*) may constrain movement in the four directions of up, down, left, and right, except for rotation of one of the first protrusions (1310*a*) of the moving plate (1300*a*).

The groove (1115*a*) may comprise a second groove (1115-2*a*). The second groove (1115-2*a*) may be a two-point contact groove. The second groove (1115-2*a*) may be in two-point contact with the other of the two first protrusions (1310*a*) of the moving plate (1300*a*). In doing so, the second groove (1115-2*a*) of the housing (1110*a*) may constrain movement of the remaining one of the first protrusions (1310*a*) of the moving plate (1300*a*) in two directions. For example, the second groove (1115-2*a*) of the housing (1110*a*) may constrain movement in the side-to-side direction of the first projection (1310*a*) of the moving plate (1300*a*) and not constrain movement in the up-and-down direction.

The housing (1110*a*) may comprise a protrusion (1116*a*). The protrusion (1116*a*) may be coupled to a lens driving device (2000). The protrusion (1116*a*) may be formed on a side plate of the housing (1110*a*). The protrusion (1116*a*) may be formed on a side facing the lens driving unit (2000) of the housing (1110*a*). The protrusion (1116*a*) may comprise a trapezoidal-shaped cross-section. The protrusion (1116*a*) may be coupled to the housing (2110) of the lens driving device (2000). The protrusion (1116*a*) may be inserted into a first groove (2111) of the housing (2110) of the lens driving device (2000). The protrusion (1116*a*) may be coupled to the housing (2110) of the lens driving device (2000) by an adhesive.

The housing (1110*a*) may comprise a projection (1117*a*). The protrusion (1117*a*) may be coupled to the lens driving device (2000). The protrusion (1117*a*) may be formed on a side plate of the housing (1110*a*). The protrusion (1117*a*) may be formed on a side facing the lens driving unit (2000) of the housing (1110*a*). The protrusion (1117*a*) may comprise a circularly shaped cross-section. The protrusion (1117*a*) may be coupled to the housing (2110) of the lens driving device (2000). The projection (1117*a*) may be inserted into a second groove (2112) of the housing (2110) of the lens driving device (2000). The projection (1117*a*) may be coupled to the housing (2110) of the lens driving device (2000) by an adhesive.

The housing (1110*a*) may comprise a protrusion (1118*a*). The protrusion (1118*a*) may be a mover rigid contact protrusion. The protrusion (1118*a*) may be in contact with a mover rigid (1230*a*). The protrusion (1118*a*) may be formed on an inner circumferential surface of the hole (1114*a*) in the housing (1110*a*) through which the mover rigid (1230*a*) passes. The protrusion (1118*a*) may be formed to contact at least one of a bottom surface and a top surface of the mover rigid (1230*a*) during movement of the mover rigid (1230*a*). The protrusion (1118*a*) may prevent the mover rigid (1230*a*) from excessively deviating from its original position and becoming dislodged.

The housing (1110*a*) may comprise a hole or groove (1119*a*). The hole or groove (1119*a*) may circumvent a terminal (1131*a*) of a substrate (1130*a*) and a terminal (1407*a*) of a coil member (1402*a*). Soldering to join the terminal (1131*a*) of the substrate (1130*a*) and the terminal (1407*a*) of the coil member (1402*a*) may be performed through the hole or groove (1119*a*) in the housing (1110*a*), that is, soldering may proceed through the hole or groove (1119*a*) with the substrate (1130*a*) and the coil member (1402*a*) joined in the housing (1110*a*).

The housing (1110*a*) may comprise a first groove (1110*aa*). The first groove (1110*aa*) may be a substrate placement groove. A substrate (1130*a*) may be disposed in the first groove (1110*aa*). The first groove (1110*aa*) may be formed in a side plate of the housing (1110*a*) and an outer surface of the bottom plate. The first groove (1110*aa*) may comprise a shape that corresponds, at least in part, to that of the substrate (1130*a*). The housing (1110*a*) may comprise a second groove (1110*ba*). The second groove (1110*ba*) may be a coil member placement groove. The second groove (1110*ba*) may be formed in the first groove (1110*aa*). The second groove (1110*ba*) may be formed in a shape at least partially corresponding to that of the coil member (1402*a*). The second groove (1110*ba*) may be formed at a depth corresponding to a thickness of the coil member (1402*a*). The second groove (1110*ba*) may be further recessed with respect to the first groove 1110*aa* to form a dual step.

The reflective member drive device (1000*a*) may comprise a second magnet (1120*a*). The fixed part (1100*a*) may comprise the second magnet (1120*a*). The second magnet (1120*a*) may be a second repulsion magnet. The second magnet (1120*a*) may be disposed in the housing (1110*a*). The second magnet (1120*a*) may be disposed in a first portion (1111*a*) of the housing (1110*a*).

The second magnet (1120*a*) may be disposed on the opposite side of the moving plate (1300*a*) with respect to the first portion (1111*a*) of the housing (1110*a*). The second magnet (1120*a*) may be disposed facing the first magnet (1240*a*). The second magnet (1120*a*) may be disposed to generate a repulsive force with the first magnet (1240*a*). The second magnet (1120*a*) may be disposed to face the first magnet (1240*a*) with the same polarity as that of the first magnet (1240*a*). The second magnet (1120*a*) may repel the first magnet (1240*a*).

The reflective member driving device (1000*a*) may comprise a substrate (1130*a*). The fixed part (1100*a*) may comprise the substrate (1130*a*). The substrate (1130*a*) may be an FPCB. The substrate (1130*a*) may be a flexible printed circuit board. The substrate (1130*a*) may be disposed in the housing (1110*a*). The substrate (1130*a*) may cover an outer surface of a coil member (1402*a*). The substrate (1130*a*) may be formed larger than the coil member (1402*a*). The substrate (1130*a*) may be formed in a different shape than the coil member (1402*a*). The substrate (1130*a*) may be formed in a different size than the coil member (1402*a*). The substrate (1130*a*) may be formed as a separate member from the coil member (1402*a*).

In a modification, the substrate (1130*a*) may be omitted and the coil member (1402*a*) may even play the role of the substrate (1130*a*).

The substrate (1130*a*) may comprise a terminal (1131*a*). The terminal (1131*a*) may be formed on a top surface of a first portion (1133*a*) of the substrate (1130*a*). The terminal (1131*a*) may be formed on an inner surface of the second portion (1134*a*) of the substrate (1130*a*). The terminal (1131*a*) may be formed on a first surface of substrate (1130*a*). The terminal (1131*a*) of the substrate (1130*a*) may be coupled to a terminal (1407*a*) of the coil member (1402*a*). The terminal (1131*a*) of the substrate (1130*a*) may be solderably coupled to the terminal (1407*a*) of the coil member (1402*a*). The terminal (1131*a*) of the substrate (1130*a*) may be electrically connected to the terminal (1407*a*) of the coil member (1402*a*).

The terminal (1131*a*) may comprise a plurality of terminals. The terminal (1131*a*) may comprise four terminals. The terminal (1131*a*) may comprise first to fourth terminals. The first and second terminals may be electrically connected to the first coil (1412*a*). The third and fourth terminals may be electrically connected to the second coil (1422*a*).

The substrate (1130*a*) may comprise a hole (1132*a*). The hole (1132*a*) may be a coupling hole that is coupled with the housing (1110*a*). The hole (1132*a*) may engage a protrusion formed in a side plate of the housing (1110*a*). The protrusion formed in the side plate of the housing (1110*a*) may be inserted into a hole (1132*a*) in the substrate (1130*a*). The hole (1132*a*) may be formed with a shape that corresponds to that of the protrusion formed on the side plate of the housing (1110*a*). For example, the hole (1132*a*) may comprise a circular shape.

The substrate (1130*a*) may comprise a first portion (1133*a*). The first portion (1133*a*) may be a bottom plate portion. The first portion (1133*a*) may comprise a first portion (1403-1a) of the coil member (1402a) disposed on the first portion (1133a). The first portion (1133a) may be disposed below the housing (1110a). The first portion (1133a) may be disposed on the underside of the housing (1110a).

The substrate (1130a) may comprise a second portion (1134a). The second portion (1134a) may be a side plate portion. The second portion (1134a) may extend from the first portion (1133a). The second portion (1134a) may comprise two second portions (1134a). The two second portions (1134a) may extend upward from both edges of the first portion (1133a). In the second portion (1134a), the second portion (1403-2a) of the coil member (1402a) may be disposed. The second portion (1134a) may be disposed on a side of the housing (1110a). The second portion (1134a) may be disposed on an outer side of the housing (1110a).

The reflective member driving device (1000a) may comprise a SUS (1140a). The fixed part (1100a) may comprise the SUS (1140a). The SUS (1140a) may be disposed on the substrate (1130a). The SUS (1140a) may be disposed on an outer surface of the substrate (1130a). The SUS (1140a) may reinforce the strength of the substrate (1130a). The reflective member driving device (1000a) may comprise a gyro sensor (1150a). The fixed part (1100a) may comprise the gyro sensor (1150a). The gyro sensor (1150a) may detect a shaking of a camera device (10a). An image stabilization function may offset the shaking detected by the gyro sensor (1150a). The gyro sensor (1150a) may be disposed on substrate (1130a). The gyro sensor (1150a) may be disposed on an exterior surface of the substrate (1130a).

The reflective member driving device (1000a) may comprise a plate. The fixed part (1100a) may comprise a plate. The plate may be disposed to cover an open portion of the housing (1110a). The plate may be disposed to close an open front of the housing (1110a). The plate may be formed from a sheet of metal.

The reflective member driving device (1000a) may comprise driver IC (1170a). The fixed part (1100a) may comprise the driver IC (1170a). The driver IC (1170a) may be disposed on the substrate (1130a). The driver IC (1170a) may be electrically connected to first coil (1412a) and second coil (1422a). The driver IC (1170a) may supply current to the first coil (1412a) and the second coil (1422a). The driver IC (1170a) may control at least one of a voltage and a current applied to each of the first coil (1412a) and the second coil (1422a). The driver IC (1170a) may be electrically coupled to the Hall sensors (1413a, 1423a). The driver IC (1170a) may feedback-control the voltage and current applied to the first coil (1412a) and the second coil (1422a) via the position of the reflective member (1220a) detected by the Hall sensors (1413a, 1423a).

The reflective member driving device (1000a) may comprise a moving part (1200a). The moving part (1200a) may be movable relative to a fixed part (1100a). The moving part (1200a) may be tilted relative to the fixed part (1100a). The moving part (1200a) may be disposed within the fixed part (1100a). At least a portion of the moving part (1200a) may be spaced apart from the fixed part (1100a). The moving part (1200a) may contact the fixed part (1100a) during movement. Alternatively, in an initial state, the moving part (1200a) may be in contact with the fixed part (1100a).

The reflective member driving device (1000a) may comprise a holder (1210a). The moving part (1200a) may comprise the holder (1210a). The holder (1210a) may be disposed within the housing (1110a). The holder (1210a) may be movable relative to the housing (1110a). The holder (1210a) may be tilted relative to the housing (1110a). At least a portion of the holder (1210a) may be spaced apart from the housing (1110a). The holder (1210a) may be in contact with the housing (1110a). The holder (1210a) may be in contact with the housing (1110a) upon movement. Alternatively, in an initial state, the holder (1210a) may be in contact with the housing (1110a).

The holder (1210a) may comprise a groove (1211a). The groove (1211a) may be a moving plate second projection recess of the moving plate. In the groove (1211a), the second projection (1320a) of the moving plate (1300a) may be disposed. The groove (1211a) may receive at least a portion of the moving plate (1300a). The groove (1211a) may constrain movement, other than rotation, of the second projection (1320a) of the moving plate (1300a). The groove (1211a) may comprise an inclined surface in contact with the second projection (1320a) of the moving plate (1300a). The inclined surface may comprise a plurality of inclined surfaces.

The groove (1211a) may comprise a first groove (1211-1a). The first groove (1211-1a) may be a four-point contact groove. The first groove (1211-1a) may be in four-point contact with one of the two second projections (1320a) of the moving plate (1300a). By doing so, the first groove (1211-1a) of the holder (1210a) may constrain movement of the holder (1210a) in the four directions of up, down, left, and right, except for rotation of one of the second protrusions (1320a) of the moving plate (1300a).

The groove (1211a) may comprise a second groove (1211-2a). The second groove (1211-2a) may be a two-point contact groove. The second groove (1211-2a) may be in two-point contact with the other of the two second projections (1320a) of the moving plate (1300a). In doing so, the second groove (1211-2a) of the holder (1210a) may constrain movement of the remaining one of the second protrusions (1320a) of the moving plate (1300a) in two directions. For example, the second groove (1211-2a) of the holder (1210a) may constrain movement of the second projection (1320a) of the moving plate (1300a) in the up-and-down direction and not constrain movement in the side-to-side direction.

The holder (1210a) may comprise a first projection (1212a). The first projection (1212a) may be a top stopper. The first projection (1212a) may be formed on a top surface of the holder (1210a). The first projection (1212a) may protrude from the top surface of the holder (1210a). The first projection (1212a) may contact the housing (1110a) when the holder (1210a) is moved upwardly. The first projection (1212a) may contact a second portion (1112a) of the housing (1110a) when the holder (1210a) is moved upwardly.

The holder (1210a) may comprise a second projection (1213a). The second projection (1213a) may be a bottom stopper. The second projection (1213a) may be formed on a bottom side of the holder (1210a). The second projection (1213a) may protrude from the bottom side of the holder (1210a). The second projection (1213a) may contact the housing (1110a) when the holder (1210a) is moved downwardly. The second projection (1213a) may contact a third portion (1113a) of the housing (1110a) when the holder (1210a) is moved downwardly.

The holder (1210a) may comprise an adhesive (receiving) recess (1214a). The adhesive recess (1214a) may receive an adhesive that secures the reflective member (1220a) to the holder (1210a). The adhesive recess (1214a) may be formed on a side abutting the reflective member (1220a). An adhesive may be placed in the adhesive recess (1214a). The holder (1210a) may comprise a groove (1215a). The groove (1215a) may be a spacing groove that provides spacing between the reflective member (1220*a*) and the holder (1210*a*). The groove (1215*a*) may be formed on a side abutting the reflective member (1220*a*). The groove (1215*a*) may reduce an area of contact between the reflective member (1220*a*) and the holder (1210*a*).

The holder (1210*a*) may comprise a groove (1216*a*). The groove (1216*a*) may be a slimming groove. The groove (1216*a*) may be formed in a center portion of the holder (1210*a*). The groove (1216*a*) may reduce the weight of the holder (1210*a*).

The holder (1210*a*) may comprise a magnet (receiving) recess (1217*a*). The magnet recess (1217*a*) may be disposed on a magnet (1401*a*). The magnet recess (1217*a*) may be formed in a shape corresponding to that of the magnet (1401*a*). The magnet recess (1217*a*) may be formed on the bottom and both sides of the holder (1210*a*). The magnet recess (1217*a*) may comprise a plurality of magnet recesses. The magnet recess (1217*a*) may comprise a first magnet recess that receives a first driving magnet (14110*a*) and the yoke (1414*a*). The magnet recess (1217*a*) may comprise a second magnet recess that receives the second driving magnet (1421*a*) and the yoke (1424*a*).

The holder (1210*a*) may comprise a mover rigid (receiving) recess (1218*a*). In the mover rigid recess (1218*a*), a leg portion (1232*a*) of a mover rigid (1230*a*) may be disposed. The mover rigid recess (1218*a*) may be shaped to correspond to that of the leg portion (1232*a*) of the mover rigid (1230*a*). The mover rigid recess (1218*a*) may comprise a groove that receives an adhesive that secures the leg portion (1232*a*) of the mover rigid (1230*a*) to the holder (1210*a*).

The holder (1210*a*) may comprise a lateral stopper (1219*a*). The lateral stopper (1219*a*) may be formed on both sides of holder (1210*a*). The lateral stopper (1219*a*) may protrude from the sides of the holder (1210*a*). The lateral stopper (1219*a*) may contact the housing (1110*a*) when the holder (1210*a*) is moved laterally. The lateral stopper (1219*a*) may contact a side plate of the housing (1110*a*) when the holder (1210*a*) is moved laterally.

The reflective member driving device (1000*a*) may comprise a reflective member (1220*a*). The moving part (1200*a*) may comprise a reflective member (1220*a*). The reflective member (1220*a*) may be disposed on the holder (1210*a*). The reflective member (1220*a*) may be disposed within the holder (1210*a*). The reflective member (1220*a*) may be coupled to the holder (1210*a*). The reflective member (1220*a*) may be secured to the holder (1210*a*). The reflective member (1220*a*) may be secured to the holder (1210*a*) by an adhesive. The reflective member (1220*a*) may be integrally movable with the holder (1210*a*). The reflective member (1220*a*) can change the path of light. The reflective member (1220*a*) may reflect light. The reflective member (1220*a*) may comprise a prism. The reflective member (1220*a*) may comprise a mirror. The reflective member (1220*a*) may be formed in the shape of a tripod. The angle between the path of light incident on the reflective member (1220*a*) and the path of light emitted may be 90 degrees.

The reflective member driving device (1000*a*) may comprise a mover rigid (1230*a*). The moving part (1200*a*) may comprise a mover rigid (1230*a*). The mover rigid (1230*a*) may be coupled to the holder (1210*a*). A first magnet (1240*a*) and a second magnet (1120*a*) may be disposed between the mover rigid (1230*a*) and the holder (1210*a*). The first magnet (1240*a*) and the second magnet (1120*a*) may be arranged to face each other with the same polarity so that they repel each other. The first magnet (1240*a*), which is secured to the housing (1110*a*), may push the second magnet (1120*a*) outwardly. The mover rigid (1230*a*), to which the second magnet (1120*a*) is secured, may also be pressed outwardly by the repulsive force of the first magnet (1240*a*). The holder (1210*a*) to which the mover rigid (1230*a*) is secured may also be pressed outwardly. This allows the holder (1210*a*) to press the moving plate (1300*a*) against the housing (1110*a*). This allows the moving plate (1300*a*) to be positioned between the holder (1210*a*) and the housing (1110*a*) without being removed.

The mover rigid (1230*a*) may comprise a projection (1231*a*). The protrusion (1231*a*) may protrude from a top surface of a body portion of the mover rigid (1230*a*). The protrusion (1231*a*) may contact the housing (1110*a*) during movement of the mover rigid (1230*a*). The mover rigid (1230*a*) may comprise a leg portion (1232*a*). The leg portion (1232*a*) may extend from a body portion of the mover rigid (1230*a*). The leg portion (1232*a*) may pass through a hole (1114*a*) of the housing (1110*a*). The leg portion (1232*a*) may be coupled to the holder (1210*a*). The leg portion (1232*a*) may be secured to the holder (1210*a*) by an adhesive. At least a portion of the leg portion (1232*a*) may be inserted into the mover rigid recess (1218*a*) of the holder (1210*a*).

The reflective member driving device (1000*a*) may comprise the first magnet (1240*a*). The moving part (1200*a*) may comprise the first magnet 1240*a*. The first magnet (1240*a*) may be a first repulsion magnet. The first magnet (1240*a*) may be disposed on the mover rigid (1230*a*). The first magnet (1240*a*) may be disposed on a body portion of the mover rigid (1230*a*). The first magnet (1240*a*) may be disposed facing the second magnet (1120*a*). The first magnet (1240*a*) may be so disposed as to generate repulsive force against the second magnet (1120*a*). The first magnet (1240*a*) may be disposed so that the first magnet (1240*a*) and the second magnet (1120*a*) are of the same polarity. The first magnet (1240*a*) may repel the second magnet (1120*a*).

The reflective member driving device (1000*a*) may comprise a moving plate (1300*a*). The moving plate (1300*a*) may be disposed between the housing (1110*a*) and the holder (1210*a*). The moving plate (1300*a*) may guide movement of the holder (1210*a*) relative to the housing (1110*a*). The moving plate (1300*a*) may provide a tilt center for the holder (1210*a*), that is, the holder (1210*a*) may be tilted about the moving plate (1300*a*). The moving plate (1300*a*) may have one side disposed on the holder (1210*a*) and the other side disposed on the housing (1110*a*). The moving plate (1300*a*) may contact the holder (1210*a*) and the housing (1110*a*).

The moving plate (1300*a*) may comprise a first projection (1310*a*). The first projection (1310*a*) may be disposed in the housing (1110*a*). The first projection (1310*a*) may be in contact with the housing (1110*a*). The first projection (1310*a*) may be disposed in a groove (1115*a*) of the housing (1110*a*). The first projection (1310*a*) may provide a second axis tilt center perpendicular to the first axis for the holder (1210*a*). The first projection (1310*a*) may provide a y-axis tilt center for the holder (1210*a*). The first projection (1310*a*) may comprise two first protrusions. The two first projections may be spaced apart in the y-axis direction. The two first projections may be disposed on the y-axis. The holder (1210*a*) may be tilted about the first projection (1310*a*) of the moving plate (1300*a*) by a second driving part (1420*a*). The holder (1210*a*) may be tilted in a left-right direction about the first projection (1310*a*) of the moving plate (1300*a*) by the second driving part (1420*a*).

The moving plate (1300*a*) may comprise a second projection (1320*a*). The second projection (1320*a*) may be disposed on the holder (1210*a*). The second projection (1320*a*) may be in contact with the holder (1210*a*). The second projection (1320*a*) may be disposed in the groove (1211*a*) of the holder (1210*a*). The second projection (1320*a*) may provide a first axis tilt center for the holder (1210*a*). The second projection (1320*a*) may provide an x-axis tilt center for the holder (1210*a*). The second projection (1320*a*) may comprise two second protrusions. The two second projections may be spaced apart in the x-axis direction. The two second projections may be disposed along the x-axis. The holder (1210*a*) may be tilted about the second protrusion (1320*a*) of the moving plate (1300*a*) by the first driving part (1410*a*). The holder (1210*a*) may be tilted up and down about the second projection (1320*a*) of the moving plate (1300*a*) by the first driving part (1410*a*).

In a modification, a first projection (1310*a*) of the moving plate (1300*a*) may provide an x-axis tilt center for the holder (1210*a*) and a second projection (1320*a*) of the moving plate (1300*a*) may provide a y-axis tilt center. The reflective member driving device (1000*a*) may comprise a driving part (1400*a*). The driving part (1400*a*) may move the moving part (1200*a*) relative to the fixed part (1100*a*). The driving part (1400*a*) may tilt the moving part (1200*a*) relative to the fixed part (1100*a*). The driving part (1400*a*) may comprise a coil and a magnet. The driving part (1400*a*) may move the moving part (1200*a*) via electromagnetic interaction. In a modification, the driving part (1400*a*) may comprise a shape memory alloy (SMA).

The reflective member driving device (1000*a*) may comprise a magnet (1401*a*). The driving part (1400*a*) may comprise the magnet (1401*a*). The magnet (1401*a*) may be disposed in the holder (1210*a*). The magnet (1401*a*) may be disposed on an outer surface of the holder (1210*a*). The magnet (1401*a*) may be secured to the holder (1210*a*). The magnet (1401*a*) may be secured to the holder (1210*a*) by an adhesive. The magnet (1401*a*) may be opposite the coil. The magnet (1401*a*) may be disposed facing the coil. The magnet (1401*a*) may be disposed in a position corresponding to that of the coil. The magnet (1401*a*) may be in electromagnetic interaction with the coil.

The magnet (1401*a*) may comprise a plurality of magnets. The magnet (1401*a*) may comprise a first driving magnet (1411*a*) and a second driving magnet (1421*a*).

In a modification, the magnet (1401*a*) may be disposed in the housing (1110*a*) and the coil may be disposed in the holder (1210*a*).

The reflective member driving device (1000*a*) may comprise a coil member (1402*a*). The driving part (1400*a*) may comprise the coil member (1402*a*). The coil member (1402*a*) may be a fine pattern coil (FP coil). The coil member (1402*a*) may be formed separately from a substrate (1130*a*) and joined via soldering. The FP coil may be formed separately from the FPCB and joined via soldering. The coil member (1402*a*) may be formed at a different thickness than the substrate (1130*a*). The FPCB may be formed at a different thickness than the FP coil. The coil member (1402*a*) may be a fine patterned coil. The coil member (1402*a*) may be disposed on the substrate (1130*a*). The coil member (1402*a*) may have a higher stiffness than the substrate (1130*a*). However, the coil member (1402*a*) may also have a stiffness that is bendable.

The coil member (1402*a*) may be attached to the substrate (1130*a*) and bent in a certain direction together. More specifically, the coil member (1402*a*) may be coupled in an unfolded state when coupled to the substrate (1130*a*) to form an FPCB assembly, and may be folded when the FPCB assembly is assembled in housing (1110*a*). The coil member (1402*a*) may comprise an insulating portion (1403*a*). The insulation portion (1403*a*) may comprise an insulation layer. The insulating portion (1403*a*) may be formed of a non-conductive material. A conductive line may be disposed on the insulating portion (1403*a*). The conductive line may be disposed in the insulating portion (1403*a*) to electrically connect the pattern coil (1404*a*) and the terminal (1407*a*).

The insulation portion (1403*a*) may comprise a first portion (1403-1*a*). A first coil (1412*a*) may be disposed on the first portion (1403-1*a*). The first portion (1403-1*a*) may be a bottom plate. The first portion (1403-1*a*) of the coil member (1402*a*) may be disposed on the first portion (1133*a*) of the substrate (1130*a*). The first portion (1403-1*a*) may be disposed underneath the housing (1110*a*). The first portion (1403-1*a*) may be disposed on the underside of the housing (1110*a*).

The insulating portion (1403*a*) may comprise a second portion (1403-2*a*). A second coil (1422*a*) may be disposed on the second portion (1403-2*a*). The second portion (1403-2*a*) may be a side plate. The second portion (1403-2*a*) of the coil member (1402*a*) may be disposed on the second portion (1134*a*) of the substrate (1130*a*). The second portion (1403-2*a*) may be integrally formed with the first portion (1403-1*a*). The second portion (1403-2*a*) may be bent from the first portion (1403-1*a*). The second portion (1403-2*a*) may comprise two second portions (1403-2*a*). The two second portions (1403-2*a*) may extend upward from both edges of the first portion (1403-1*a*). The second portions (1403-2*a*) may be disposed on the sides of the housing (1110*a*). The second portion (1403-2*a*) may be disposed on an outer side of the housing (1110*a*).

The reflective member driving device (1000*a*) may comprise a patterned coil (1404*a*). The coil member (1402*a*) may comprise the patterned coil (1404*a*). The patterned coil (1404*a*) may be formed on the insulating portion (1403*a*). The patterned coil (1404*a*) may electromagnetically interact with the magnet (1401*a*). In the direction facing the magnet (1401*a*), the thickness of the patterned coil (1404*a*) may be thinner than the length of the sensor (1408*a*). The coil member (1402*a*) and the sensor (1408*a*) may be disposed on a first surface of the substrate (1130*a*).

At this time, a thickness from a first surface of the substrate (1130*a*) of the coil member (1402*a*) may be thinner than a thickness from a first surface of the substrate (1130*a*) of the sensor (1408*a*). The thickness of the patterned coil (1404*a*) may be thinner than the thickness of the sensor (1408*a*). The pattern coil (1404*a*) may comprise a first coil (1412*a*) facing a first driving magnet (1411*a*) and a second coil (1422*a*) facing second driving magnet (1421*a*). The patterned coils (1404*a*) may be solderably coupled to the substrate (1130*a*).

The patterned coil (1404*a*) may be sufficiently reduced in height compared to a plain coil. Accordingly, the distance between the sensor (1408*a*) and the magnet (1401*a*) may be closer, which can be advantageous for obtaining a Hall output.

In a second exemplary embodiment of the present disclosure, the size of the module may be reduced by using patterned coil (1404*a*). This can be advantageous for horizontal and vertical size reduction. In a second embodiment of the invention, the housing (1110*a*) may be provided with a dual step shape for folding and inserting the patterned coil (1404*a*). The pads (terminals) of the patterned coil (1404*a*) and the substrate (1130*a*) are welded, and to avoid this, the housing (1110*a*) may have sufficient escape shape.

The coil member (1402*a*) may comprise a first coil (1412*a*) for tilting the holder (1210*a*) about a first axis, and a second coil (1422*a*) for tilting the holder (1210*a*) about a second axis perpendicular to the first axis. In this case, the first coil (1412*a*) and the second coil (1422*a*) may be formed from a single member. The second coil (1422*a*) may be disposed in a bent position relative to the first coil (1412*a*). The coil member (1402*a*) may comprise a hole (1405*a*). The hole (1405*a*) may be a sensor placement hole. The hole (1405*a*) may be disposed within a patterned coil (1404*a*). A sensor (1408*a*) may be disposed within the hole (1405*a*). The hole (1405*a*) may be formed larger than the sensor (1408*a*). The hole (1405*a*) may comprise a plurality of holes. The hole (1405*a*) may comprise three holes corresponding to three coils.

The coil member (1402*a*) may comprise a groove (1406*a*). The groove (1406*a*) may be a terminal groove. The groove (1406*a*) may be formed at a location corresponding to that of a terminal (1131*a*) of the substrate (1130*a*). The groove (1406*a*) may be recessed in a semicircular shape. The groove (1406*a*) may be formed to increase the contact area of the conductive member. The coil member (1402*a*) may comprise a terminal (1407*a*). The terminal (1407*a*) may be formed around the periphery of the groove (1406*a*) of the coil member (1402*a*). The terminal (1131*a*) of the substrate (1130*a*) and the terminal (1407*a*) of the coil member (1402*a*) may be electrically connected via a conductive member. For example, the terminal (1131*a*) of the substrate (1130*a*) and the terminal (1407*a*) of the coil member (1402*a*) may be electrically connected via soldering. The terminal (1407*a*) may be electrically connected to patterned coil (1404*a*).

Two pads may be present thereinside for circuit connection of first coil (1412*a*) of patterned coil (1404*a*). The two pads may be present on the interior for circuit connection of the second coil (1422*a*) of the patterned coil (1404*a*). The reflective member driving device (1000*a*) may comprise a sensor (1408*a*). The sensor (1408*a*) may be disposed on the substrate (1130*a*). The sensor (1408*a*) may detect a magnet (1401*a*). The sensor (1408*a*) may be disposed in a hole (1405*a*) of the coil member (1402*a*). The sensor (1408*a*) may be disposed within the patterned coil (1404*a*). The coil member (1402*a*) and sensor (1408*a*) may be disposed on a first surface of substrate (1130*a*).

The sensor (1408*a*) may protrude from the first surface of the substrate (1130*a*) above the coil member (1402*a*). The distance between the sensor (1408*a*) and the magnet (1401*a*) may be shorter than the distance between the patterned coil (1404*a*) and the magnet (1401*a*). This may increase the Hall output sensed by the sensor (1408*a*) to feedback movement of the reflective member (1220*a*). The sensor (1408*a*) may be disposed closer to the magnet (1401*a*) than the patterned coil (1404*a*). The thickness of the sensor (1408*a*) may be greater than the thickness of the patterned coil (1404*a*). The thickness of the sensor (1408*a*) may be thicker than the thickness of the patterned coil (1404*a*).

In a second embodiment of the present invention, the sensor (1408*a*) may be positioned close to the magnet (1401*a*) for increased Hall sensitivity. The driving part (1400*a*) may comprise a first driving part (1410*a*). The first driving part (1410*a*) may tilt the moving part (1200*a*) about a first axis relative to the fixed part (1100*a*). The first driving part (1410*a*) may tilt the moving part (1200*a*) about the x-axis relative to the fixed part (1100*a*). The first driving part (1410*a*) may comprise a coil and a magnet. The first driving part (1410*a*) may move the moving part (1200*a*) via electromagnetic interaction. In a modification, the first driving part (1410*a*) may comprise a shape memory alloy (SMA).

The first driving part (1410*a*) may comprise a first driving magnet (1411*a*). The first driving magnet (1411*a*) may be disposed in the holder (1210*a*). The first driving magnet (1411*a*) may be disposed on a bottom side of the holder (1210*a*). The first driving magnet (1411*a*) may be secured to the holder (1210*a*). The first driving magnet (1411*a*) may be secured to the holder (1210*a*) by an adhesive. The first driving magnet (1411*a*) may be integrally movable with the holder (1210*a*).

The first driving magnet (1411*a*) may be disposed to face a first coil (1412*a*). The first driving magnet (1411*a*) may be opposite the first coil (1412*a*). The first driving magnet (1411*a*) may be disposed in a position corresponding to the first coil (1412*a*). The first driving magnet (1411*a*) may interact with the first coil (1412*a*). The first driving magnet (1411*a*) may electromagnetically interact with the first coil (1412*a*).

The first driving part (1410*a*) may comprise a first coil (1412*a*). The first coil (1412*a*) may be disposed on the substrate (1130*a*). The first coil (1412*a*) may be disposed in the housing (1110*a*). The first coil (1412*a*) may be disposed on a first portion (1133*a*) of the substrate (1130*a*). The first coil (1412*a*) may be disposed underneath the holder (1210*a*). When a current is applied to the first coil (1412*a*), an electromagnetic field may be formed around the first coil (1412*a*) to interact with the first driving magnet (1411*a*).

The reflective member driving device (1000*a*) may comprise a Hall sensor (1413*a*). The Hall sensor (1413*a*) may sense the first driving magnet (1411*a*). The Hall sensor (1413*a*) may detect a magnetic force on the first driving magnet (1411*a*). The Hall sensor (1413*a*) may detect the position of the holder (1210*a*). The Hall sensor (1413*a*) may detect the position of reflective member (1220*a*). The Hall sensor (1413*a*) may detect an amount of tilt about the x-axis of the holder (1210*a*).

The reflective member driving device (1000*a*) may comprise a yoke (1414*a*). The yoke (1414*a*) may be disposed between the first driving magnet (1411*a*) and the holder (1210*a*). The yoke (1414*a*) may be formed in a shape corresponding to that of the first driving magnet (1411*a*). The yoke (1414*a*) may increase the interaction force between the first driving magnet (1411*a*) and the first coil (1412*a*).

The driving part (1400*a*) may comprise a second driving part (1420*a*). The second driving part (1420*a*) may tilt the moving part (1200*a*) about a second axis relative to the fixed part (1100*a*). The second driving part (1420*a*) may tilt the moving part (1200*a*) about the y-axis relative to the fixed part (1100*a*). The second driving part (1420*a*) may comprise a coil and a magnet. The second driving part (1420*a*) may move the moving part (1200*a*) via electromagnetic interaction. In a modification, the second driving part (1420*a*) may comprise a shape memory alloy (SMA).

The second driving part (1420*a*) may comprise a second driving magnet (1421*a*). The second driving magnet (1421*a*) may be disposed in the holder (1210*a*). The second driving magnet (1421*a*) may be disposed on both sides of the holder (1210*a*). The second driving magnet (1421*a*) may be secured to the holder (1210*a*). The second driving magnet (1421*a*) may be secured to the holder (1210*a*) by an adhesive. The second driving magnet (1421*a*) may be integrally movable with the holder (1210*a*). The second driving magnet (1421*a*) may be disposed to face a second coil (1422*a*). The second driving magnet (1421*a*) may be opposite the second coil (1422*a*). The second driving magnet (1421*a*) may be disposed in a position corresponding to that of the second coil (1422*a*). The second driving magnet (1421*a*) may interact with the second coil (1422*a*). The second driving magnet (1421*a*) may electromagnetically interact with the second coil (1422*a*).

The second driving magnet (1421*a*) may comprise a first sub-magnet (1421-1*a*). The first sub-magnet (1421-1*a*) may be disposed on one side of the holder (1210*a*). The first sub-magnet (1421-1*a*) may be disposed facing a first sub-coil (1422-1*a*). The first sub-magnet (1421-1*a*) may be opposite the first sub-coil (1422-1*a*). The first sub-magnet (1421-1*a*) may be disposed in a position corresponding to that of the first sub-coil (1422-1*a*). The first sub-magnet (1421-1*a*) may interact with the first sub-coil (1422-1*a*). The first sub-magnet (1421-1*a*) may electromagnetically interact with the first sub-coil (1422-1*a*).

The second driving magnet (1421*a*) may comprise a second sub-magnet (1421-2*a*). The second sub-magnet (1421-2*a*) may be disposed on the other side of the holder (1210*a*). The second sub-magnet (1421-2*a*) may be disposed on the opposite side of the first sub-magnet (1421-1*a*). The second sub-magnet (1421-2*a*) may be formed in the same size and shape as those of the first sub-magnet (1421-1*a*). The second sub-magnet (1421-2*a*) may be disposed facing the second sub-coil (1422-2*a*). The second sub-magnet (1421-2*a*) may be opposite the second sub-coil (1422-2*a*). The second sub-magnet (1421-2*a*) may be disposed in a position corresponding to that of the second sub-coil (1422-2*a*). The second sub-magnet (1421-2*a*) may interact with the second sub-coil (1422-2*a*). The second sub-magnet (1421-2*a*) may electromagnetically interact with the second sub-coil (1422-2*a*).

The second driving part (1420*a*) may comprise a second coil (1422*a*). The second coil (1422*a*) may be disposed on the substrate (1130*a*). The second coil (1422*a*) may be disposed in the housing (1110*a*). The second coil (1422*a*) may be disposed in the second portion (1134*a*) of the substrate (1130*a*). The second coil (1422*a*) may be disposed on both sides of the holder (1210*a*). When a current is applied to the second coil (1422*a*), an electromagnetic field may be formed around the second coil (1422*a*) to interact with the second driving magnet (1421*a*). The second coil (1422*a*) may comprise two sub-coils (1421-1*a*, 1421-2*a*) disposed opposite each other with respect to the holder (1210*a*). The two sub-coils (1421-1*a*, 1421-2*a*) may be electrically connected to each other.

The second coil (1422*a*) may comprise the first sub-coil (1422-1*a*). The first sub-coil (1422-1*a*) may be disposed on the substrate (1130*a*). The first sub-coil (1422-1*a*) may be disposed in the housing (1110*a*). The first sub-coil (1422-1*a*) may be disposed in a second portion (1134*a*) of the substrate (1130*a*). The first sub-coil (1422-1*a*) may be disposed on a side of the holder (1210*a*). When a current is applied to the first sub-coil (1422-1*a*), an electromagnetic field may be formed around the first sub-coil (1422-1*a*) to interact with the first sub-magnet (1421-1*a*).

The second coil (1422*a*) may comprise a second sub-coil (1422-2*a*). The second sub-coil (1422-2*a*) may be disposed on the substrate (1130*a*). The second sub-coil (1422-2*a*) may be disposed in the housing (1110*a*). The second sub-coil (1422-2*a*) may be disposed in a second portion (1134*a*) of the substrate (1130*a*). The second sub-coil (1422-2*a*) may be disposed on a side of the holder (1210*a*). When a current is applied to the second sub-coil (1422-2*a*), an electromagnetic field may be formed around the second sub-coil (1422-2*a*) to interact with the second sub-magnet (1421-2*a*).

The reflective member driving device (1000*a*) may comprise a Hall sensor (1423*a*). The Hall sensor (1423*a*) can sense the second driving magnet (1421*a*). The Hall sensor (1423*a*) may detect a magnetic force on the second driving magnet (1421*a*). Hall sensor (1423*a*) may detect a position of holder (1210*a*). The Hall sensor (1423*a*) may detect the position of the reflective member (1220*a*). The hall sensor (1423*a*) may detect an amount of tilt about the y-axis of the holder (1210*a*).

The reflective member driving device (1000*a*) may comprise a yoke (1424*a*). The yoke (1424*a*) may be disposed between the second driving magnet (1421*a*) and the holder (1210*a*). The yoke (1424*a*) may be formed in a shape corresponding to that of the second driving magnet (1421*a*). The yoke (1424*a*) may increase the interaction force between the second driving magnet (1421*a*) and the second coil (1422*a*).

Although the first and second exemplary embodiments of the present invention have been described separately above, some configurations of the second embodiment may be applicable to the first embodiment. For example, the coil member (1402*a*) of the second embodiment may be applicable to the first embodiment. Alternatively, some of the configurations of the first exemplary embodiment may be applicable to the second embodiment. For example, the sensing magnet (1403) and first sensor (1413) of the first embodiment may be applied to the second embodiment. A third embodiment of the invention may comprise the sensing magnet (1403) and first sensor (1413) of the first embodiment together with the coil member (1402*a*) of the second embodiment.

The following will be described with reference to the configuration and drawing symbols of the first embodiment, but the description may be applied by analogy to the second embodiment.

Hereinafter, the operation of the reflective member driving device according to the present embodiment will be described with reference to the drawings.

FIGS. 34 to 36 are drawings to illustrate a tilt about the x-axis of a reflective member driving device according to the present embodiment. In this embodiment, a holder (1210) may be disposed between a top plate and a bottom plate of the housing (1110) in an initial state in which no current is supplied to the first driving part (1410). In this case, the holder (1210) may be spaced apart from both the top plate and the bottom plate of the housing (1110) (see FIG. 34).

At this time, when a current in a first direction is applied to the first coil (1412), the holder (1210) may be tilted upwardly about the second projection (1320) of the moving plate (1300) by electromagnetic interaction between the first coil (1412) and the first driving magnet (1411) (see a in FIG. 35). On the other hand, when a current in a second direction opposite to the first direction is applied to the first coil (1412), the holder (1210) may be tilted downwardly about the second projection (1320) of the moving plate (1300) by electromagnetic interaction between the first coil (1412) and the first driving magnet (1411) (see b in FIG. 36).

That is, a current may be selectively applied to the first coil (1412) in both directions, causing the holder (1210) to tilt up and down about an x-axis relative to the housing (1110). At this time, the reflective member (1220) is also tilted along with the holder (1210), so that the light path is altered, which may offset the shaking detected by the gyro sensor (1150).

FIGS. 37 through 39 are drawings to illustrate tilting about the y-axis of a reflective member drive device according to an exemplary embodiment of the present invention.

In this exemplary embodiment, the holder (1210) may be disposed between the two side plates of the housing (1110) in an initial state where no current is supplied to the second driving part (1420). In this case, the holder (1210) may be spaced apart from both side plates of the housing (1110) (see FIG. 37). At this time, when a current in the first direction is applied to the second coil (1422), the holder (1210) may be tilted to one side about the first protrusion (1310) of the moving plate (1300) by electromagnetic interaction between the second coil (1422) and the second driving magnet (1421) (see a in FIG. 38).

On the other hand, when a current is applied to the second coil (1422) in a second direction opposite to the first direction, the electromagnetic interaction between the second coil (1422) and the second driving magnet (1421) may cause the holder (1210) to tilt to the other side about the first protrusion (1310) of the moving plate 1300 (see b in FIG. 39). That is, the current may be selectively applied to the second coil (1422) in both directions such that the holder (1210) may be tilted left and right about the y-axis relative to the housing (1110). At this time, the reflective member (1220) is also tilted along with the holder (1210) so that the light path is altered, which may offset the shaking detected by the gyro sensor (1150). In this embodiment, image stabilization may be performed for an x-axis tilt and a y-axis tilt, i.e., a two-axis tilt. Hereinafter, a lens driving device according to an exemplary embodiment of the present embodiment will be described with reference to the drawings.

FIG. 40 is a perspective view of a lens driving device according to an exemplary embodiment of the present invention, FIG. 41 is a perspective view that omits some configurations of a lens driving device according to an exemplary embodiment of the present invention, FIG. 42 is a perspective view of the lens driving device in the state shown in FIG. 41 from a different direction, FIG. 43 is a perspective view of a lens driving device according to an exemplary embodiment of the present invention, omitting some configurations, FIG. 44 is a perspective view of a lens driving device according to an exemplary embodiment of the present invention, with configurations such as a substrate and a coil omitted, FIG. 45 is a perspective view of the lens driving device in the state shown in FIG. 44 with the first lens and related configurations omitted, FIG. 46 is a perspective view and partial enlargement of a partial configuration of a lens driving device according to an exemplary embodiment of the present invention, FIG. 47 is a drawing to illustrate the arrangement structure of the coils and sensors of the lens driving device according to an exemplary embodiment of the present embodiment, FIG. 48 is a perspective view of the lens driving device shown in FIG. 44 with the second housing omitted, FIG. 49 is a perspective view of the lens driving device in the state shown in FIG. 48 with the guide rails omitted, FIG. 50 is an enlarged view of a partial configuration of a lens driving device according to an exemplary embodiment of the present invention, FIG. 51 is a perspective view of the first and second moving parts and related configurations of a lens driving device according to an exemplary embodiment of the present invention, FIG. 52 is a perspective view of the second moving part and related configurations of a lens driving device according to an exemplary embodiment of the present invention, FIG. 53 is an exploded view of a lens driving device according to an exemplary embodiment of the present invention, FIG. 54 is a perspective view of a second housing of a lens driving device according to an exemplary embodiment of the present invention, FIGS. 55 and 56 are exploded views of some configurations of a lens driving device according to an exemplary embodiment of the present invention and FIG. 57 is a cross-sectional view of a lens driving device according to an exemplary embodiment of the present invention.

A lens driving unit (2000) may perform a zoom function. The lens driving device (2000) may perform a continuous zoom function. The lens driving device (2000) may perform an auto focus (AF) function. The lens driving device (2000) may move a lens. The lens driving device (2000) may move the lens along an optical axis. The lens driving device (2000) may move lenses formed in a plurality of groups, group by group. The lens driving device (2000) may move a second group of lenses. The lens driving device (2000) may move a third group of lenses. The lens driving device (2000) may be a lens actuator. The lens driving device (2000) may be an AF actuator. The lens driving device (2000) may be a zoom actuator. The lens driving device (2000) may comprise a voice coil motor (VCM).

The lens driving device (2000) may comprise a lens. Alternatively, the lens may be described as a component of a camera device (10) rather than a component of the lens driving device (2000). The lens may be disposed in the light path formed by the reflective member (1220) of the reflective member driving device (1000) and the image sensor (3400). The lens may comprise a plurality of lenses. The plurality of lenses may form a plurality of groups. The lens may form three groups. The lens may comprise lenses of a first to third family. A first group lens, a second group lens, and a third group lens may be sequentially disposed between the reflective member (1220) and the image sensor (3400). The first group of lenses may comprise the first lens (2120). The second group of lenses may comprise a second lens (2220). The third group of lenses may comprise a third lens (2320).

The lens driving device (2000) may comprise a fixed part (2100). The fixed part (2100) may be a relatively fixed portion of a first moving part (2200) and a second moving part (2300) during movement.

The lens driving device (2000) may comprise a housing (2110). The fixed part (2100) may comprise the housing (2110). The housing (2110) may be disposed on an outer side of a first holder (2210) and a second holder (2310). The housing (2110) may accommodate at least a portion of the first holder (2210) and the second holder (2310). The housing (2110) may comprise a front plate, a back plate, and a plurality of connection plates. The front plate may be referred to as the top plate, the back plate may be referred to as the bottom plate, and the connection plates may be referred to as the side plates.

The housing (2110) may comprise a first housing (2110-1). The first housing (2110-1) may form a front plate of the housing (2110). The first housing (2110-1) may be coupled to a first lens (2120). The first housing (2110-1) may be a cover. The first housing (2110-1) may be coupled to the reflective member driving device (1000). The first housing (2110-1) may have a first lens (2120) secured thereto. The housing (2110) may comprise a second housing (2110-2). The second housing (2110-2) may form a connection plate with a back plate of the housing (2110). The second housing (2110-2) may be open to the front. The first housing (2110-1) may be coupled to the front of the second housing (2110-2). A portion of the guide rail 2130 may be disposed between the first housing (2110-1) and the second housing (2110-2).

The housing (2110) may comprise a first groove (2111). The first groove (2111) may engage a protrusion (1116) of the housing (1110) of the reflective member driving device (1000). The first groove (2111) may be formed in a shape corresponding to that of the protrusion (1116) of the reflective member driving device (1000). An adhesive may be disposed in the first groove (2111) to couple the reflective member driving device (1000) with the lens driving device (2000).

The housing (2110) may comprise a second groove (2112). The second groove (2112) may engage a projection (1117) of the housing (1110) of the reflective member driving device (1000). The projection (1117) of the reflective member driving device (1000) may be inserted into the second groove (2112). The second groove (2112) may be formed in a shape corresponding to that of the projection (1117) of the reflective member driving device (1000). An adhesive may be disposed in the second groove (2112) to couple the reflective member driving device (1000) with the lens driving device (2000). The housing (2110) may comprise a first hole (2113). The first hole (2113) may expose a projection (2211) of the first holder (2210) and a projection (2311) of the second holder (2310). The first hole (2113) may be formed in a connection plate of the housing (2110). During a manufacturing test step, the protrusion (2211) of the first holder (2210) and the protrusion (2311) of the second holder (2310) exposed through the first hole (2113) can be checked to verify a normal operation of the lens driving device (2000).

The housing (2110) may comprise a plate (2113-1). The plate (2113-1) may cover the first hole (2113). The plate (2113-1) may be disposed in the first hole (2113) to close the first hole (2113). The housing (2110) may comprise a second hole (2114). The second hole (2114) may be a coil receiving hole in which the first coil (2412) and the second coil (2422) are disposed. The first coil (2412) and the second coil (2422) may be disposed in the second hole (2114). The second hole (2114) may be formed larger than the first coil (2412) and the second coil (2422).

The housing (2110) may comprise a projection (2115). The protrusion (2115) may be formed on the second housing (2110-2). The projection (2115) may be formed as a two-stage projection. The projection (2115) may be coupled to a guide rail (2130). The projection (2115) may be coupled to the first housing (2110-1). The guide rail (2130) may be coupled to a larger diameter portion of the projection (2115) and the first housing (2110-1) may be coupled to a smaller diameter portion of the projection (2115).

The protrusion (2115) may comprise a first protrusion (2115-1). The first protrusion (2115-1) may comprise a first portion having a first diameter (D2), and a second portion projecting from the first portion and having a second diameter (D1). The protrusion (2115) may comprise a second protrusion (2115-2). The second protrusion (2115-2) may comprise a third portion having a third diameter (D3), and a fourth portion projecting from the third portion and having a fourth diameter (D4). In this case, the fourth diameter (D4) may be smaller than the second diameter (D1). This allows the first projection (2115-1) to be more tightly coupled to the first housing (2110-1) than the second projection (2115-2).

The housing 2110 may comprise a guide protrusion (2116). The guide protrusion (2116) may be formed on an inner surface of the housing (2110). The guide protrusion (2116) may be formed in a shape that corresponds to a shape of at least a portion of the first holder (2210) and the second holder (2310). In doing so, the guide protrusion (2116) may guide movement of the first holder (2210) and the second holder (2310) in the optical axis direction. In this case, the optical axis direction may be in the z-axis direction perpendicular to the x-axis and y-axis. The guide protrusion (2116) may be disposed in the optical axis direction. The guide protrusion (2116) may extend in the optical axis direction.

The housing 2110 may comprise a groove (2117). The groove (2117) may be formed in the first housing (2110-1). The groove (2117) of the first housing (2110-1) may engage the protrusion (2115) of the second housing (2110-2). The housing (2110) may comprise a protrusion (2118). The protrusion (2118) may be coupled to a substrate (2140). The protrusion (2118) may be inserted into a groove in the substrate (2140). The protrusion (2118) may be formed with a corresponding size and shape to fit into the groove of the substrate (2140).

The housing (2110) may comprise a vent hole (2119). The vent hole (2119) may be formed in a back plate of the housing (2110). The vent hole (2119) may form a gap between the housing (2110) and a dummy glass (2600). Air can flow into the gap between housing (2110) and dummy glass (2600). Gases generated during the curing of the adhesive may escape through the vent hole (2119).

The lens driving device (2000) may comprise a first lens (2120). Alternatively, the first lens (2120) may be described as a component of the camera device (10) rather than a component of the lens driving device (2000). The fixed part (2100) may comprise a first lens (2120). The first lens (2120) may be disposed on an optical axis. The first lens (2120) may be disposed between the reflective member (1220) and the image sensor (3400). The first lens (2120) may be disposed between the reflective member (1220) and the second lens (2220). The first lens (2120) may be disposed within the first housing (2110-1). The first lens (2120) may be secured to the first housing (2110-1). The first lens (2120) may remain fixed even when the second lens (2220) and the third lens (2320) are moved.

The first lens (2120) may be a first family lens. The first lens (2120) may comprise a plurality of lenses. The first lens (2120) may comprise three lenses. The lens driving device (2000) may comprise a guide rail (2130). The fixed part (2100) may comprise a guide rail (2130). The guide rail (2130) may be coupled between the first housing (2110-1) and the second housing (2110-2). The guide rail (2130) may guide movement of the first holder (2210) and the second holder (2310). The guide rail (2130) may guide the first holder (2210) and the second holder (2310) to move in the optical axis direction. The guide rail (2130) may comprise a rail disposed in the optical axis direction. The guide rail (2130) may comprise the rail extending in the optical axis direction. The guide rail (2130) may comprise a rail that is formed to allow the ball (2500) to roll.

The lens driving device (2000) may comprise a substrate (2140). The fixed part (2100) may comprise a substrate (2140). The substrate (2140) may be disposed on both sides of the housing (2110). The substrate (2140) may be an FPCB. The substrate (2140) may comprise a first coil (2412) and a second coil (2422) disposed on the substrate (2140). The substrate (2140) may comprise a first region (2140-1). The first region (2140-1) may be formed at an end of the substrate (2140). A terminal may be disposed in the first region (2140-1). The substrate (2140) may comprise a second region (2140-2). The first region (2140-1) of the substrate (2140) may be bent inwardly with respect to the second region (2140-2). This can minimize the size of printed circuit board 3300 while obtaining a placement area for soldering for connecting the terminal of substrate (2140) to a printed circuit board (3300). The first region (2140-1) may form an obtuse angle with the second region (2140-2).

The substrate (2140) may comprise a first substrate (2141). The first substrate (2141) may be disposed on one side of the housing (2110). The first substrate (2141) may comprise a first coil (2412) disposed on the first substrate (2141). First and second hall sensors (2413, 2414) may be disposed on the first substrate (2141). The substrate (2140) may comprise a second substrate (2142). The second substrate (2142) may be disposed on the other side of the housing (2110). The second substrate (2142) may be disposed on the opposite side of the first substrate 2141. A second coil 2422 may be disposed on the second substrate (2142). Third and fourth hole sensors (2423, 2424) may be disposed on the second substrate (2142).

The lens driving device (2000) may comprise a SUS (2145). The SUS (2145) may be disposed on the substrate (2140). The SUS (2145) may add strength to the substrate (2140). The SUS (2145) may dissipate heat generated by the substrate (2140). The lens driving device (2000) may comprise an EEPROM (2150). The EEPROM (2150) may be electrically connected to first coil (2412) and second coil (2422). The EEPROM (2150) may be used to control the current applied to the first coil (2412) and the second coil (2422) during the manufacturing phase before the lens driving device (2000) is connected to a driver IC (3900). In other words, the EEPROM (2150) may be used to test the lens driving device (2000) for proper operation. The EEPROM (2150) may be disposed on an inner surface of the substrate (2140).

The lens driving device (2000) may comprise a first moving part (2200). The first moving part (2200) may be movable relative to the fixed part (2100). At least a portion of the first moving part (2200) may be disposed between the fixed part (2100) and the second moving part (2300). The first moving part (2200) may be movable between the fixed part (2100) and the second moving part (2300).

The lens driving device (2000) may comprise a first holder (2210). The first moving part (2200) may comprise the first holder (2210). The first holder (2210) may be disposed within the housing (2110). The first holder (2210) may be movable relative to the housing (2110). At least a portion of the first holder (2210) may be spaced apart from the housing (2110). The first holder (2210) may be in contact with the housing (2110). The first holder (2210) may be in contact with the housing (2110) upon movement. Alternatively, in an initial state, the first holder (2210) may be in contact with the housing (2110).

The first holder (2210) may comprise a protrusion (2211). The protrusion (2211) may be a test protrusion. The protrusion (2211) may be formed on an outer surface of the first holder (2210). The protrusion (2211) may protrude from the first holder (2210). The protrusions (2211) may be visible from the outside through the first hole (2113) of the housing (2110). The protrusion (2211) may be utilized when testing the lens driving device (2000) for proper operation. The protrusion (2211) may comprise a flat surface (2211-1) and an inclined surface (2211-2).

The first holder (2210) may comprise a rail groove (2212). A ball (2500) may be disposed in the rail groove (2212). The ball (2500) may roll in the rail groove (2212). The rail groove (2212) and the ball (2500) may be in contact at two points. The rail groove (2212) may be disposed in an optical axis direction. The rail groove (2212) may extend in the optical axis direction. The rail groove (2212) may comprise a plurality of rail grooves. The rail groove (2212) may comprise four rail grooves. The rail groove (2212) may comprise a first to fourth rail groove. One or more balls (2500) may be disposed in each of the plurality of rail grooves (2212).

The first holder (2210) may comprise a protrusion (2213). The protrusion (2213) may be formed on a side of the first holder (2210) facing the first housing (2110-1). The protrusion (2213) may contact the first housing (2110-1) when the first holder (2210) is moved in a direction that brings it closer to the first housing (2110-1). In this case, a contact area between the first holder (2210) and the first housing (2110-1) may be reduced when the protrusion (2213) is formed compared to when the protrusion (2213) is omitted. As a result, the impact and noise generated by the contact between the first holder (2210) and the first housing (2110-1) can be minimized.

The lens driving device (2000) may comprise a second lens (2220). Alternatively, the second lens (2220) may be described as a component of the camera device (10) rather than a component of the lens driving device (2000). The first moving part (2200) may comprise a second lens (2220). The second lens (2220) may be disposed on an optical axis. The second lens (2220) may be disposed between the reflective member (1220) and the image sensor (3400). The second lens (2220) may be disposed between the first lens (2120) and a third lens (2320). The second lens (2220) may be disposed within the first holder (2210). The second lens (2220) may be coupled to the first holder (2210). The second lens (2220) may be secured to the first holder (2210). The second lens (2220) may be movable relative to the first lens (2120). The second lens (2220) may be movable independently of the third lens (2320).

The second lens (2220) may be a second family (group) lens. The second lens (2220) may comprise a plurality of lenses. The second lens (2220) may comprise two lenses. The lens driving device (2000) may comprise a second moving part (2300). The second moving part (2300) may be movable relative to the fixed part (2100). The second moving part (2300) may be movable independently of the first moving part (2200). The second moving part (2300) may be disposed at the rear of the first moving part (2200). The second moving part (2300) may move in a direction that is closer to the first moving part (2200) and a direction that is further away from the first moving part (2200).

The lens driving device (2000) may comprise a second holder (2310). The second moving part (2300) may comprise the second holder (2310). The second holder (2310) may be disposed within the housing (2110). The second holder (2310) may be movable relative to the housing (2110). At least a portion of the second holder (2310) may be spaced apart from the housing (2110). The second holder (2310) may be in contact with the housing (2110). The second holder (2310) may be in contact with the housing (2110) upon movement. Alternatively, in the initial state, the second holder (2310) may be in contact with the housing (2110). The second holder (2310) may be in contact with the first holder (2210). The second holder (2310) may be spaced apart from the first holder (2210). The second holder (2310) may be in contact with the first holder (2210) upon movement. Alternatively, in an initial state, the second holder (2310) may be in contact with the first holder (2210).

The second holder (2310) may comprise a protrusion (2311). The protrusion (2311) may be a test protrusion. The protrusion (2311) may be formed on an outer surface of the second holder (2310). The protrusion (2311) may protrude from the second holder (2310). The protrusion (2311) may be visible from the outside through the first hole (2113) of the housing (2110). The protrusion (2311) may be utilized when testing the lens driving device (2000) for proper operation. The protrusion (2311) may comprise a flat surface (2311-1) and an inclined surface (2311-2).

The second holder (2310) may comprise a rail groove (2312). A ball (2500) may be disposed in the rail groove (2312). The ball (2500) may roll in the rail groove (2312). The rail groove (2312) and the ball (2500) may be in contact at two points. The rail groove (2312) may be disposed in an optical axis direction. The rail groove (2312) may extend in the optical axis direction. The rail groove (2312) may comprise a plurality of rail grooves. The rail groove (2312) may comprise four rail grooves. The rail groove (2312) may comprise a first to fourth rail groove. One or more balls (2500) may be disposed in each of the plurality of rail grooves (2312).

The second holder (2310) may comprise a protrusion (2313). The protrusion (2313) may be formed on a side of the second holder (2310) facing the first holder (2210). The protrusion (2313) may contact the first holder (2210) when the second holder (2310) is moved in a direction that brings the second holder (2310) closer to the first holder (2210). In this case, a contact area between the second holder (2310) and the first holder (2210) may be reduced when the protrusion (2313) is formed compared to when the protrusion (2313) is omitted. Thus, the impact and noise generated by the contact of the second holder (2310) and the first holder (2210) may be minimized.

The lens driving part (2000) may comprise a third lens (2320). Alternatively, the third lens (2320) may be described as a component of the camera device (10) rather than a component of the lens driving device (2000). The second moving part (2300) may comprise the third lens (2320). The third lens (2320) may be disposed on an optical axis. The third lens (2320) may be disposed between the reflective member (1220) and the image sensor (3400). The third lens (2320) may be disposed between the second lens (2220) and the image sensor (3400). The third lens (2320) may be disposed within the second holder (2310). The third lens (2320) may be coupled to the second holder (2310). The third lens (2320) may be secured to the second holder (2310). The third lens (2320) may be movable relative to the first lens (2120). The third lens (2320) may be movable independently of the second lens (2220).

The third lens (2320) may be a third family (group) lens. The third lens (2320) may comprise a plurality of lenses. The third lens (2320) may comprise two lenses. The lens driving device (2000) may comprise a driving part (2400). The driving part (2400) may move at least some of the plurality of lenses. The driving part (2400) may move the first moving part (2200) and the second moving part (2300) relative to the fixed part (2100). The driving part (2400) may comprise a coil and a magnet. The driving part (2400) may move the first moving part (2200) and the second moving part (2300) via electromagnetic interaction. In a modification, the driving part (2400) may comprise a shape memory alloy.

The driving part (2400) may comprise a first driving part (2410). The first driving part (2410) may move the first moving part (2200) relative to the fixed part (2100). The first driving part (2410) may move the first moving part (2200) relative to a second moving part (2300). The first driving part (2410) may be used to drive a zoom function. Alternatively, the first driving part (2410) may be used to drive an autofocus function.

The first driving part (2410) may comprise a first driving magnet (2411). The first driving magnet (2411) may be disposed in the first holder (2210). The first driving magnet (2411) may be disposed on a side of the first holder (2210). The first driving magnet (2411) may be coupled to the first holder (2210). The first driving magnet (2411) may be secured to the first holder (2210). The first driving magnet (2411) may be secured to the first holder (2210) by an adhesive. The first driving magnet (2411) may be integrally movable with the first holder (2210). The first driving magnet (2411) may be disposed facing the first coil (2412). The first driving magnet (2411) may be opposite the first coil (2412). The first driving magnet (2411) may be disposed in a position corresponding to that of the first coil (2412). The first driving magnet (2411) may interact with the first coil (2412). The first driving magnet (2411) may electromagnetically interact with the first coil (2412).

The first driving magnet (2411) may comprise a first magnet part (2411-1). The first magnet part (2411-1) may have a first polarity. The first driving magnet (2411) may comprise a second magnet part (2411-2). The second magnet part (2411-2) may have a second polarity that is different from the first polarity. For example, the first polarity may be an N-pole and the second polarity may be an S-pole. Conversely, the first polarity may be an S-pole and the second polarity may be an N-pole.

The first driving magnet (2411) may comprise a neutral portion (2411-3). The neutral portion (2411-3) may be disposed between the first magnet part (2411-1) and the second magnet part (2411-2). The neutral portion (2411-3) may have a neutral polarity. The neutral portion (2411-3) may be an unmagnetized portion. The first driving part (2410) may comprise a first coil (2412). The first coil (2412) may be disposed on a substrate (2140). The first coil (2412) may be disposed on a first substrate (2141). The first coil (2412) may be disposed in the housing (2110). The first coil (2412) may be disposed on the outer side of the first holder (2210). When a current is applied to the first coil (2412), an electromagnetic field may be formed around the first coil (2412), which may interact with the first driving magnet (2411). In a modification, the first coil (2412) may be disposed in the first holder (2210) and the first driving magnet (2411) may be disposed in the housing (2110).

The first coil (2412) may be formed in a ring shape. The first coil (2412) can be formed as a square ring or a circular ring. Even when the first coil (2412) is formed as a square ring, the corners may be curved. The first coil (2412) may comprise a first portion (2412-1) and a second portion (2412-2) having a gap G1 therebetween. In the gap G1 of the first coil (2412), first and second Hall sensors (2413, 2414) may be disposed.

The lens driving device (2000) may comprise a Hall sensor. The Hall sensor may sense the first driving magnet (2411). The Hall sensor may comprise a plurality of Hall sensors. The Hall sensor may comprise a first Hall sensor (2413) and a second Hall sensor (2414). The first Hall sensor (2413) and the second Hall sensor (2414) may be spaced apart from each other. The first Hall sensor (2413) and the second Hall sensor (2414) may be spaced apart such that a gap G2 is formed therebetween. The first Hall sensor (2413) and the second Hall sensor (2414) may sense the first driving magnet (2411). The first Hall sensor (2413) and the second Hall sensor (2414) may sense the magnetic force of the first driving magnet (2411). The first Hall sensor (2413) and the second Hall sensor (2414) may detect the position of the first holder (2210). The first Hall sensor (2413) and the second Hall sensor (2414) may detect the position of the second lens (2220).

The lens driving device (2000) may comprise a yoke (2415). The yoke (2415) may be disposed between the first driving magnet (2411) and the first holder (2210). The yoke (2415) may be formed in a shape corresponding to that of the first driving magnet (2411). The yoke (2415) may increase the interaction force between the first driving magnet (2411) and the first coil (2412). The yoke (2415) may comprise an extension part (2415-1). The extension part (2415-1) may wrap around a front side and a back side of the first driving magnet (2411). The yoke (2415) may comprise a groove (2415-2). The groove (2415-2) may be formed in a center portion of the body portion of the yoke (2415).

The driving part (2400) may comprise a second driving part (2420). The second driving part (2420) may move the second moving part (2300) relative to the fixed part (2100). The second driving part (2420) may move the second moving part (2300) relative to the first moving part (2200). The second driving part (2420) may be used to drive an autofocus function. Alternatively, the second driving part (2420) may be used to drive a zoom function.

The second driving part (2420) may comprise a second driving magnet (2421). The second driving magnet (2421) may be disposed in the second holder (2310). The second driving magnet (2421) may be disposed on a side of the second holder (2310). The second driving magnet (2421) may be coupled to the second holder (2310). The second driving magnet (2421) may be secured to the second holder (2310). The second driving magnet (2421) may be secured to the second holder (2310) by an adhesive. The second driving magnet (2421) may be integrally movable with the second holder (2310). The second driving magnet (2421) may be disposed facing the second coil (2422). The second driving magnet (2421) may be opposite the second coil (2422). The second driving magnet (2421) may be disposed in a position corresponding to that of the second coil (2422). The second driving magnet (2421) may interact with the second coil (2422). The second driving magnet (2421) may electromagnetically interact with the second coil (2422).

The second driving part (2420) may comprise a second coil (2422). The second coil (2422) may be disposed on the substrate (2140). The second coil (2422) may be disposed on a second substrate (2142). The second coil (2422) may be disposed in the housing (2110). The second coil (2422) may be disposed on the outer side of the second holder (2310). When a current is applied to the second coil (2422), an electromagnetic field may be formed around the second coil (2422) to interact with the second driving magnet (2421). In a modification, the second coil (2422) may be disposed in the second holder (2310) and the second driving magnet (2421) may be disposed in the housing (2110).

The lens driving device (2000) may comprise a Hall sensor. The Hall sensor may sense the second driving magnet (2421). The Hall sensor may comprise a plurality of Hall sensors. The Hall sensor may comprise a third Hall sensor (2423) and a fourth Hall sensor (2424). The third Hall sensor (2423) and the fourth Hall sensor (2424) may be spaced apart from each other. The third Hall sensor (2423) and the fourth Hall sensor (2424) may be spaced apart such that a gap G2 is formed therebetween. The third Hall sensor (2423) and the fourth Hall sensor (2424) may sense the second driving magnet (2421). The third Hall sensor (2423) and the fourth Hall sensor (2424) may sense the magnetic force of the second driving magnet (2421). The third Hall sensor (2423) and the fourth Hall sensor (2424) may detect the position of the second holder (2310). The third Hall sensor (2423) and the fourth Hall sensor (2424) may sense the position of the third lens (2320).

The lens driving device (2000) may comprise a yoke (2425). The yoke (2425) may be disposed between the second driving magnet (2421) and the second holder (2310). The yoke (2425) may be formed in a shape corresponding to that of the second driving magnet (2421). The yoke (2425) may increase the interaction force between the second driving magnet (2421) and the second coil (2422).

The lens driving device (2000) may comprise a first yoke (2430). The first yoke (2430) may be disposed to attractively engage the first driving magnet (2411). The first yoke (2430) may be disposed in the housing (2110). The first yoke (2430) may be disposed on the substrate (2140). The first yoke (2430) may be disposed on a first substrate (2141). The attraction between the first driving magnet (2411) and the first yoke (24300 may cause the first holder (2210) to press a ball (2500) toward the guide rail (2130). That is, the attraction between the first driving magnet (2411) and the first yoke (2430) may cause the ball (2500) to be held between the first holder (2210) and the guide rail (2130) without being removed.

The lens driving device (2000) may comprise a second yoke (2440). The second yoke (2440) may be disposed to attractively engage the second driving magnet (2421). The second yoke (2440) may be disposed in the housing (2110). The second yoke (2440) may be disposed on the substrate (2140). The second yoke (2440) may be disposed on a second substrate (2142). The attraction between the second driving magnet (2421) and the second yoke (2440) may cause the second holder (2310) to press the ball (2500) toward the guide rail (2130). That is, the attraction between the second driving magnet (2421) and the second yoke (2440) may cause the ball (2500) to be held between the second holder (2310) and the guide rail (2130) without being removed.

The lens driving device (2000) may comprise a ball (2500). The ball (2500) may guide movement of the first holder (2210). The ball (2500) may be disposed between the first holder (2210) and the guide rail (2130). The ball (2500) may guide the movement of the second holder (2310). The ball (2500) may be disposed between the second holder (2310) and the guide rail (2130). The ball (2500) may be formed in a spherical shape. The ball (2500) may roll in a rail groove (2212) of the first holder (2210) and a rail (2133) of the guide rail (2130). The ball (2500) may be moved optically between the rail groove (2212) of the first holder (2210) and the rail (2133) of the guide rail (2130). The ball (2500) may roll in the rail groove (2312) of the second holder (2310) and the rail (2133) of the guide rail (2130). The ball (2500) may be moved optically axially between the rail groove (2312) of the second holder (2310) and the rail (2133) of the guide rail (2130). The ball (2500) may comprise a plurality of balls. The ball (2500) may comprise eight balls, four in the first holder (2210) and four in the second holder (2310).

The lens driving device (2000) may comprise a dummy glass (2600). The dummy glass (2600) may be disposed in the housing (2110). The dummy glass (2600) may close a rear opening of the housing (2110). The dummy glass (2600) may be formed to be transparent to allow light to pass through. The lens driving device (2000) may comprise a Poron (2700). The Poron (2700) may be a shock absorber member. The Poron (2700) may minimize shock and noise generated by movement of the first holder (2210) and the second holder (2310). The Poron (2700) may be disposed where the first holder (2210) collides with the housing (2110). The Poron (2700) may be disposed where the second holder (2310) collides with the housing (2110).

FIGS. 58 through 60 are drawings to illustrate an implementation of a zoom function and an autofocus function of a lens driving device according to an exemplary embodiment of the present embodiment.

In this embodiment, a first lens (2120), a second lens (2220), and a third lens (2320) may be arranged in an aligned state on the optical axis (OA) in an initial state in which no current is supplied to the driving part (2400) (see FIG. 58).

At this time, when a current is applied to the first coil (2412), the second lens (2220) may move along the optical axis (OA) by electromagnetic interaction between the first coil (2412) and the first driving magnet (2411) (see a in FIG.

59). As the second lens (2220) moves while the first lens (2120) remains fixed, a zoom function may be performed. When a current in the first direction is applied to the first coil (2412), the second lens (2220) may move in a direction that brings it closer to the first lens (2120). When a current is applied to the first coil (2412) in a second direction opposite to the first direction, the second lens (2220) may move away from the first lens (2120).

Meanwhile, when a current is applied to the second coil (2422), the third lens (2320) may be moved along the optical axis (OA) by electromagnetic interaction between the second coil (2422) and the second driving magnet (2421) (see b in FIG. 60). The relative movement of the third lens (2320) with respect to the first lens (2120) and the second lens (2220) may perform an autofocus (AF) function. When a current is applied to the second coil (2422) in a first direction, the third lens (2320) may move in a direction that brings it closer to the first lens (2120). When a current is applied to the second coil (2422) in a second direction opposite to the first direction, the third lens (2320) may move away from the first lens (2120).

Hereinafter, a camera device according to an exemplary embodiment of the present embodiment will be described with reference to the drawings.

FIG. 1 is a perspective view of a camera device according to an exemplary embodiment of the present invention, FIG. 2 is a bottom surface perspective view of a camera device according to an exemplary embodiment of the present invention, FIG. 3 is a plan view of camera device according to an exemplary embodiment of the present invention, FIG. 4 is a cross-sectional view of FIG. 3 taken along line A-A, FIG. 5 is an exploded perspective view of a camera device according to an exemplary embodiment of the present invention, FIG. 61 is a perspective view of a partial configuration of a camera device according to an exemplary embodiment of the present invention, and FIG. 62 is an exploded view of an image sensor and filter and related configurations of a camera device according to an exemplary embodiment of the present invention.

The camera device (10) may comprise a cover member (3100). The cover member (3100) may be a "cover can" or a "shield can. The cover member (3100) may be disposed to cover the reflective member driving device (1000) and the lens driving device (2000). The cover member (3100) may be disposed on an exterior side of the reflective member driving device (1000) and the lens driving device (2000). The cover member (3100) may wrap around the reflective member driving device (1000) and the lens driving device (2000). The cover member (3100) may accommodate the reflective member driving device (1000) and the lens driving device (2000). The cover member (3100) may be formed of a metal material. The cover member (3100) may block electromagnetic interference (EMI).

The cover member (3100) may comprise a top plate (3110). The top plate (3110) may comprise an opening or a hole. Light may be incident through the opening or hole in the top plate (3110). The opening or hole in the top plate (3110) may be formed at a location corresponding to that of the reflective member (1220).

The cover member (3100) may comprise a side plate (3120). The side plate (3120) may comprise a plurality of side plates. The side plate (3120) may comprise four side plates. The side plate (3120) can comprise a first to fourth side plate. The side plate (3120) may comprise a first and second side plate disposed opposite each other, and a third and fourth side plate disposed opposite each other.

The camera device (10) may comprise a printed circuit board (PCB) (3300). The printed circuit board (3300) may be a substrate or circuit board. A sensor base (3500) may be disposed on the printed circuit board (3300). The printed circuit board (3300) may be electrically connected to the reflective member driving device (1000) and the lens driving device (2000). The printed circuit board (3300) may also be equipped with various circuits, devices, controls, and the like for converting an image resolved by an image sensor (3400) into an electrical signal and transmitting it to an external device. The printed circuit board (3300) may comprise a marking portion (3310). The marking portion (3310) may be disposed on a rear side of the printed circuit board (3300).

The camera device (10) may comprise a SUS (3320). The SUS (3320) may be disposed on a rear surface of the printed circuit board (3300). The SUS (3320) may add strength to the printed circuit board (3300). The SUS (3320) may dissipate heat generated by the printed circuit board (3300).

The camera device (10) may comprise an image sensor (3400). The image sensor (3400) may be disposed on printed circuit board (3300). The image sensor (3400) may receive light that has passed through a lens and a filter (3600) to form an image. The image sensor (3400) may be electrically connected to the printed circuit board (3300). For example, the image sensor (3400) may be coupled to the printed circuit board (3300) by surface mounting technology (SMT). In another example, the image sensor (3400) may be coupled to the printed circuit board (3300) by flip chip technology. The image sensor (3400) may be disposed so that its optical axis is aligned with the lens. The optical axis of the image sensor (3400) and the optical axis of the lens may be aligned. The image sensor (3400) may convert light incident on an effective image area of the image sensor (3400) into an electrical signal. The image sensor (3400) may comprise one or more of a charge coupled device (CCD), a metal oxide semi-conductor (MOS), a CPD, and a CID.

The camera device (10) may comprise a sensor base (3500). The sensor base (3500) may be disposed on a printed circuit board (3300). A filter (3600) may be disposed on the sensor base (3500). A portion of the sensor base (3500) where the filter (3600) is disposed may have an opening formed to allow light passing through the filter (3600) to incident on the image sensor (3400).

The camera device (10) may comprise a filter (3600). The filter (3600) may serve to block certain frequency bands of light from entering the image sensor (3400) from light passing through the lens. The filter (3600) may be disposed between the lens and the image sensor (3400). The filter (3600) may be disposed on the sensor base (3500). The filter (3600) may comprise an infrared filter. The infrared filter may block light in the infrared region from being incident on the image sensor (3400).

The camera device (10) may comprise a substrate (3700). The substrate (3700) may be associated with the printed circuit board (3300). The substrate (3700) may extend from the printed circuit board (3300). The substrate (3700) may comprise a terminal electrically coupled to the reflective member driving device (1000). The substrate (3700) may comprise an extension part extending outwardly.

The camera device (10) may comprise a connector (3710). The connector (3710) may be disposed on the substrate (3700). The connector (3710) may be disposed on the underside of an extension part of the substrate (3700). The connector (3710) may be connected to a power source of a smartphone, for example.

The camera device (10) may comprise a temperature sensor (3800). The temperature sensor (3800) may detect a temperature. The temperature detected by the temperature sensor (3800) may be used for more accurate control of one or more of an image stabilization function, an autofocus function, and a zoom function.

The camera device (10) may comprise a driver IC (3900). The driver IC (3900) may be electrically coupled to the lens driving device (2000). The driver IC (3900) may be described as a component of the lens driving device (2000). The driver IC (3900) may be electrically coupled to the first coil (2412) and the second coil (2422) of the lens driving device (2000). The driver IC (3900) may supply a current to the first coil (2412) and the second coil (2422) of the lens driving device (2000). The driver IC (3900) can control at least one of the voltage or current applied to each of the first coil (2412) and the second coil (2422) of the lens driving device (2000). The driver IC (3900) may be electrically coupled to the Hall sensors (2413, 2414, 2423, 2424). The driver IC (3900) may feedback-control the voltage and current applied to the first coil (2412) and the second coil (2422) via the position of the second lens (2220) and the third lens (2320) detected by the Hall sensors (2413, 2414, 2423, 2424).

Hereinafter, an optical apparatus according to an exemplary embodiment of the present embodiment will be described with reference to the drawings.

FIG. 63 is a perspective view of an optical apparatus according to an exemplary embodiment of the present invention.

The optical apparatus (1) may comprise one or more of the following: a cell phone, a mobile phone, a handheld device, a smart phone, a smart pad, a portable smart device, a digital camera, a laptop computer, a digital broadcasting device, a personal digital assistant (PDA), a portable multimedia player (PMP), and a navigation device. The optical device 1 may comprise any device for taking images or photographs.

The optical apparatus (1) may comprise a body (20). The optical apparatus (1) may comprise a camera device (10). The camera device (10) may be disposed on the body (20). The camera device (10) may photograph a subject. The optical apparatus (1) may comprise a display (30). The display (30) may be disposed on the body (20). The display (30) may output at least one of a video and an image taken by the camera device (10). The display (30) may be disposed on a first side of the body (20). The camera device (10) may be disposed on one or more of a first side of the body (20) and a second side opposite the first side.

While embodiments of the present invention have been described with reference to the accompanying drawings, one having ordinary skill in the art to which the present invention belongs will understand that the invention may be practiced in other specific forms without altering its technical ideas or essential features. It should therefore be understood that the embodiments described above are exemplary and non-limiting in all respects.

The invention claimed is:

1. A reflective member driving device, comprising:

a housing;

a holder disposed in the housing;

a reflective member disposed on the holder;

a moving plate disposed between the housing and the holder;

a driving magnet and a sensing magnet disposed on the holder;

a coil configured to electromagnetically interact with the driving magnet; and a first sensor configured to sense the sensing magnet, wherein the driving magnet comprises a first magnet configured to tilt the reflective member about a first axis and a second magnet configured to tilt the reflective member about a second axis perpendicular to the first axis, wherein the sensing magnet is disposed at a position where the sensing magnet does not electromagnetically interact with the coil, wherein the second magnet is disposed on two lateral surfaces of the holder, wherein the sensing magnet is disposed on the two lateral surfaces of the holder, and wherein the sensing magnet more protrudes from the two lateral surfaces of the holder than the second magnet.

2. The reflective member driving device of claim 1, wherein the first magnet is disposed on a lower surface of the holder.

3. The reflective member driving device of claim 2, wherein the first sensor is configured to detect a tilt about the first axis of the reflective member.

4. The reflective member driving device of claim 3, comprising a second sensor configured to sense the second magnet, wherein the second sensor is configured to sense a tilt about the second axis of the reflective member.

5. The reflective member driving device of claim 4, wherein a distance between the sensing magnet and the first sensor is shorter than a distance between the second magnet and the second sensor.

6. The reflective member driving device of claim 4, wherein the sensing magnet comprises a first surface facing the first sensor, wherein the second magnet comprises a first surface facing the second sensor, and wherein an area of the first surface of the second magnet is greater than an area of the first surface of the sensing magnet.

7. The reflective member driving device of claim 4, wherein the second magnet comprises a first sub-magnet disposed on a first lateral surface of the holder and a second sub-magnet disposed on a second lateral surface opposite the first lateral surface of the holder, and wherein the sensing magnet comprises a first sensing magnet disposed on the first lateral surface of the holder and a second sensing magnet disposed on the second lateral surface of the holder.

8. The reflective member driving device of claim 7, wherein the first sensor comprises a first sub-sensor configured to sense the first sensing magnet, and a second sub-sensor configured to sense the second sensing magnet, wherein the second sensor comprises a third sub-sensor configured to sense the first sub-magnet, and a fourth sub-sensor configured to sense the second sub-magnet, and wherein a distance between the first sub-sensor and the second sub-sensor is same as a distance between the third sub-sensor and the fourth sub-sensor.

9. The reflective member driving device of claim 4, wherein, in a direction of a third axis perpendicular to the first axis and the second axis, a distance between a center of the sensing magnet and the moving plate is greater than a distance between a center of the first magnet and the moving plate.

10. The reflective member driving device of claim 2, wherein the sensing magnet is further spaced apart from the moving plate than the second magnet.

11. The reflective member driving device of claim 2, wherein the coil comprises a first coil facing the first magnet, and a second coil facing the second magnet, and wherein, in a direction of a third axis perpendicular to the first axis and the second axis, at least a portion of the sensing magnet is overlapped with the second coil.

12. The reflective member driving device of claim 1, comprising a substrate disposed in the housing, wherein the first sensor is disposed on the substrate, wherein the housing comprises a hole disposed with the first sensor, and wherein, in a direction of the second axis, a length of the hole of the housing is shorter than a length of the sensing magnet.

13. The reflective member driving device of claim 1, wherein, in a direction of the second axis, at least a portion of the sensing magnet is overlapped with the housing.

14. A camera device, comprising:

a printed circuit board;

an image sensor disposed on the printed circuit board;

the reflective member driving device of claim 1; and a lens disposed on an optical path formed by the reflective member of the reflective member driving device and the image sensor.

15. An optical apparatus, comprising:

a body;

the camera device of claim 14 disposed on the body; and a display disposed on the body and configured to output at least one of a video or an image taken by the camera device.

16. A reflective member driving device, comprising:

a housing;

a holder disposed in the housing;

a reflective member disposed on the holder;

a moving plate disposed between the housing and the holder;

a first magnet and a second magnet disposed on the holder;

a first coil configured to tilt the reflective member about a first axis through electromagnetic interaction with the first magnet;

a second coil configured to tilt the reflective member about a second axis perpendicular to the first axis through electromagnetic interaction with the second magnet;

a sensing magnet disposed on the holder;

a first sensor configured to sense the sensing magnet; and a second sensor configured to sense the second magnet, wherein a distance between the sensing magnet and the first sensor is shorter than a distance between the second magnet and the second sensor, and wherein, in a direction of the second axis, at least a portion of the sensing magnet is overlapped with the housing.

17. The reflective member driving device of claim 16, wherein the first magnet is disposed on a lower surface of the holder, wherein the second magnet is disposed on two lateral surfaces of the holder, and wherein the sensing magnets is disposed on the two lateral surfaces of the holder.

18. The reflective member driving device of claim 16, wherein the sensing magnet is further spaced apart from the moving plate than the second magnet.

19. The reflective member driving device of claim 16, wherein, in a direction of a third axis perpendicular to the first axis and the second axis, a distance between a center of the sensing magnet and the moving plate is greater than a distance between a center of the first magnet and the moving plate.

20. A reflective member driving device, comprising:

a housing;

a holder disposed in the housing;

a reflective member disposed on the holder;

a moving plate disposed between the housing and the holder;

a first magnet disposed on a lower surface of the holder;

a second magnet disposed on two lateral surfaces of the holder;

a first coil disposed at a position corresponding with the first magnet;

a second coil disposed at a position corresponding to the second magnet;

a sensing magnet disposed on the two lateral surfaces of the holder; and a first sensor configured to detect the sensing magnet, wherein the sensing magnet more protrudes from the two lateral surfaces of the holder than the second magnet.

* * * * *